United States Patent
Baek et al.

(10) Patent No.: US 10,855,507 B2
(45) Date of Patent: *Dec. 1, 2020

(54) BROADCAST SIGNAL TRANSMITTING APPARATUS, BROADCAST SIGNAL RECEIVING APPARATUS, BROADCAST SIGNAL TRANSMITTING METHOD, AND BROADCAST SIGNAL RECEIVING METHOD

(71) Applicant: LG ELECTRONICS INC., Seoul (KR)

(72) Inventors: Jongseob Baek, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,852

(22) Filed: Feb. 7, 2020

(65) Prior Publication Data

US 2020/0177430 A1 Jun. 4, 2020

Related U.S. Application Data

(60) Continuation of application No. 16/293,361, filed on Mar. 5, 2019, now Pat. No. 10,601,625, which is a
(Continued)

(51) Int. Cl.
*H04L 27/26* (2006.01)
*H04L 1/00* (2006.01)
(Continued)

(52) U.S. Cl.
CPC ........ *H04L 27/2628* (2013.01); *H04L 1/0041* (2013.01); *H04L 1/0045* (2013.01);
(Continued)

(58) Field of Classification Search
CPC ... H04L 1/0071; H04L 1/0045; H04L 1/0054; H04L 1/0075; H04L 27/2602;
(Continued)

(56) References Cited

U.S. PATENT DOCUMENTS 6,188,717 B1  2/2001 Kaiser
6,266,321 B1  7/2001 Pehkonen
(Continued)

FOREIGN PATENT DOCUMENTS

CN  1638324 A  7/2005
CN  101262571 A  9/2008
(Continued)

OTHER PUBLICATIONS

Digital Video Broadcasting (DVB): "Frame structure channel coding and modulation for a second generation digital terrestrial television broadcasting system (DVB-T2)", XP055486024, DVB BlueBook A122, Nov. 2014, pp. 1-189.
(Continued)

*Primary Examiner* — Emmanuel Bayard
(74) *Attorney, Agent, or Firm* — Dentons US LLP

(57) ABSTRACT

Disclosed herein is a method of receiving a broadcast signal. The method comprises receiving the broadcast signal; an Orthogonal Frequency Division Multiplexing (OFDM) demodulating on the received broadcast signal; parsing at least one signal frame from the demodulated broadcast signal to extract service data or service component data; converting the service data or service component data into bits; decoding the converted bits; and outputting a data stream comprising the decoded bits.

14 Claims, 55 Drawing Sheets

Related U.S. Application Data division of application No. 15/637,790, filed on Jun. 29, 2017, now Pat. No. 10,263,822, which is a continuation of application No. 15/421,956, filed on Feb. 1, 2017, now Pat. No. 9,722,846, which is a continuation of application No. 14/797,948, filed on Jul. 13, 2015, now Pat. No. 9,602,321.

(60) Provisional application No. 62/099,594, filed on Jan. 5, 2015.

(51) Int. Cl.
  *H04L 5/00* (2006.01)
  *H04L 1/04* (2006.01)
  *H04W 72/04* (2009.01)
  *H04L 1/06* (2006.01)

(52) U.S. Cl.
  CPC .......... *H04L 1/0071* (2013.01); *H04L 1/0075* (2013.01); *H04L 1/04* (2013.01); *H04L 5/0007* (2013.01); *H04L 27/2602* (2013.01); *H04L 27/2607* (2013.01); *H04L 27/2613* (2013.01); *H04L 27/2627* (2013.01); *H04L 27/2649* (2013.01); *H04W 72/0446* (2013.01); *H04L 1/0065* (2013.01); *H04L 1/0625* (2013.01); *H04L 1/0631* (2013.01); *H04L 5/0044* (2013.01)

(58) Field of Classification Search
  CPC . H04L 27/265; H04L 5/0023; H04L 27/2649; H04L 1/0631; H04L 27/2607
  USPC .......................................... 375/316, 340, 260
  See application file for complete search history.

(56) References Cited

U.S. PATENT DOCUMENTS

| | | | |
|---|---|---|---|
| 7,139,237 B2 | 11/2006 | Nangia | |
| 7,773,682 B2 | 8/2010 | Hayashi | |
| 8,121,017 B2 | 2/2012 | Stadelmeier | |
| 8,792,322 B2 | 7/2014 | Stadelmeier | |
| 8,880,846 B2 | 11/2014 | Nakajima | |
| 9,112,760 B2 | 8/2015 | Atungsiri | |
| 9,258,083 B2 | 2/2016 | Ouchi | |
| 9,722,846 B2 | 8/2017 | Baek | H04L 27/2649 |
| 10,601,625 B2* | 3/2020 | Baek | H04L 27/2627 |
| 2004/0151109 A1 | 8/2004 | Batra et al. | |
| 2004/0162931 A1 | 8/2004 | Hwang | |
| 2005/0058217 A1 | 3/2005 | Sandhu et al. | |
| 2005/0232136 A1 | 10/2005 | Kwak | |
| 2006/0248563 A1 | 11/2006 | Lee | |
| 2007/0110180 A1 | 5/2007 | Hammerschmidt | |
| 2007/0206646 A1 | 9/2007 | Giannakopoulos | H04L 7/0008 370/535 |
| 2008/0313692 A1 | 12/2008 | Yun et al. | |
| 2009/0169204 A1 | 7/2009 | Meagher | |
| 2009/0296838 A1 | 12/2009 | Atungsiri et al. | |
| 2010/0077276 A1 | 3/2010 | Okamura | |
| 2011/0078540 A1 | 3/2011 | Hu et al. | |
| 2011/0103516 A1 | 5/2011 | Bao et al. | |
| 2011/0274429 A1 | 11/2011 | Caplan | H04B 10/5561 398/65 |
| 2011/0280327 A1 | 11/2011 | Ko et al. | |
| 2011/0299628 A1 | 12/2011 | Ko | |
| 2012/0002739 A1 | 1/2012 | Peron | |
| 2012/0263251 A1 | 10/2012 | Djordjevic | |
| 2012/0314786 A1 | 12/2012 | Atungsiri | |
| 2012/0327879 A1 | 12/2012 | Stadelmeier et al. | |
| 2013/0003819 A1* | 1/2013 | Kisoda | H04N 21/41407 375/232 |
| 2013/0039303 A1 | 2/2013 | Stadelmeier | |
| 2013/0294532 A1 | 11/2013 | Inagawa | H04L 1/0071 375/257 |
| 2014/0010154 A1 | 1/2014 | Hong et al. | |
| 2014/0247803 A1 | 9/2014 | Arambepola et al. | |
| 2014/0269960 A1* | 9/2014 | Petrov | H04L 27/3444 375/261 |
| 2014/0380135 A1 | 12/2014 | Hong et al. | |
| 2015/0063476 A1 | 3/2015 | Wang | H04M 11/062 375/260 |
| 2015/0078249 A1* | 3/2015 | Hoang | G01S 19/243 370/316 |
| 2015/0139351 A1 | 5/2015 | Arambepola | |
| 2015/0304147 A1 | 10/2015 | Peron | |
| 2015/0326294 A1 | 11/2015 | Murakami | H04L 1/007 375/267 |
| 2015/0349998 A1 | 12/2015 | Atungsiri | |
| 2016/0037487 A1 | 2/2016 | Hong | |
| 2016/0043745 A1 | 2/2016 | Vojcic | |
| 2016/0056991 A1 | 2/2016 | Zhang | |
| 2018/0139021 A1* | 5/2018 | Atungsiri | H04L 5/0007 |

FOREIGN PATENT DOCUMENTS

| | | |
|---|---|---|
| CN | 101573929 A | 11/2009 |
| CN | 103944682 A | 7/2014 |
| CN | 103944683 A | 7/2014 |
| EP | 1548974 A2 | 6/2005 |
| EP | 2541926 A2 | 1/2013 |
| JP | 2000312194 A | 11/2000 |
| JP | 2000-349653 A | 12/2000 |
| JP | 2009-112012 A | 5/2009 |
| JP | 2009-522834 A | 6/2009 |
| JP | 2013-502805 A | 1/2013 |
| JP | 2014096790 A | 5/2014 |
| KR | 20090109537 A | 10/2009 |
| KR | 20090124974 A | 12/2009 |
| KR | 1020120033272 A | 4/2012 |
| WO | 2014171673 A1 | 10/2014 |
| WO | 2014182135 A1 | 11/2014 |

OTHER PUBLICATIONS

U.S. Appl. No. 16/293,361, filed Mar. 5, 2019.
U.S. Appl. No. 15/637,790, filed Jun. 29, 2017, U.S. Pat. No. 10,263,822.
U.S. Appl. No. 15/421,956, filed Feb. 1, 2017, U.S. Pat. No. 9,722,846.
U.S. Appl. No. 14/797,948, filed Jul. 13, 2015, U.S. Pat. No. 9,602,321.

* cited by examiner

FIG. 12

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|   FRU_PHY_PROFILE | 3 |
|   FRU_FRAME_LENGTH | 2 |
|   FRU_GI_FRACTION | 3 |
|   RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

| Content | Bit | | |
|---|---|---|---|
| FIC_FLAG | 1 | | |
| AUX_FLAG | 1 | | |
| NUM_DP | 6 | | |
| for i = NUM_DP | | | |
| DP_ID | 6 | | |
| DP_TYPE | 3 | | |
| DP_GROUP_ID | 8 | | |
| BASE_DP_ID | 6 | | |
| DP_FEC_TYPE | 2 | | |
| DP_COD | 4 | | |
| DP_MOD | 4 | | |
| DP_SSD_FLAG | 1 | | |
| if PHY_PROFILE = '010' | | | |
| DP_MIMO | 3 | | |
| end | | | |
| DP_TI_TYPE | 1 | | |
| DP_TI_LENGTH | 2 | | |
| DP_TI_BYPASS | 1 | | |
| DP_FRAME_INTERVAL | 2 | | |
| DP_FIRST_FRAME_IDX | 5 | | |
| DP_NUM_BLOCK_MAX | 10 | | |
| DP_PAYLOAD_TYPE | 2 | if DP_PAYLOAD_TYPE==TS('00') | |
| | | DNP_MODE | 2 |
| | | ISSY_MODE | 2 |
| | | HC_MODE_TS | 2 |
| | | if HC_MODE_TS=='01' or '10' | |
| | | PID | 13 |
| | | end | |
| | | if DP_PAYLOAD_TYPE==IP('01') | |
| | | HC_MODE_IP | 2 |
| | | end | |
| DP_INBAND_MODE | 2 | RESERVED | 8 |
| DP_PROTOCOL_TYPE | 2 | | |
| DP_CRC_MODE | 2 | | |
| end | | | |
| | | if FIC_FLAG == 1 | |
| | | FIC_VERSION | 8 |
| | | FIC_LENGTH_BYTE | 13 |
| | | RESERVED | 8 |
| | | end | |
| | | if AUX_FLAG == 1 | |
| | | NUM_AUX | 4 |
| | | AUX_CONFIG_RFU | 8 |
| | | for i=1:NUM_AUX | |
| | | AUX_STREAM_TYPE | 4 |
| | | AUX_PRIVATE_CONF | 28 |
| | | end | |
| | | end | |

FIG. 15

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|   DP_ID | 6 |
|   DP_START | 15(or 13) |
|   DP_NUM_BLOCK | 10 |
|   RESERVED | 8 |
| end | |
| EAC_FLAG | 1 |
| EAS_WAKE_UP_VERSION_NUM | 8 |
| if EAC_FLAG = 1 | |
|   EAC_LENGTH_BYTE | 12 |
| else | |
|   EAC_COUNTER | 12 |
| end | |
| for i = 1:NUM_AUX | |
|   AUX_PRIVATE_DYN | 48 |
| end | |
| CRC 32 | 32 |

FIG. 29

BROADCAST SIGNAL TRANSMITTING APPARATUS, BROADCAST SIGNAL RECEIVING APPARATUS, BROADCAST SIGNAL TRANSMITTING METHOD, AND BROADCAST SIGNAL RECEIVING METHOD

This application is a continuation of U.S. patent application Ser. No. 16/293,361, filed Mar. 5, 2019 (now allowed), which is a divisional of U.S. patent application Ser. No. 15/637,790, filed Jun. 29, 2017, now U.S. Pat. No. 10,263,822, which is a continuation of U.S. patent application Ser. No. 15/421,956, filed Feb. 1, 2017, now U.S. Pat. No. 9,722,846, which is a continuation of U.S. patent application Ser. No. 14/797,948, filed Jul. 13, 2015, now U.S. Pat. No. 9,602,321, which claims priority to U.S. Provisional Application No. 62/099,594, filed Jan. 5, 2015, the contents of each is incorporated by reference in its entirety for all purposes as if fully set forth below.

BACKGROUND OF THE INVENTION

Field of the Invention

The present invention relates to a broadcast signal transmitting apparatus, a broadcast signal receiving apparatus, and broadcast signal transmitting and receiving methods.

Discussion of the Related Art

As transmission of an analog broadcast signal ends, various techniques for transmitting and receiving a digital broadcast signal have been developed. The digital broadcast signal can include more video/audio data than the analog broadcast signal and further include various kinds of additional data as well as the video/audio data.

SUMMARY OF THE INVENTION

That is, a digital broadcasting system may provide High Definition (HD) images, multi-channel audios, and various additional services.

For digital broadcasting, however, data transfer efficiency for the transmission of a large amount of data, the robustness of transmission/reception networks, and network flexibility in which a mobile reception apparatus has been taken into consideration need to be improved.

Accordingly, an object of the present invention is to provide a method for maximizing a frequency diversity effect using a different interleaving seed for each OFDM symbol pair in a Frequency Interleaver (FI).

Furthermore, an object of the present invention is to provide information indicating whether a frequency interleaver is used in a broadcasting signal transmission apparatus including the frequency interleaver.

Technical objects to be achieved in this specification are not limited to the aforementioned objects, and those skilled in the art to which the present invention pertains may evidently understand other technical objects from the following description.

In this specification, there is provided a method of receiving a broadcast signal. The method comprises receiving the broadcast signal; an Orthogonal Frequency Division Multiplexing (OFDM) demodulating on the received broadcast signal; parsing at least one signal frame from the demodulated broadcast signal to extract service data or service component data; converting the service data or service component data into bits; decoding the converted bits; and outputting a data stream comprising the decoded bits, wherein the signal frame comprises a control information indicating whether a frequency interleaver (FI) is used or not.

Furthermore, in this specification, the signal frame further comprises a preamble carrying a physical layer signaling data, and wherein the control information is included in the preamble.

Furthermore, in this specification, the parsing the at least one signal frame comprises a frequency deinterleaving on the demodulated broadcasting signal, and wherein the frequency deinterleaving is performed using different interleaving seeds and a single memory.

Furthermore, in this specification, the control information is frequency interleaver mode (FI_MODE) information.

Furthermore, in this specification, there is provided a reception apparatus for receiving a broadcast signal, comprising a receiver for receiving the broadcast signal; a demodulator for demodulating the received broadcast signal by an Orthogonal Frequency Division Multiplexing (OFDM) scheme; a frame parser for parsing at least one signal frame of the demodulated broadcast signal to extract service data or service component data; a converter for converting the service data or service component data into bits; a decoder for decoding the converted bits; and an output processor for outputting a data stream comprising the decoded bits, wherein the signal frame comprises a control information indicating whether a frequency interleaver (FI) is used or not.

BRIEF DESCRIPTION OF THE DRAWINGS

The accompanying drawings included to more appreciate the present invention and included in the present application, and constituting a part thereof illustrate embodiments of the present invention together with a detailed description for describing a principle the present invention.

FIG. 12 illustrates preamble signaling data according to an exemplary embodiment of the present invention.

FIG. 13 illustrates PLS1 data according to an exemplary embodiment of the present invention.

FIG. 14 illustrates PLS2 data according to an exemplary embodiment of the present invention.

FIG. 15 illustrates PLS2 data according to another exemplary embodiment of the present invention.

FIG. 29 illustrates XFECBLOCK interleaved from each interleaving array according to an exemplary embodiment of the present invention.

DETAILED DESCRIPTION OF THE EMBODIMENTS

Figure 1:
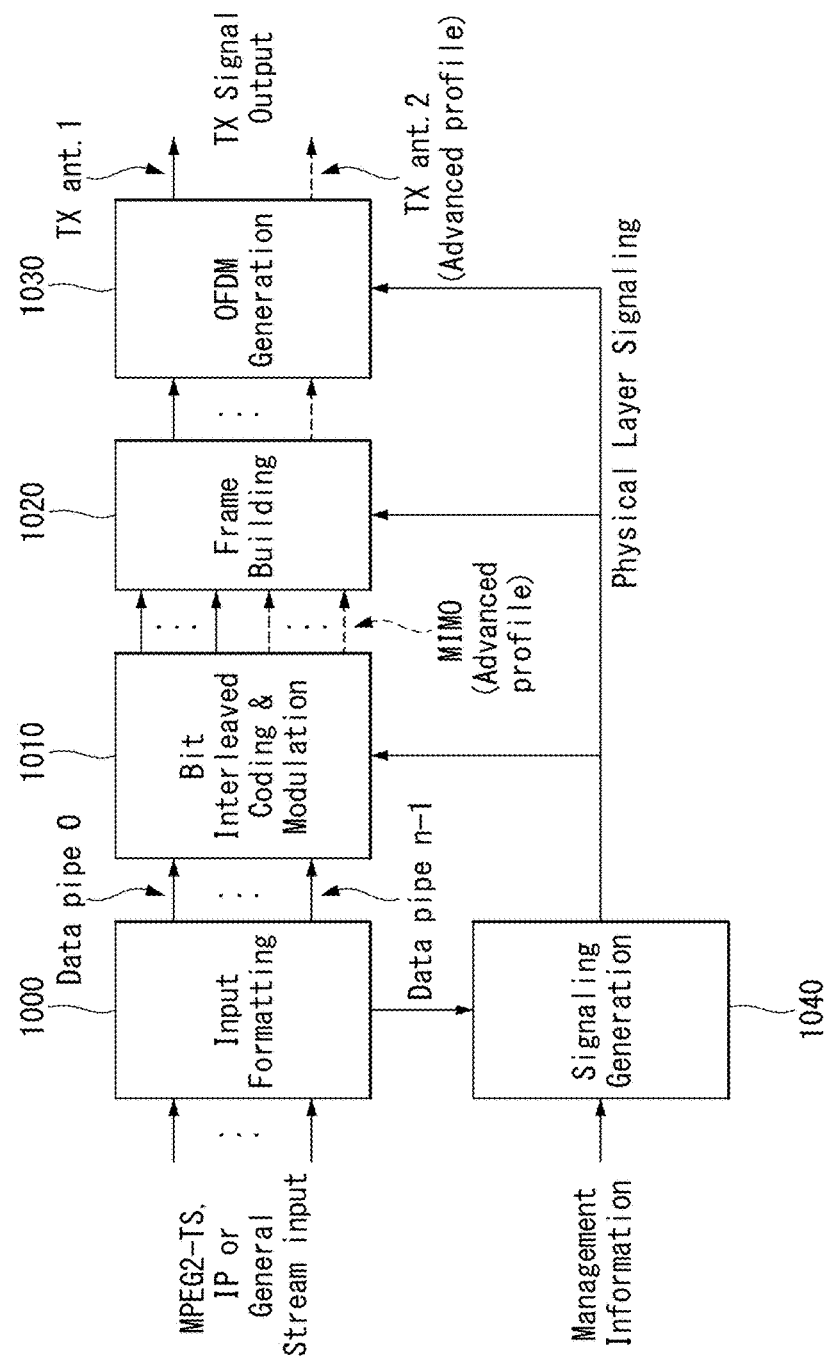
FIG. 1 illustrates a structure of a broadcast signal transmitting apparatus for a next-generation broadcasting service according to an exemplary embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| LDPC codeword length | 16K, 64K bits |
|---|---|
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| LDPC codeword length | 16 Kbits |
|---|---|
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| LDPC codeword length | 16K, 64Kbits |
|---|---|
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

Block interleaver: An interleaver where the input data is written along the rows of a memory configured as a matrix, and read out along the columns.

Cell interleaver: An interleaver operating at the cell level.

Interleaver: A device used in conjunction with error correcting codes to counteract the effect of burst errors.

Physical Layer Pipe (PLP): A structure specified to an allocated capacity and robustness that can be adjusted to broadcaster needs.

The PLP is represented to a data pipe or data transmission channel.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040.

A description will be given of the operation of each module of the apparatus for transmitting broadcast signals.

The input formatting block 1000 can be represented to an input formatter.

The BICM (Bit interleaved coding & modulation) block 1010 can be represented to an encoder.

The frame structure block 1020 can be represented to a frame builder or a frame building block or a framing & interleaving block.

The OFDM (Orthogonal Frequency Division Multiplexing) generation block 1030 can be represented to a modulator.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is represented to the data transmission (or transport) channel or the PLP.

The data pipe is a logical channel in the physical layer that carries service data or related metadata, which may carry one or multiple service(s) or service component(s).

The data pipe can be represented to a data transmission channel.

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Input Formatting Block of FIG. 1 implements functions, processes, and/or methods proposed in FIGS. 50, 51, and 52 to be described below.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
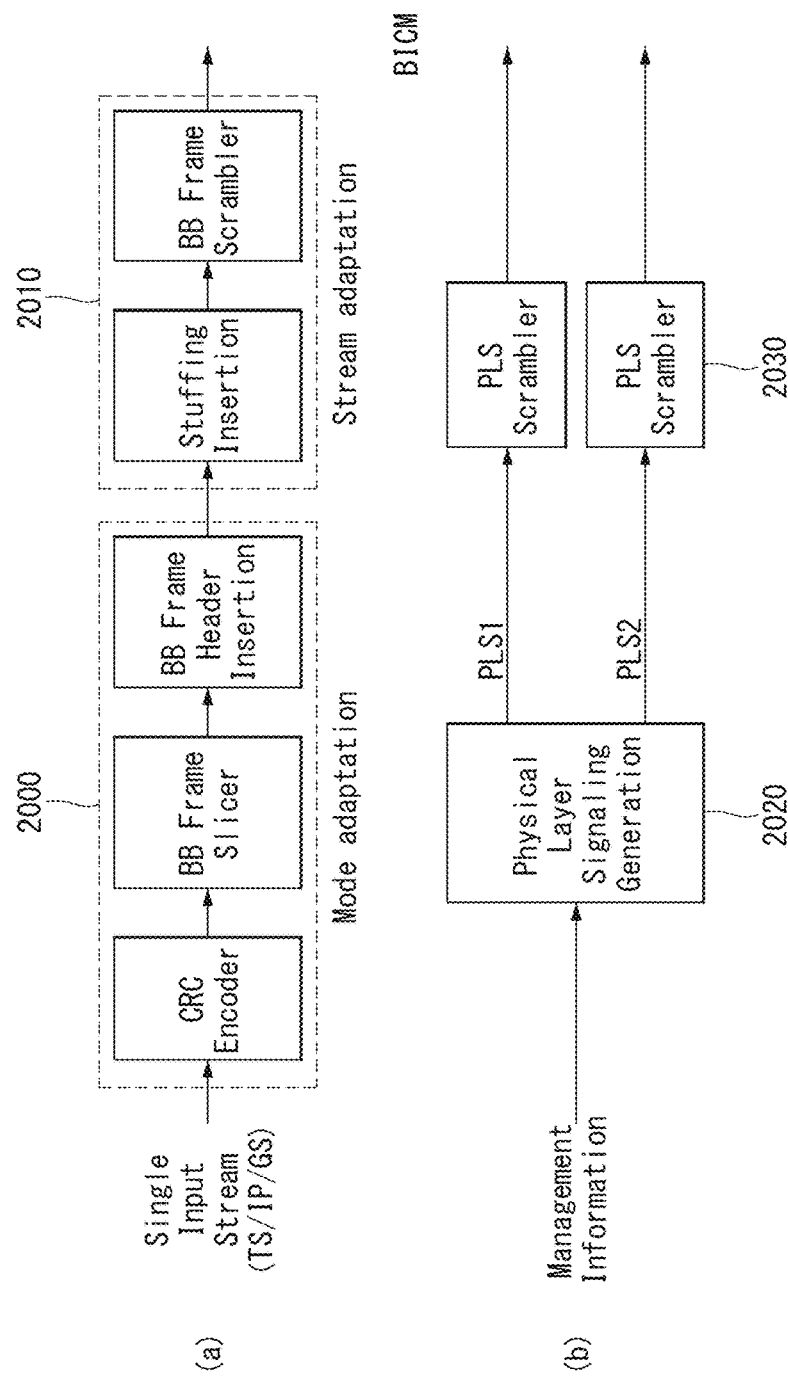
FIG. 2 illustrates an input formatting block according to an exemplary embodiment of the present invention.
Figure 3:
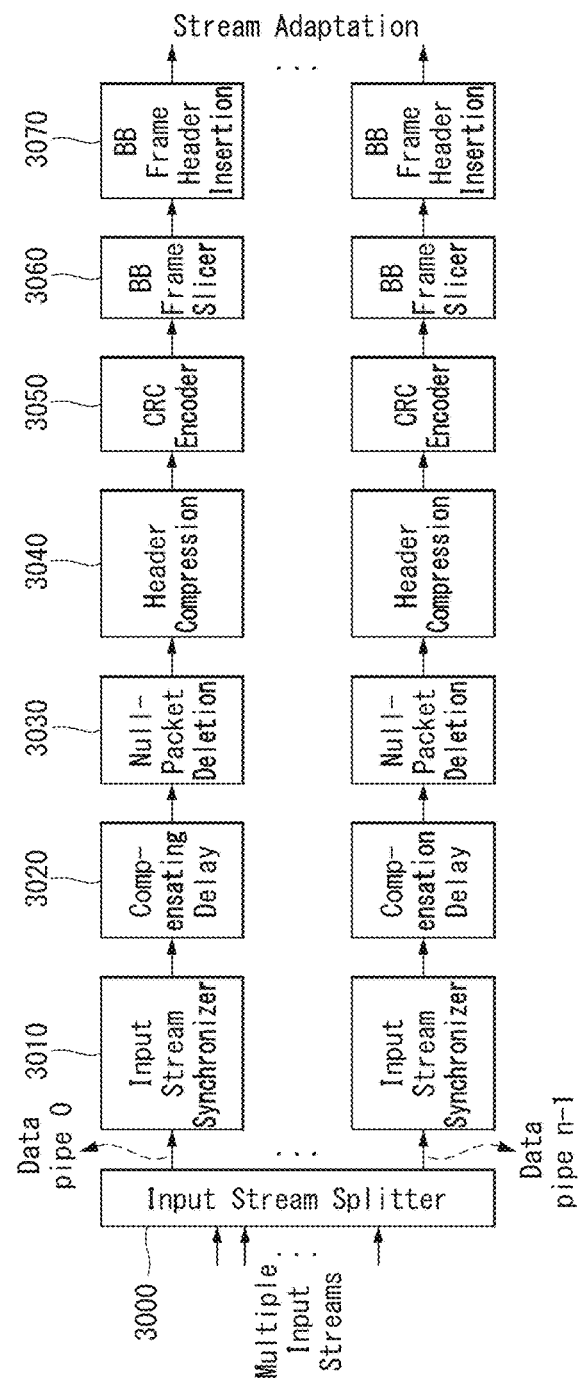
FIG. 3 illustrates an input formatting block according to another exemplary embodiment of the present invention.
Figure 4:
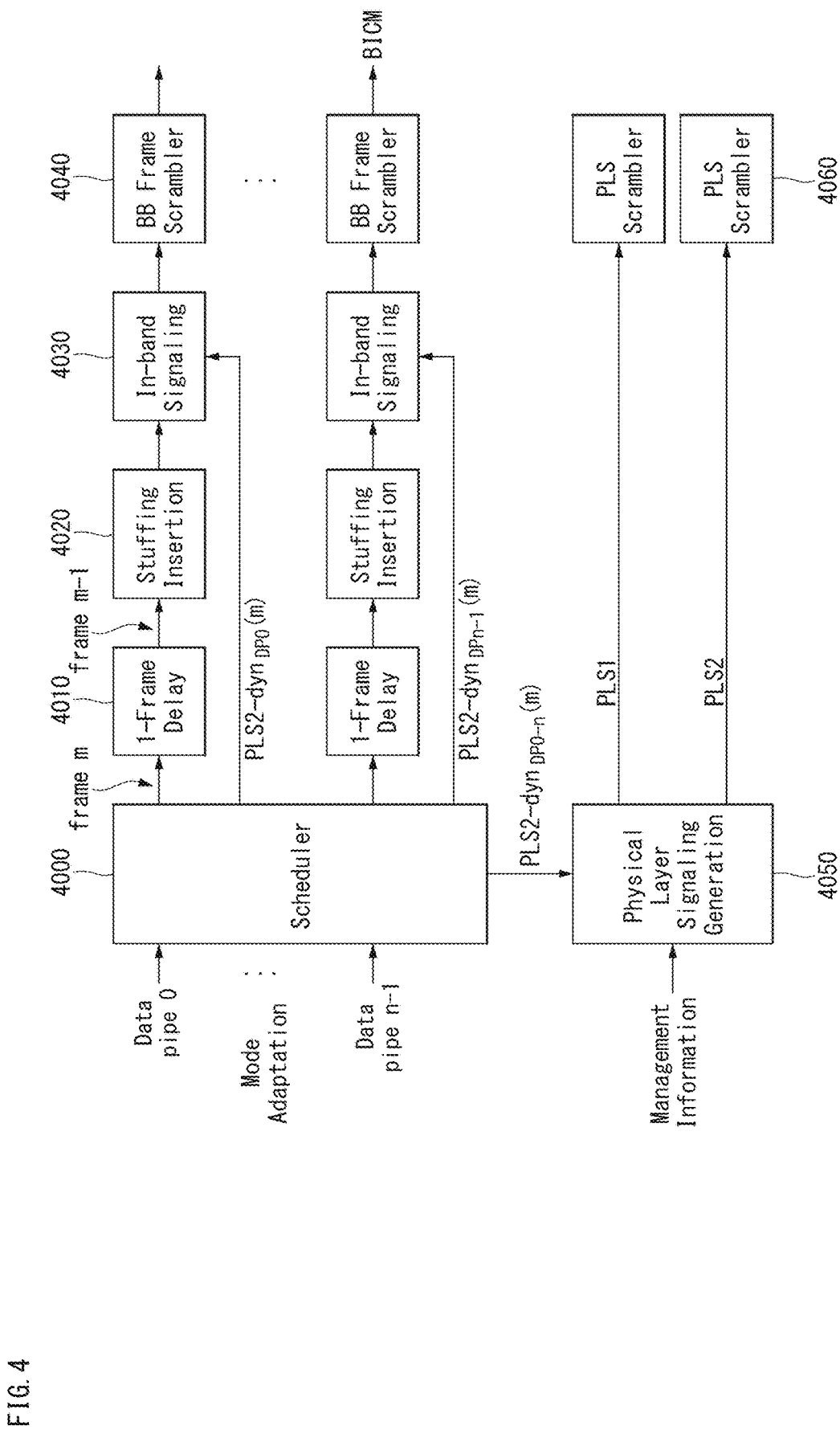
FIG. 4 illustrates an input formatting block according to yet another exemplary embodiment of the present invention.

FIGS. 2, 3 and 4 illustrate the input formatting block 1000 according to embodiments of the present invention. A description will be given of each figure.

The Input Formatting Block of FIG. 2 to FIG. 4 implements functions, processes, and/or methods proposed in FIGS. 50, 51, and 52 to be described below.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
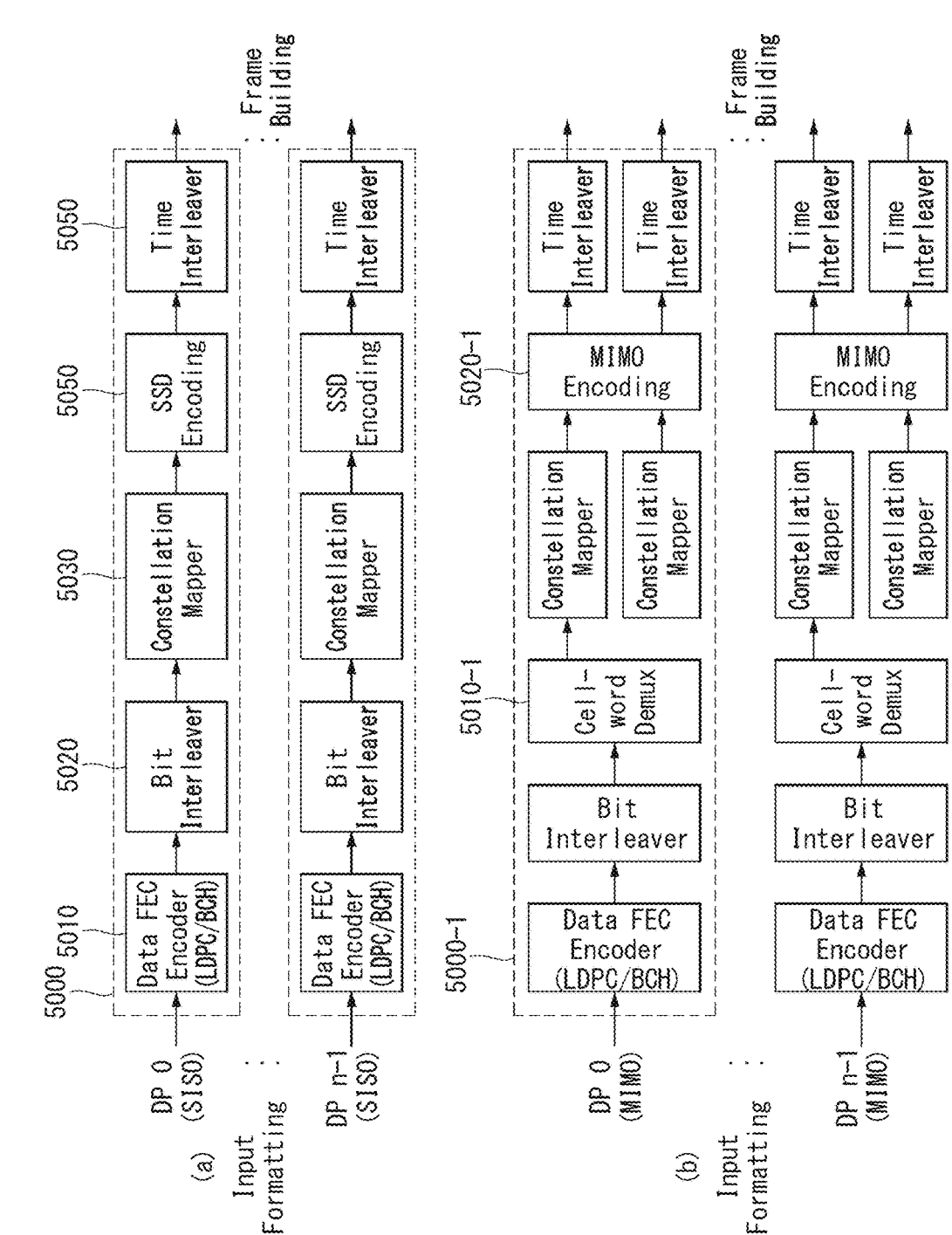
FIG. 5 illustrates a bit interleaved coding & modulation (BICM) block according to an exemplary embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, e1. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
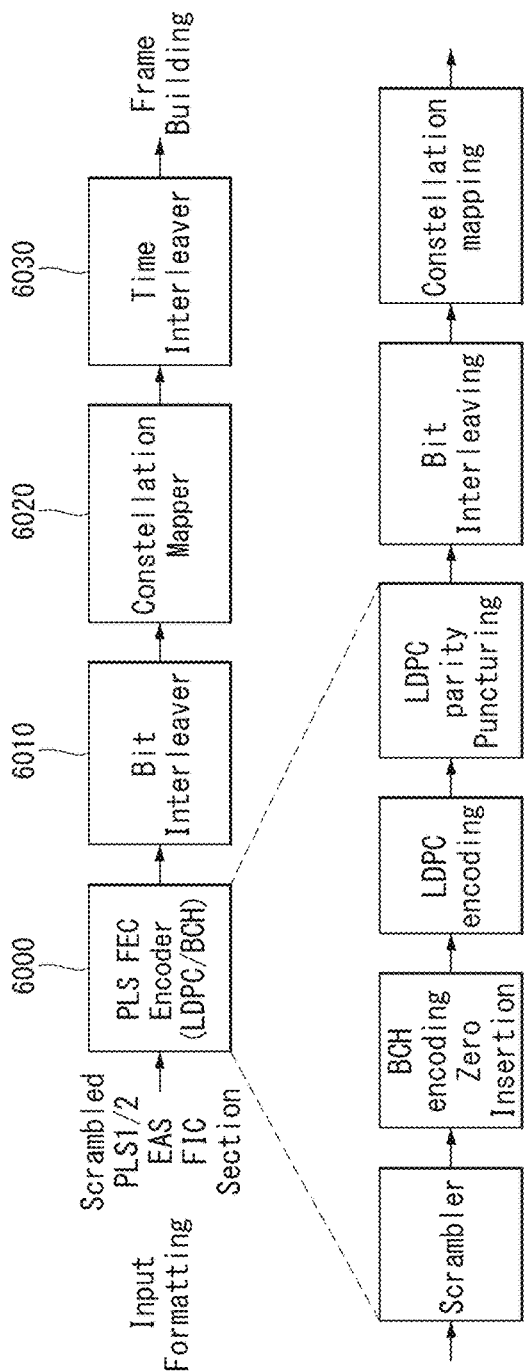
FIG. 6 illustrates a BICM block according to another exemplary embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math Figure 1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | code rate | Qldpc |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity punturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The time interleaver 6030 can interleave the mapped PLS1 data and PLS2 data.

The above-described blocks may be omitted or replaced by blocks having similar or identical functions.

Figure 7:
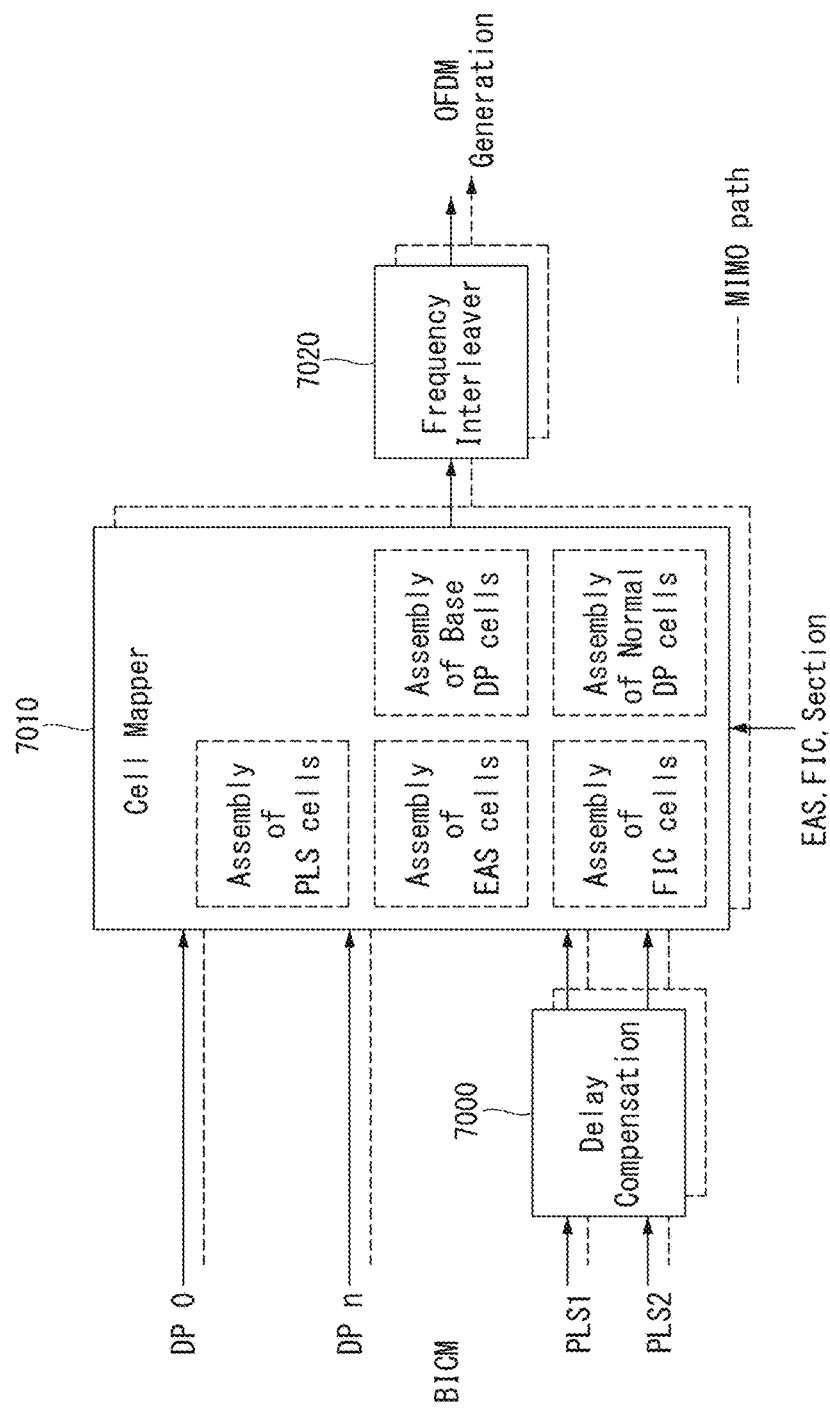
FIG. 7 illustrates a frame building block according to an exemplary embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

Figure 8:
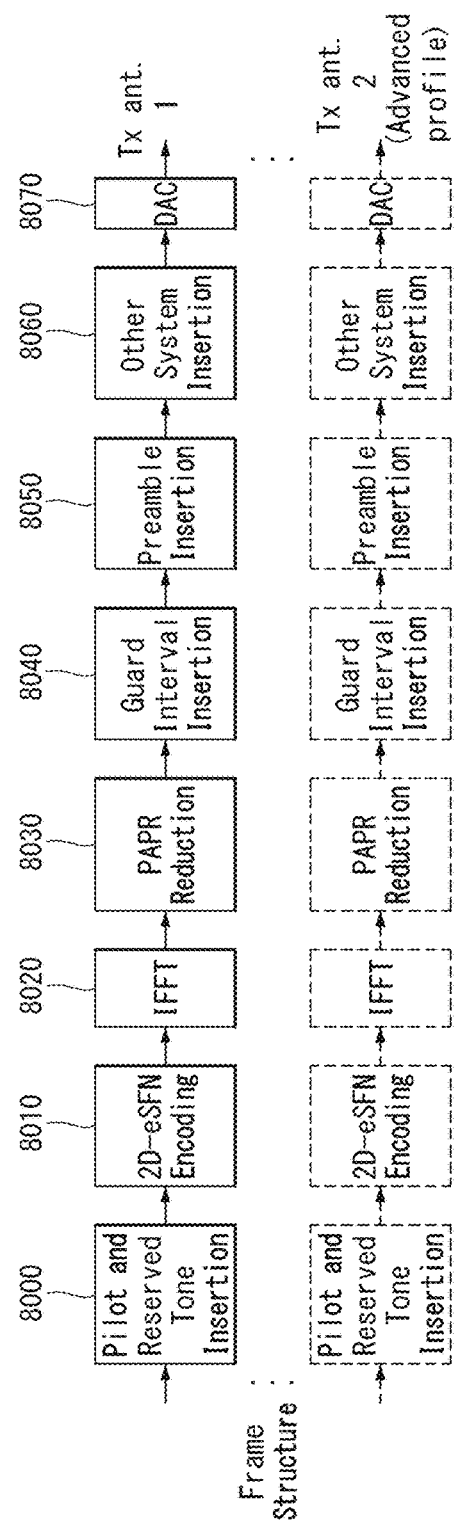
FIG. 8 illustrates an orthogonal frequency division multiplexing (OFDM) generation block according to an exemplary embodiment of the present invention.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame.

The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
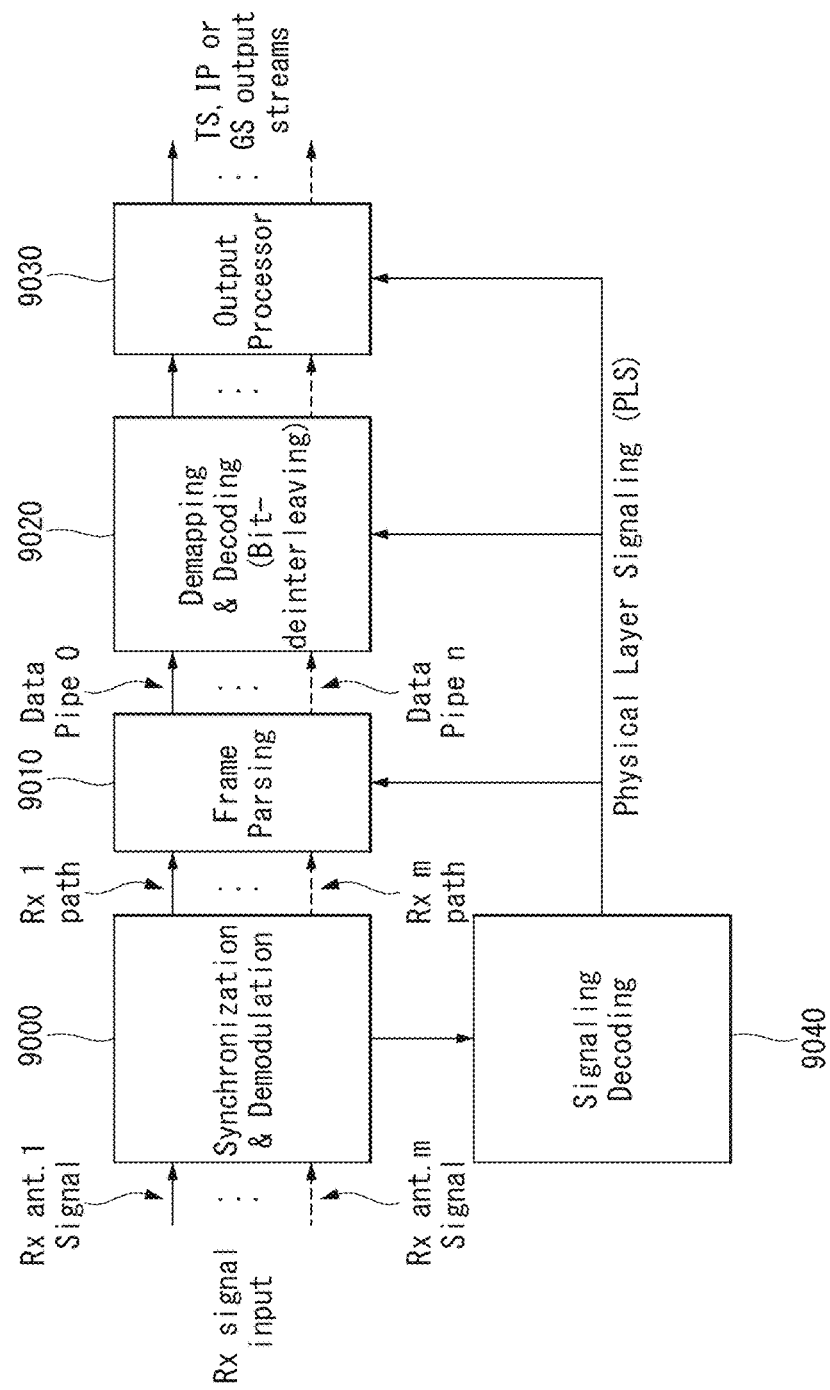
FIG. 9 illustrates a structure of a broadcast signal receiving apparatus for a next-generation broadcasting service according to an exemplary embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can be represented to a receiver and an OFDM demodulator.

The frame parsing module 9010 can be represented to a frame parser.

The frame parsing module is represented to a deframing & deinterleaving module (or block).

The demapping & decoding module 9020 can be represented to a converter and a decoder.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

The Output Processor of FIG. 9 implements functions, processes, and/or methods proposed in FIGS. 50, 51, and 53 to be described below.

Figure 10:
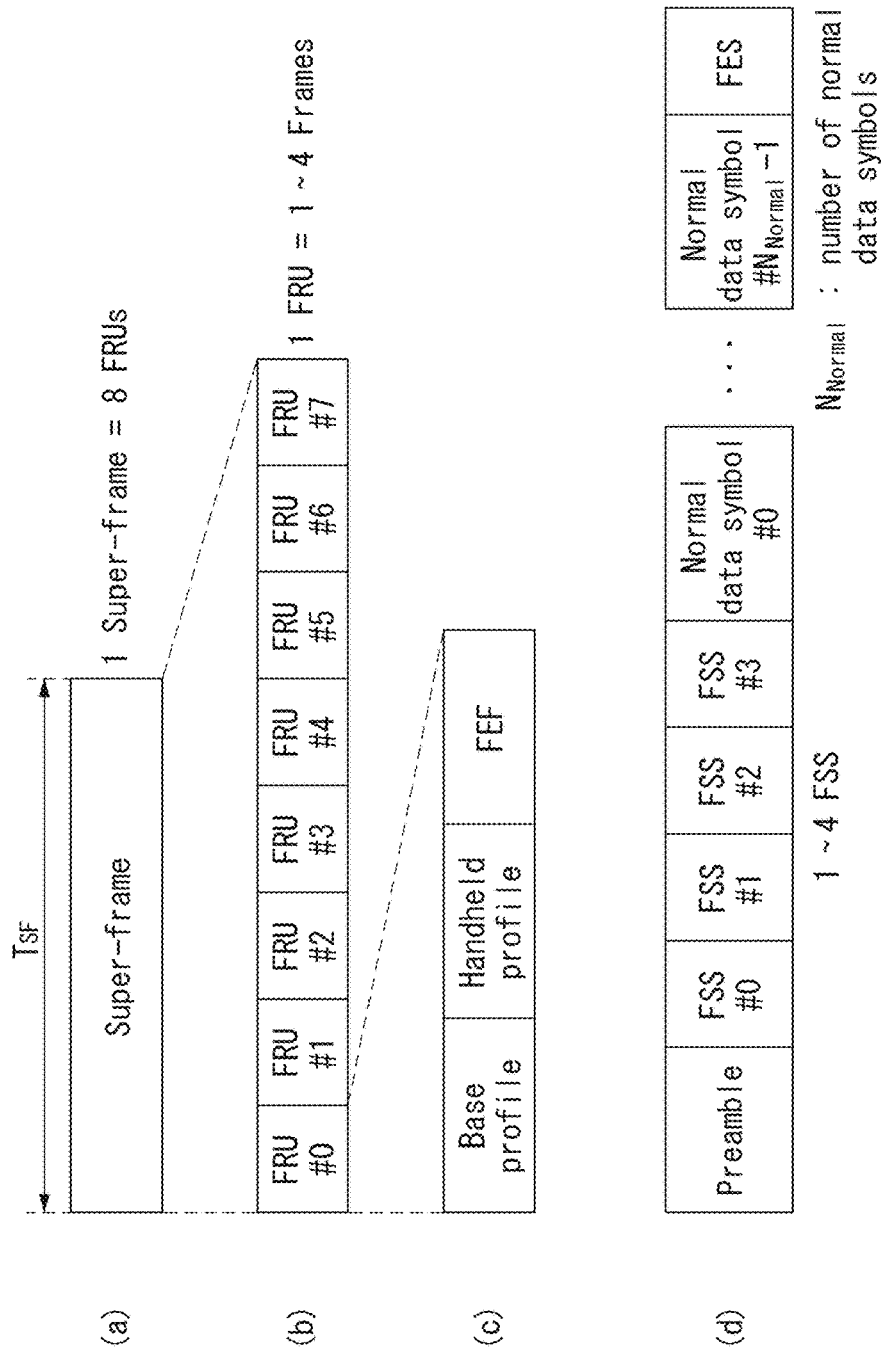
FIG. 10 illustrates a frame structure according to an exemplary embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figure 11:
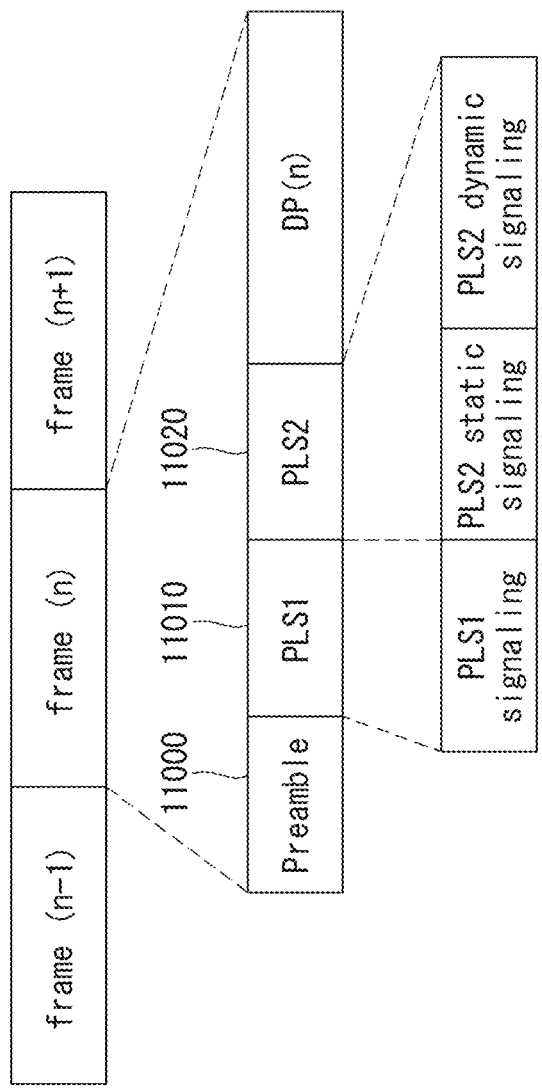
FIG. 11 illustrates a signaling layer structure of a frame structure according to an exemplary embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |

TABLE 8-continued

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| Value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Contents | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |

TABLE 11-continued

| Value | PLS2_MODE |
| --- | --- |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | PI | NTI |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |

TABLE 24-continued

| Value | ISSY mode |
|---|---|
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
| --- | --- | --- |
|  | 64K | 16K |
| Base | 13 bits | 15 bits |
| Handheld | — | 13 bits |
| Advanced | 13 bits | 15 bits |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

Figure 16:
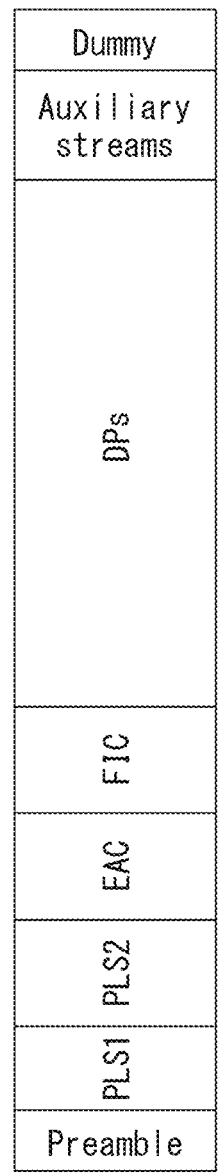
FIG. 16 illustrates a logical structure of a frame according to an exemplary embodiment of the present invention.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
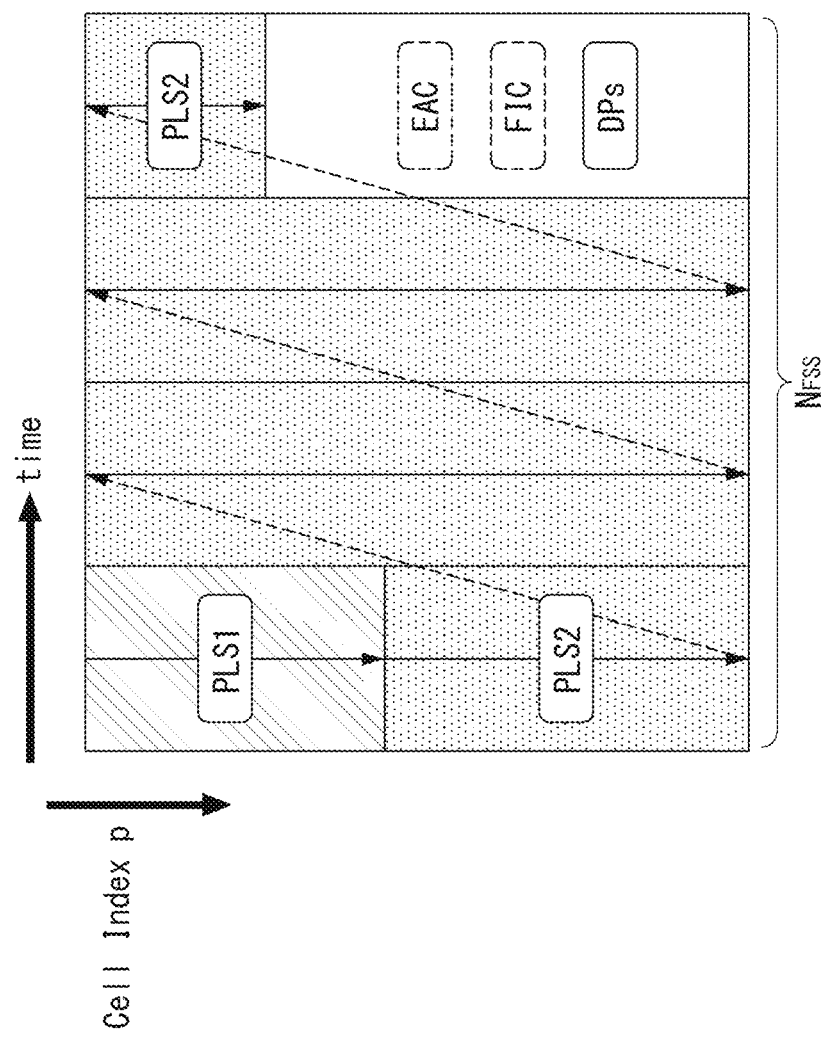
FIG. 17 illustrates physical layer signaling (PLS) mapping according to an exemplary embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
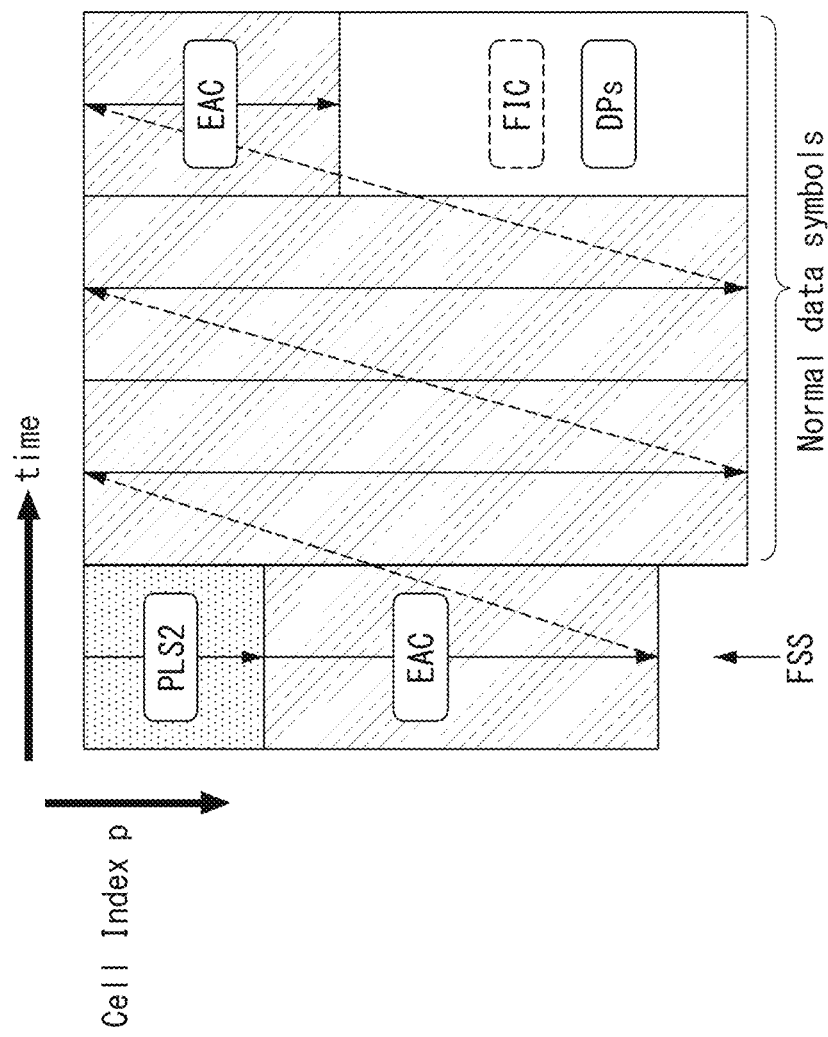
FIG. 18 illustrates emergency alert channel (EAC) mapping according to an exemplary embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
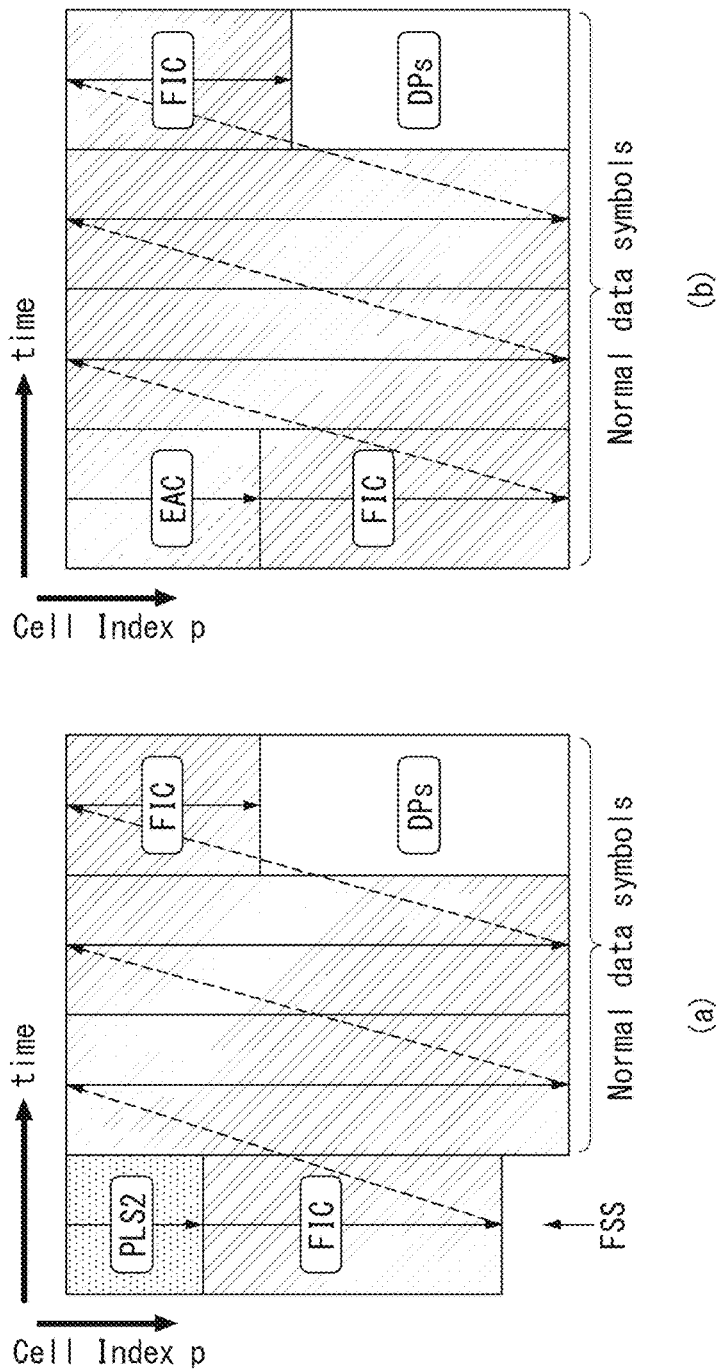
FIG. 19 illustrates fast information channel (FIC) mapping according to an exemplary embodiment of the present invention.

FIG. 19 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
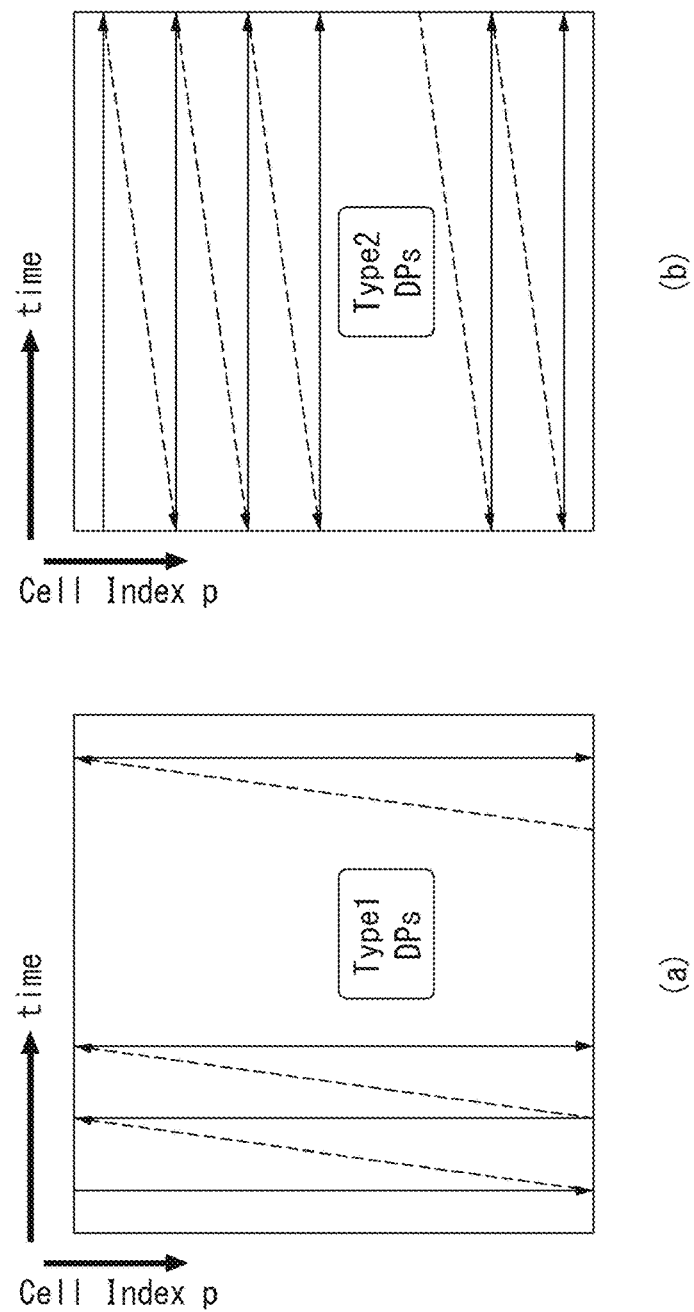
FIG. 20 illustrates a type of data pipe (DP) according to an exemplary embodiment of the present invention.

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP} \quad \text{[Math Figure 2]}$$

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
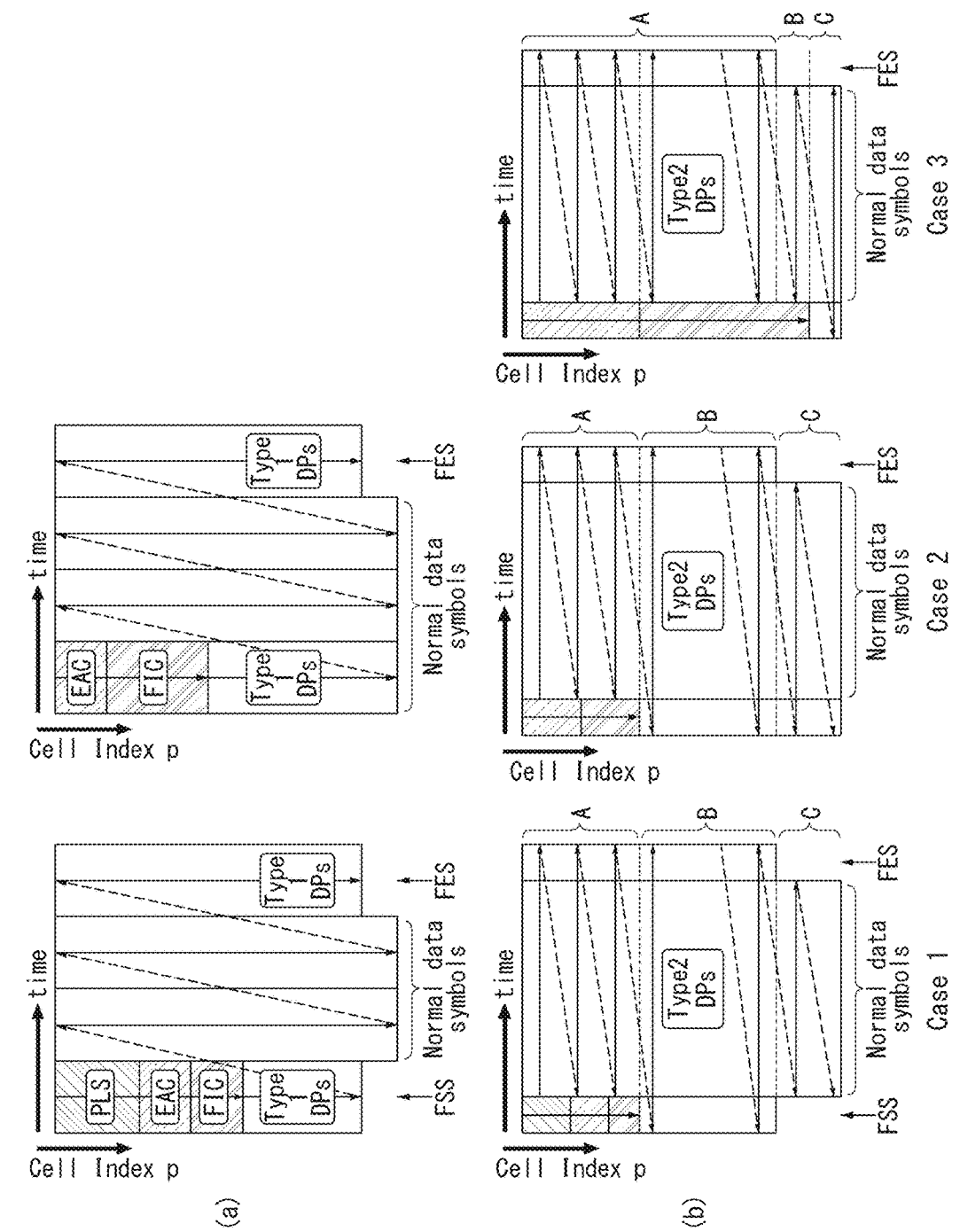
FIG. 21 illustrates a type of data pipe (DP) mapping according to an exemplary embodiment of the present invention.

FIG. 21 illustrates DP mapping according to an embodiment of the present invention.

shows an addressing of OFDM cells for mapping type 1 DPs and (b) shows an addressing of OFDM cells for mapping for type 2 DPs.

Addressing of OFDM cells for mapping Type 1 DPs (0, . . . , DDP1−1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2−1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
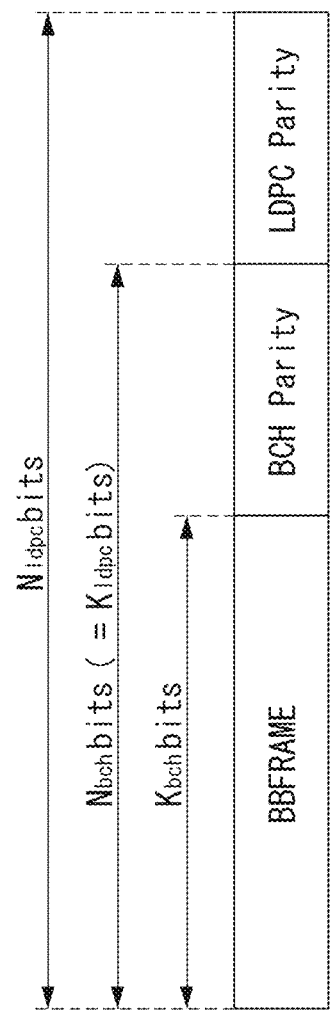
FIG. 22 illustrates forward error correction (FEC) structure according to an exemplary embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch-Kbch |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | Nldpc | Kldpc | Kbch | BCH error correction capability | Nbch-Kbch |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Math figure.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math Figure 3]

The parameters for long FECBLOCK and short FECBLOCK are given in the above table 28 and 29, respectively.

The detailed procedure to calculate Nldpc-Kldpc parity bits for long FECBLOCK, is as follows:

1) Initialize the parity bits, $$p_0 = p_1 = p_2 = \ldots = p_{N_{lpdc}-K_{lpdc}-1} = 0$$ [Math Figure 4]

2) Accumulate the first information bit—i0, at parity bit addresses specified in the first row of an addresses of parity check matrix. The details of addresses of parity check matrix will be described later. For example, for rate 13/15:

$$p_{983} = p_{983} \oplus i_0 \quad p_{2815} = p_{2815} \oplus i_0$$ [Math figure 5]

$$p_{4837} = p_{4837} \oplus i_0 \quad p_{4959} = p_{4989} \oplus i_0$$

$$p_{6138} = p_{6138} \oplus i_0 \quad p_{6458} = p_{6458} \oplus i_0$$

$$p_{6921} = p_{6921} \oplus i_0 \quad p_{6974} = p_{6974} \oplus i_0$$

$$p_{7572} = p_{7572} \oplus i_0 \quad p_{8260} = p_{8260} \oplus i_0$$

$$p_{8496} = p_{8496} \oplus i_0$$

3) For the next 359 information bits, is, s=1, 2, ..., 359 accumulate is at parity bit addresses using following Math figure.

$$\{x + (s \bmod 360) \times Q_{lpdc}\} \bmod (N_{ldpc} - K_{ldpc})$$ [Math Figure 6]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \quad p_{2839} = p_{2839} \oplus i_1$$ [Math figure 7]

$$p_{4861} = p_{4861} \oplus i_1 \quad p_{5013} = p_{5013} \oplus i_1$$

$$p_{6162} = p_{6162} \oplus i_1 \quad p_{6482} = p_{6482} \oplus i_1$$

$$p_{6945} = p_{6945} \oplus i_1 \quad p_{6998} = p_{6998} \oplus i_1$$

$$p_{7596} = p_{7596} \oplus i_1 \quad p_{8284} = p_{8284} \oplus i_1$$

$$p_{8520} = p_{8520} \oplus i_1$$

4) For the 361st information bit i360, the addresses of the parity bit accumulators are given in the second row of the addresses of parity check matrix. In a similar manner the addresses of the parity bit accumulators for the following 359 information bits is, s=361, 362, ..., 719 are obtained using the Math Figure 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1, 2, \ldots, N_{ldcp} - K_{ldpc} - 1$$ [Math Figure 8]

where final content of pi, i=0, 1, ... Nldpc-Kldpc-1 is equal to the parity bit pi.

TABLE 30

| Code Rate | Qldpc |
| --- | --- |
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
| --- | --- |
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
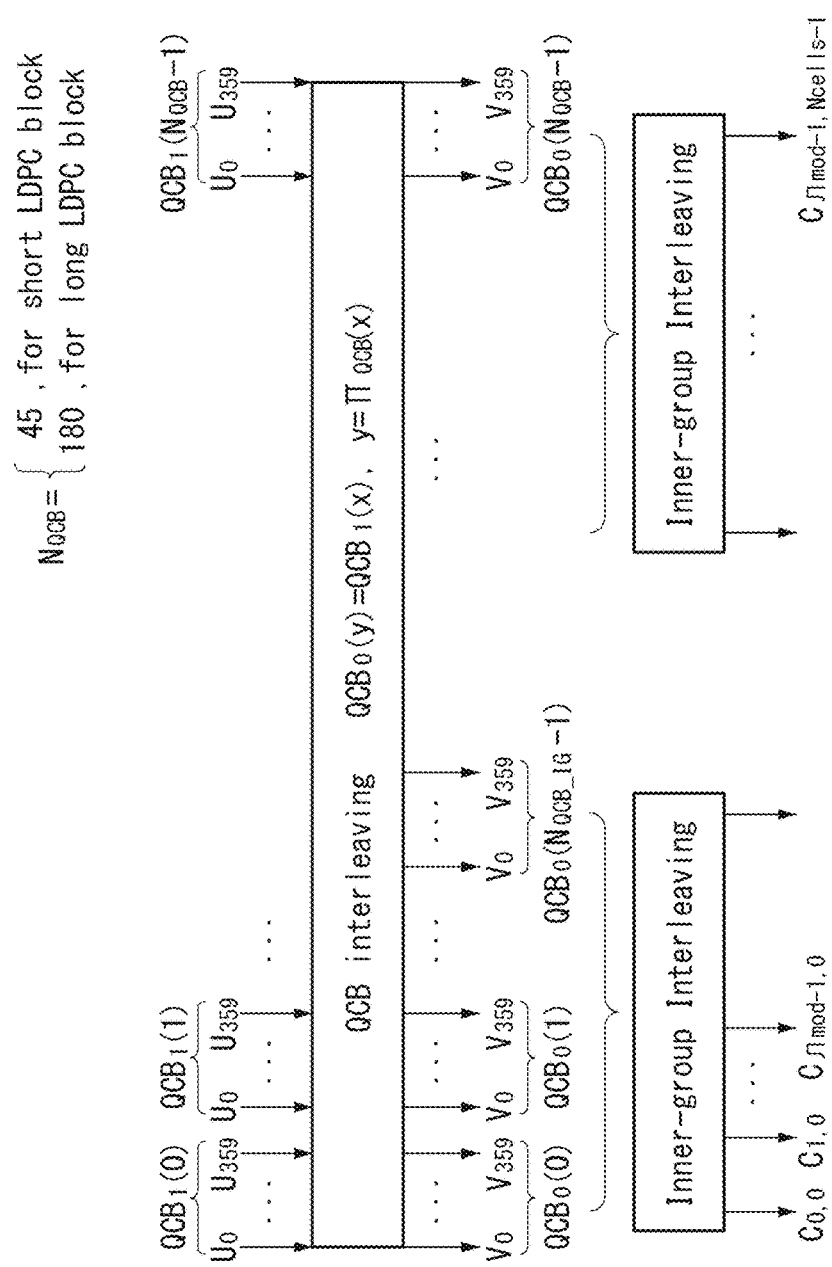
FIG. 23 illustrates bit interleaving according to an exemplary embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/η mod or 16200/η mod according to the FECBLOCK length. The QCB interleaving pattern is unique to each combination of modulation type and LDPC code rate.

After QCB interleaving, inner-group interleaving is performed according to modulation type and order (η mod) which is defined in the below table 32. The number of QC blocks for one inner-group, NQCB_IG, is also defined.

TABLE 32

| Modulation type | ηmod | NQCB_IG |
| --- | --- | --- |
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |

TABLE 32-continued

| Modulation type | ηmod | NQCB_IG |
| --- | --- | --- |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24:
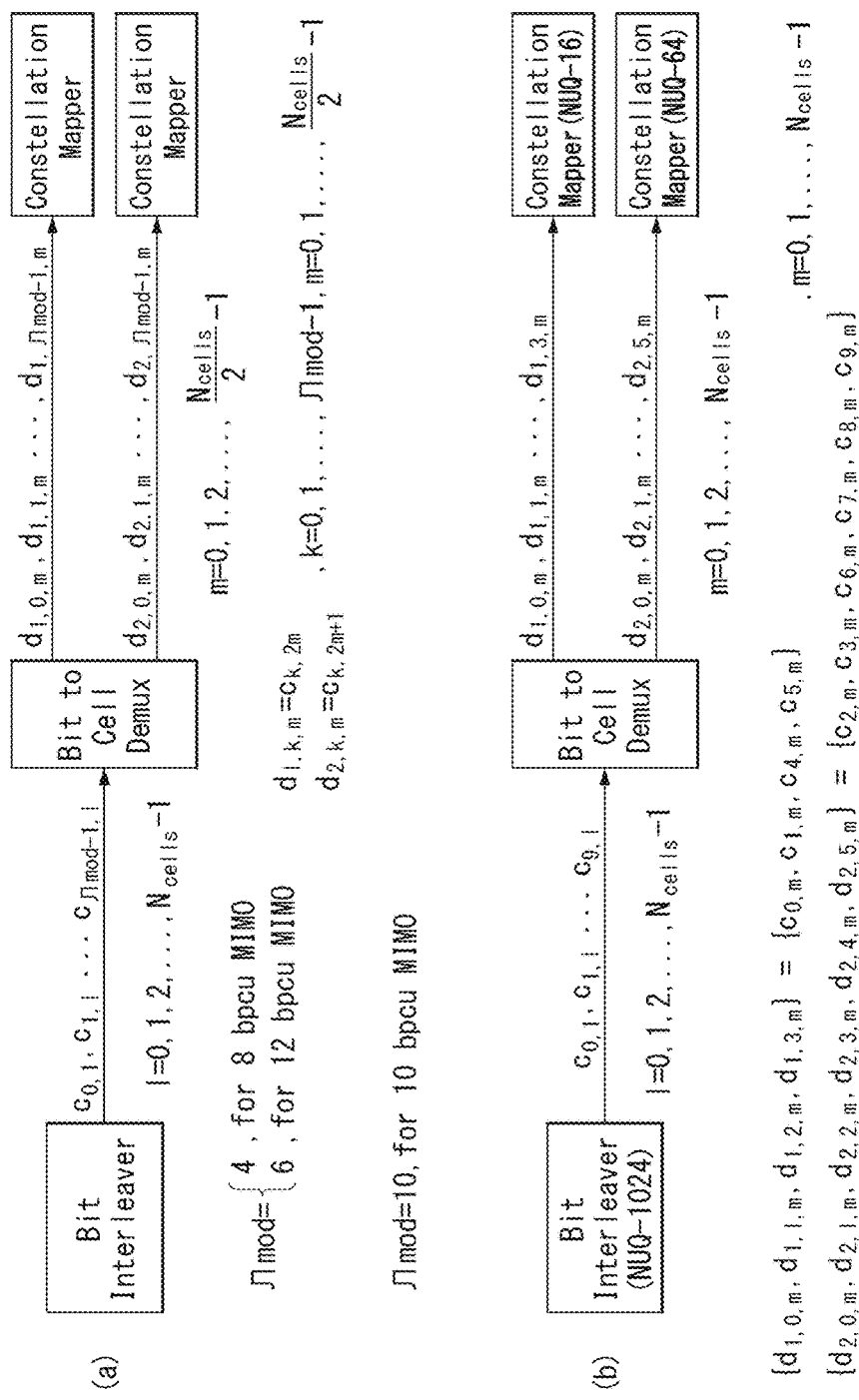
FIG. 24 illustrates cell-word demultiplexing according an exemplary embodiment of the present invention.

FIG. 24 illustrates a cell-word demultiplexing according to an embodiment of the present invention.

shows a cell-word demultiplexing for 8 and 12 bpcu MIMO and (b) shows a cell-word demultiplexing for 10 bpcu MIMO.

Each cell word (c0,1, c1,1, . . . , cη mod−1,1) of the bit interleaving output is demultiplexed into (d1,0,m, d1,1,m . . . , d1, η mod−1,m) and (d2,0,m, d2, 1,m . . . , d2, η mod−1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, . . . , c9,1) of the Bit Interleaver output is demultiplexed into (d1,0,m, d1,1,m . . . , d1,3,m) and (d2,0,m, d2,1,m . . . , d2,5,m), as shown in (b).

Figure 25:
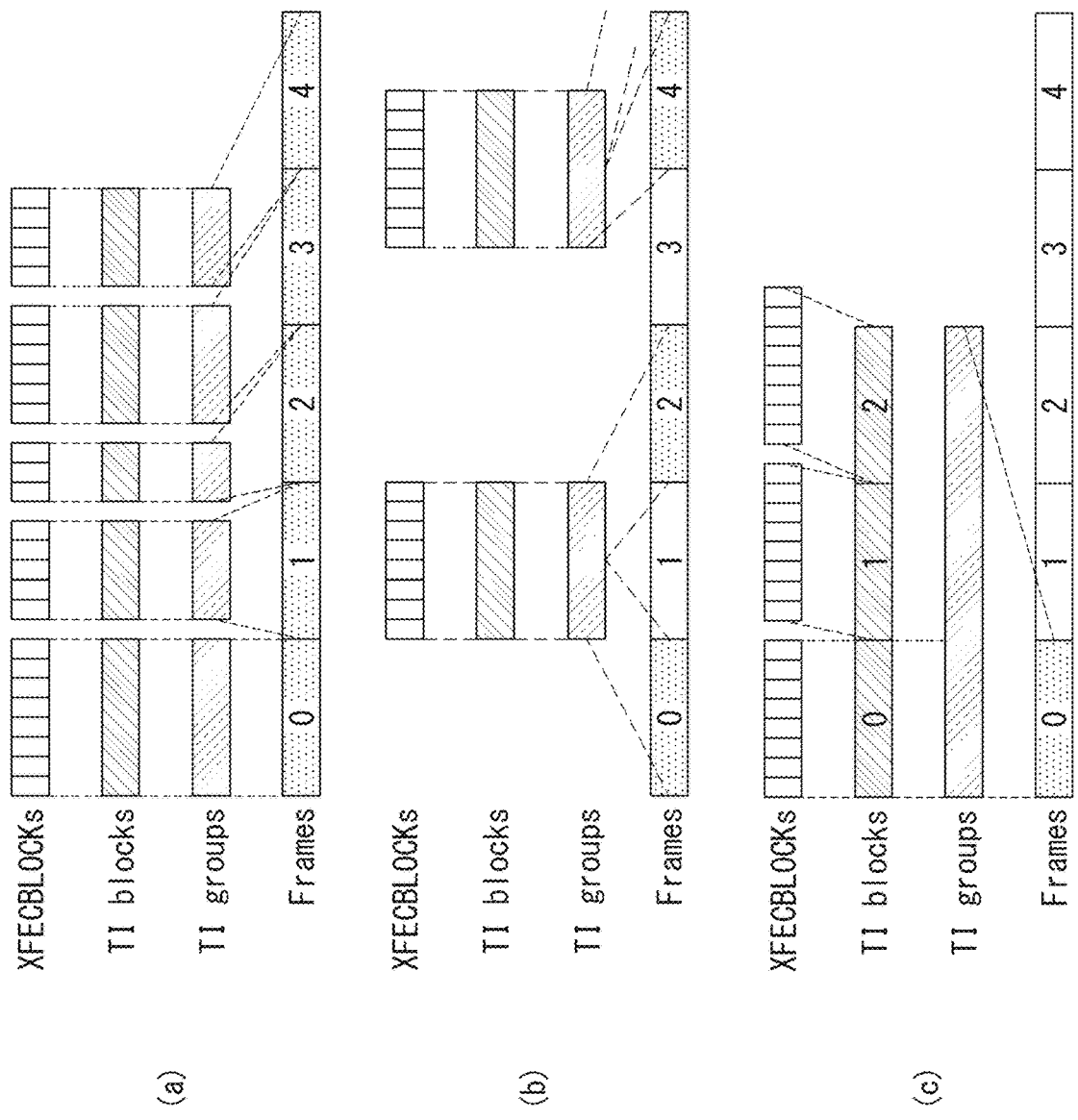
FIG. 25 illustrates time interleaving according to an exemplary embodiment of the present invention.

FIG. 25 illustrates a time interleaving according to an embodiment of the present invention.

to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks (NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Mode | Description |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1' (NTI = 1). |
| Option-2 | Each TI group contains one TI block and is mapped to more than one frame. (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while PI = 1. |

In each DP, the TI memory stores the input XFECBLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1}, \ldots,$$
$$d_{n,s,N_{xBLOCK\_TI}(n,s)-1,0}, \ldots, d_{n,s,N_{xBLOCK\_TI}(n,s)-1,N_{cells}-1}),$$

where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \ldots \text{encoding} \\ g_{n,s,r,q}, & \text{the output of } MIMO \text{ encoding} \end{cases}.$$

In addition, assume that output XFECBLOCKs from the time interleaver 5050 are defined as $$(h_{n,s,0}, h_{n,s,1}, \ldots h_{n,s,i} \ldots h_{n,s,N_{xBLOCK\_TI}(n,S) \times N_{cells}-1})$$

where $h_{n,s,i}$ is the ith output cell (for i=0, ..., $N_{xBLOCK\_TI}$(n,S)×$N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N=N_{cells}$ while the number of columns $N_c$ is equal to the number $N_{xBLOCK\_TI}$(n,s).

Figure 26:
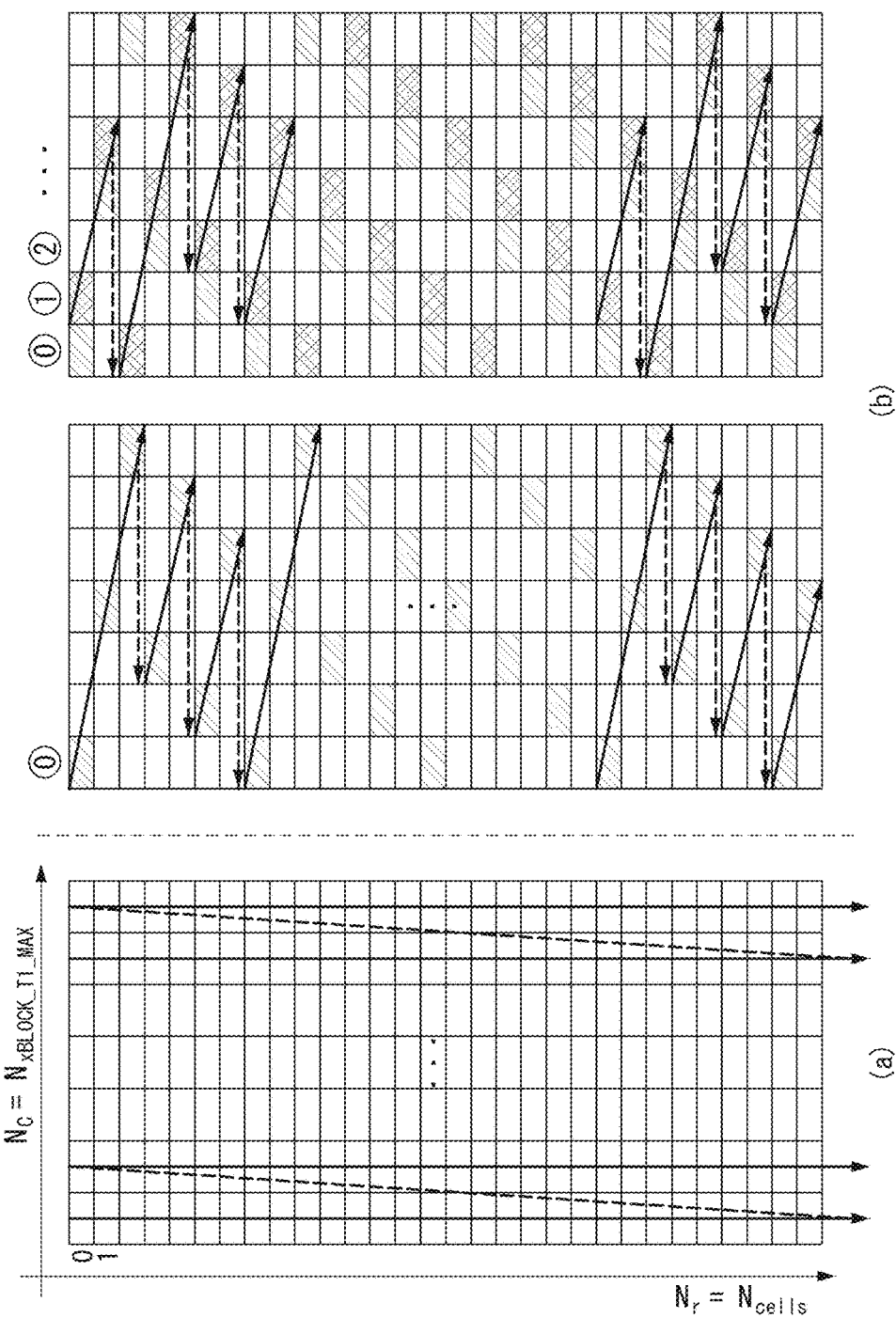
FIG. 26 illustrates a basic operation of a twisted row-column block interleaver according to an exemplary embodiment of the present invention.

FIG. 26 illustrates a basic operation of a twisted row-column block interleaver according to an exemplary embodiment of the present invention.

FIG. 26A illustrates a writing operation in a time interleaver and FIG. 26B illustrates a reading operation in the time interleaver. As illustrated in FIG. 26A, a first XFEC-BLOCK is written in a first column of a time interleaving memory in a column direction and a second XFECBLOCK is written in a next column, and such an operation is continued. In addition, in an interleaving array, a cell is read in a diagonal direction. As illustrated in FIG. 26B, while the diagonal reading is in progress from a first row (to a right side along the row starting from a leftmost column) to a last row, $N_r$ cells are read. In detail, when it is assumed that $z_{n,s,i}$ (i=0, ..., $N_rN_c$) is a time interleaving memory cell position to be sequentially read, the reading operation in the interleaving array is executed by calculating a row index $R_{n,s,i}$, a column index $C_{n,s,i}$, and associated twist parameter $T_{n,s,i}$ as shown in an equation given below.

$$\text{GENERATE}(R_{n,s,i}, C_{n,s,i}) = \quad \text{[Equation 9]}$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

Where, $S_{shift}$ is a common shift value for a diagonal reading process regardless of $N_{xBLOCK\_TI}$(n,s) and the shift value is decided by $N_{xBLOCK\_TI\_MAX}$ given in PLS2-STAT as shown in an equation given below.

[Equation 10]

$$\begin{cases} N'_{xBLOCK\_TI\_MAX} = N_{xBLOCK\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1 \end{cases},$$

$$S_{shift} = \frac{N'_{xBLOCK\_TI\_MAX} - 1}{2}$$

Consequently, the cell position to be read is calculated by a coordinate $z_{n,s,i} = N_r C_{n,s,i} + R_{n,s,i}$.

Figure 27:
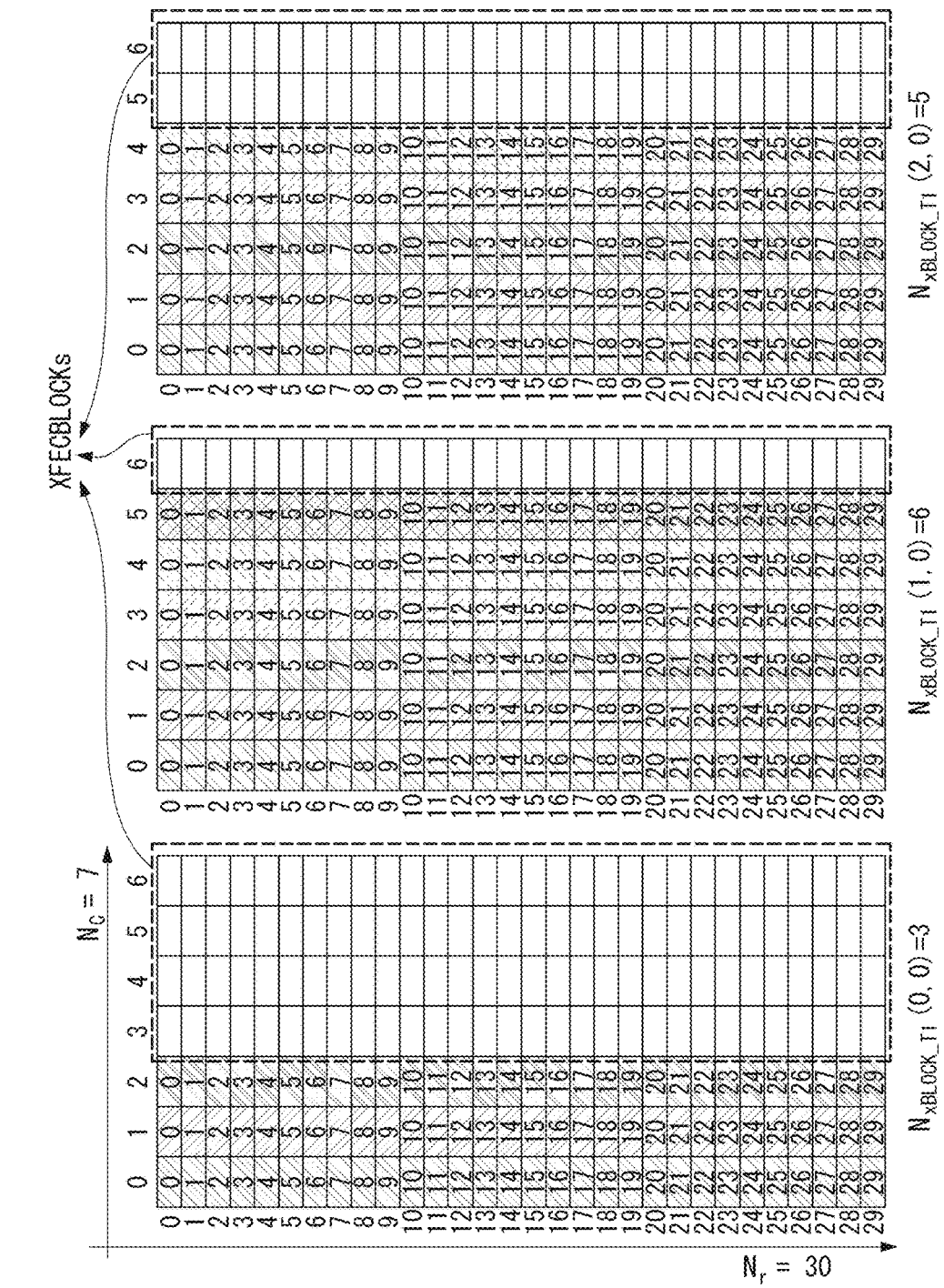
FIG. 27 illustrates an operation of a twisted row-column block interleaver according to another exemplary embodiment of the present invention.

FIG. 27 illustrates an operation of a twisted row-column block interleaver according to another exemplary embodiment of the present invention.

In more detail, FIG. 27 illustrates an interleaving array in the time interleaving memory for respective time interleaving groups including a virtual XFECBLOCK when $N_{xBLOCK\_TI}$(0,0)=3, $N_{xBLOCK\_TI}$(1,0)=6, and $N_{xBLOCK\_TI}$(2,0)=5.

A variable $N_{xBLOCK\_TI}(n,s)=N$, will be equal to or smaller than $N_{xBLOCK\_TI\_MAX}'$. Accordingly, in order for a receiver to achieve single memory interleaving regardless of $N_{xBLOCK\_TI}(n,s)$, the size of the interleaving array for the twisted row-column block interleaver is set to a size of $N_r \times N_c = N_{cells} \times N_{xBLOCK\_TI\_MAX}'$ by inserting the virtual XFECBLOCK into the time interleaving memory and a reading process is achieved as shown in an equation given below.

[Equation 11]
$$p = 0;$$
$$\text{for } i = 0; i < N_{cells}N'_{xBLOCK\_TI\_MAX}; i = i + 1$$
$$\{\text{GENERATE}(R_{n,s,i}, C_{n,s,i});$$
$$V_i = N_r C_{n,s,j} + R_{n,s,j}$$
$$\quad \text{if } V_i < N_{cells}N_{xBLOCK\_TI}(n, s)$$
$$\quad \{$$
$$\quad\quad Z_{n,s,p} = V_i; p = p + 1;$$
$$\quad \}$$
$$\}$$

The number of the time interleaving groups is set to 3. An option of the time interleaver is signaled in the PLS2-STAT by DP_TI_TYPE='0', DP_FRAME_INTERVAL='1', and DP_TI_LENGTH='1', that is, NTI=1, IJUMP=1, and PI=1. The number of respective XFECBLOCKs per time interleaving group, of which Ncells=30 is signaled in PLS2-DYN data by NxBLOCK_TI(0,0)=3, NxBLOCK_TI(1,0)=6, and NxBLOCK_TI(2,0)=5 of the respective XFECBLOCKs. The maximum number of XFECBLOCKs is signaled in the PLS2-STAT data by NxBLOCK_Group_MAX and this is continued to $\lfloor N_{xBLOCK\_Group\_MAX}/N_{TI}\rfloor = N_{xBLOCK\_TI\_MAX} = 6$.

Figure 28:
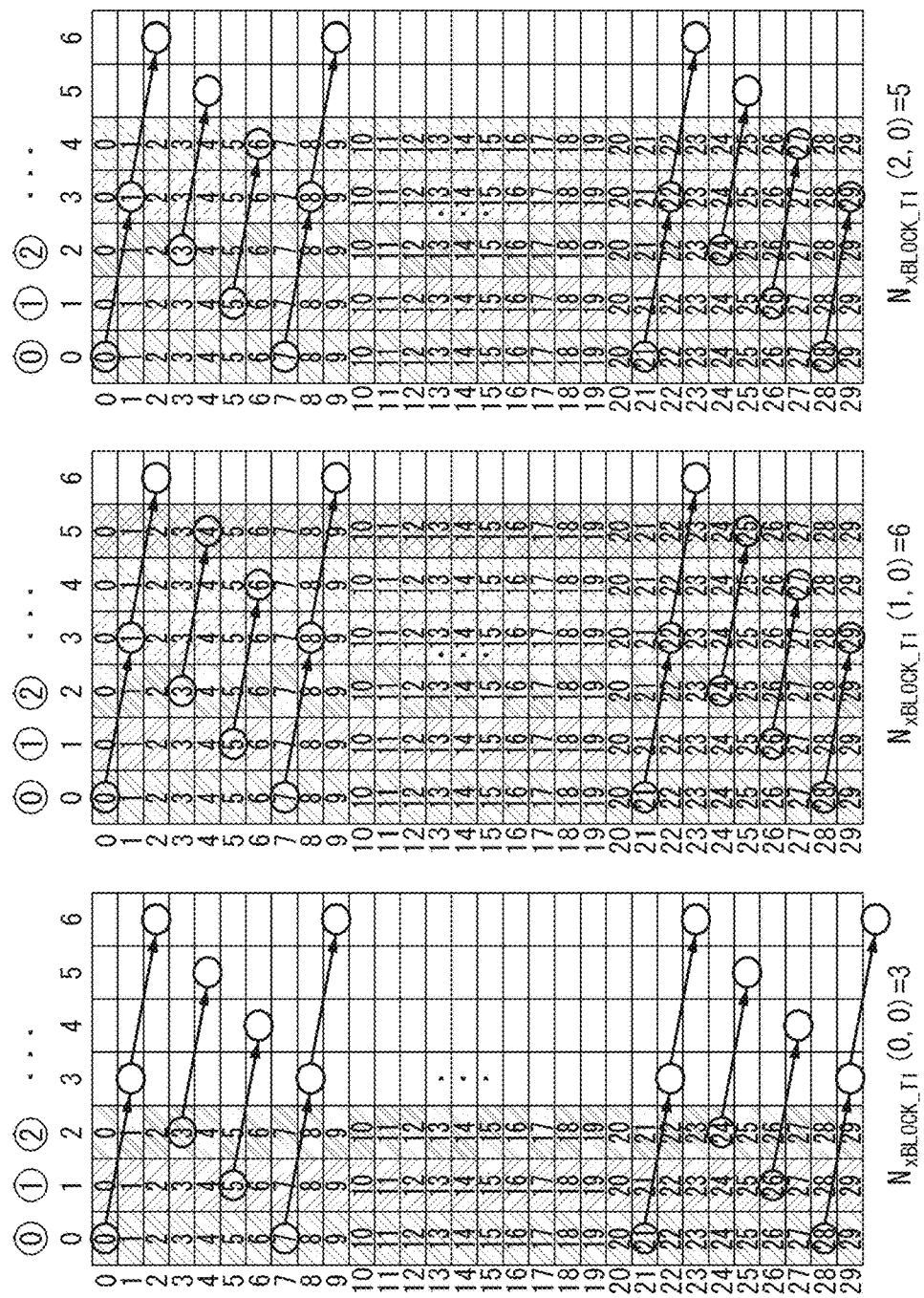
FIG. 28 illustrates a diagonal reading pattern of the twisted row-column block interleaver according to the exemplary embodiment of the present invention.

FIG. 28 illustrates a diagonal reading pattern of the twisted row-column block interleaver according to the exemplary embodiment of the present invention.

In more detail, FIG. 28 illustrates a diagonal reading pattern from respective interleaving arrays having parameters $N_{xBLOCK\_TI\_MAX}'=7$ and Sshift=(7−1)/2=3. In this case, during a reading process expressed by a pseudo code given above, when $V_i \geq N_{cells}N_{xBLOCK\_TI}(n,s)$, a value of Vi is omitted and a next calculation value of Vi is used.

Figure 29:
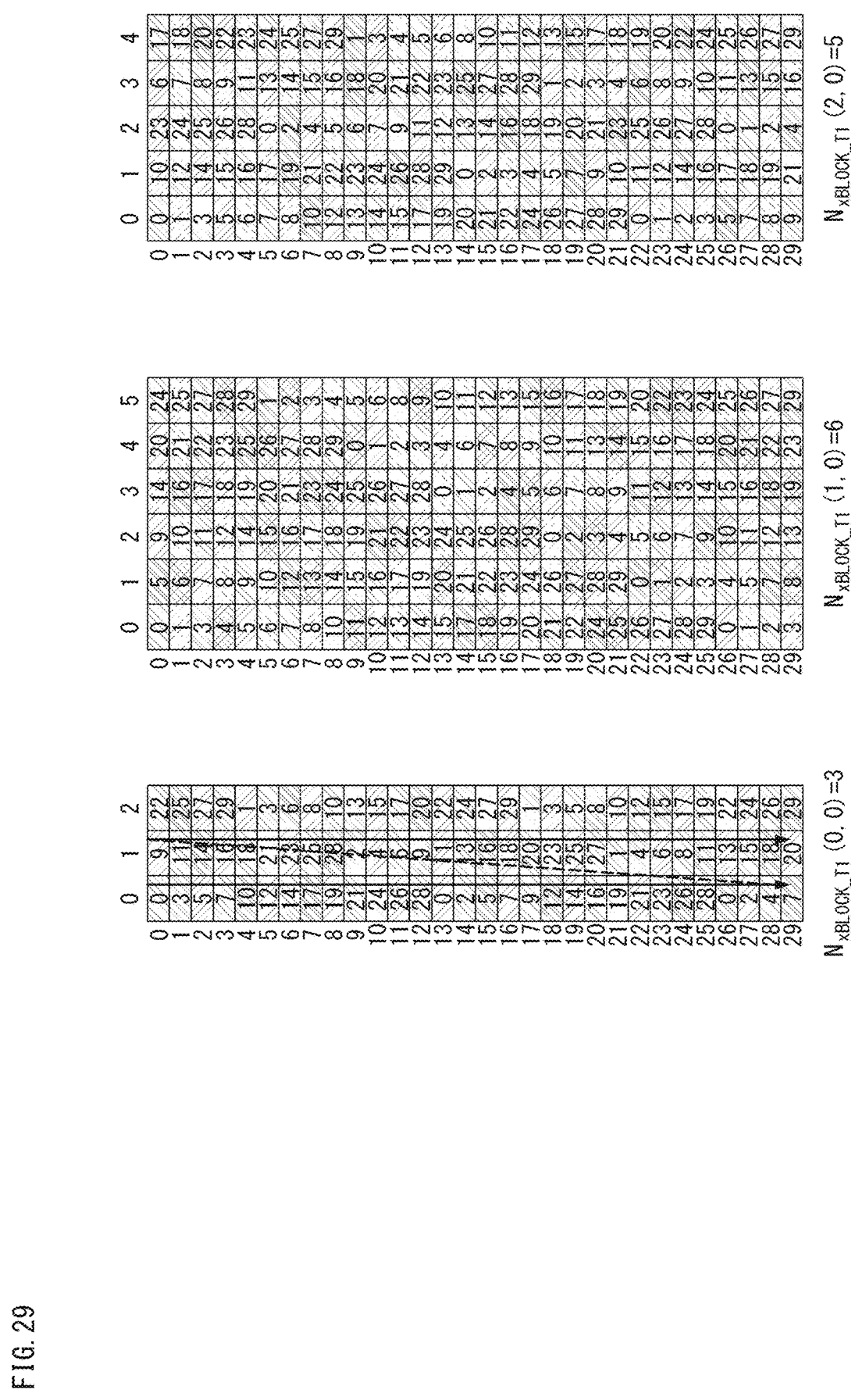

FIG. 29 illustrates XFECBLOCK interleaved from each interleaving array according to an exemplary embodiment of the present invention.

FIG. 29 illustrates XFECBLOCK interleaved from each interleaving array having parameters $N_{xBLOCK\_TI\_MAX}'=7$ and Sshift=3 according to an exemplary embodiment of the present invention.

Figure 30:
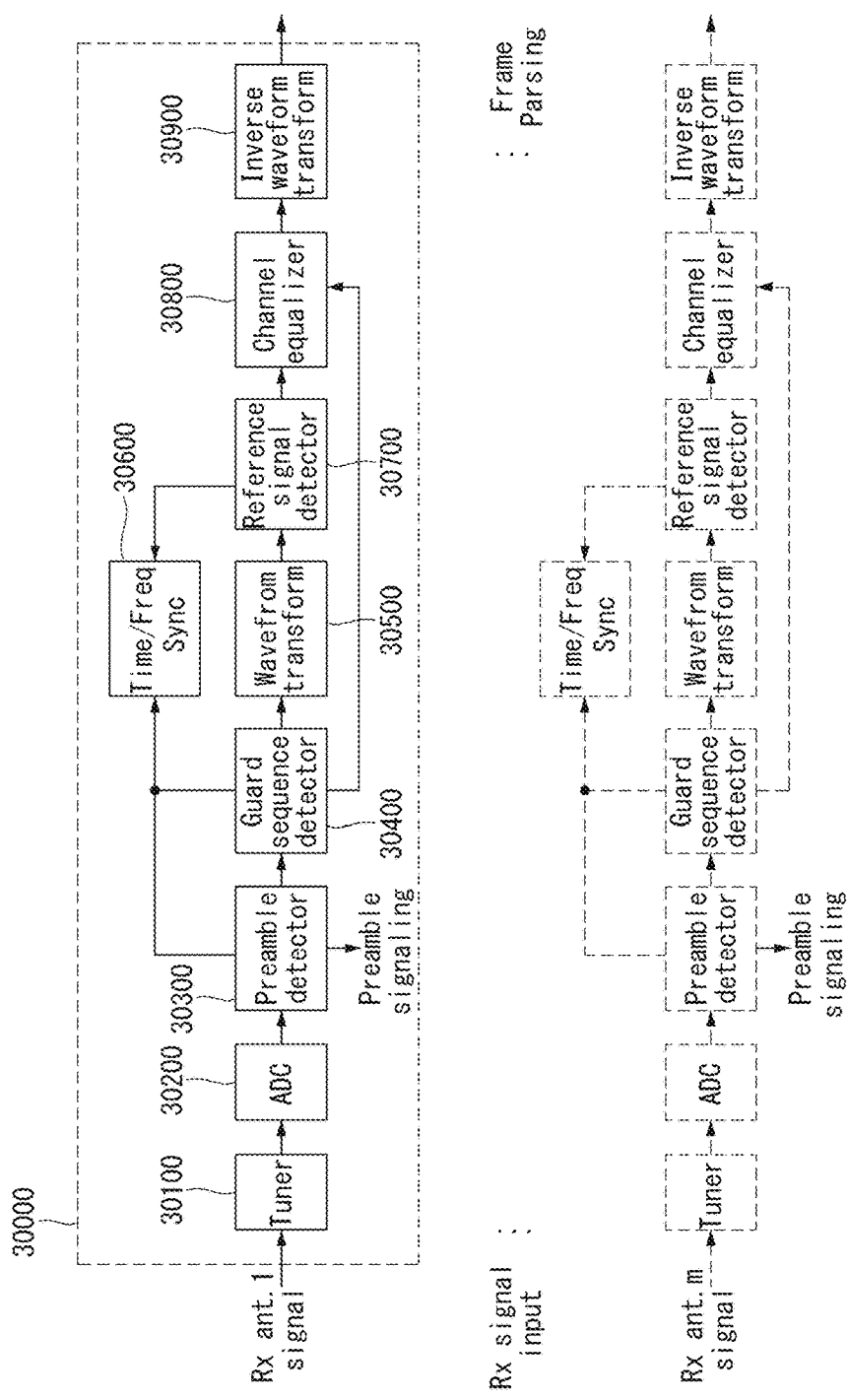
FIG. 30 is a diagram illustrating one example of a synchronization and demodulation module of FIG. 9.

FIG. 30 illustrates a synchronization and demodulation module according to an embodiment of the present invention.

The synchronization and demodulation module illustrated in FIG. 30 corresponds to the embodiment of the synchronization and demodulation module described in FIG. 9. Further, the synchronization and demodulation module illustrated in FIG. 30 may perform an inverse operation of the waveform generation module described in FIG. 9.

As illustrated in FIG. 30, the synchronization and demodulation module according to the embodiment of the present invention as an embodiment of a synchronization and demodulation module of a receiving apparatus using m Rx antennas may include m processing blocks for demodulating and outputting a signal input as long as m paths. All m processing blocks may perform the same processing procedure. Hereinafter, an operation of a first processing block 30000 among m processing blocks will be primarily described.

The first processing block 30000 may include a tuner 30100, an ADC block 30200, a preamble detector 30300, a guard sequence detector 30400, a waveform transform block 30500, a time/frequency synchronization block 30600, a reference signal detector 30700, a channel equalizer 30800, and an inverse waveform transform block 30900.

The tuner 30100 selects a desired frequency band and compensates a magnitude of a received signal to output the signal to the ADC block 30200.

The ADC block 30200 may transform the signal output from the tuner 30100 to a digital signal.

The preamble detector 30300 may detect a preamble (alternatively, a preamble signal or a preamble symbol) in order to verify whether the digital signal is a signal of a system corresponding to the receiving apparatus. In this case, the preamble detector 30300 may decode basic transmission parameters received through the preamble.

The guard sequence detector 30400 may detect a guard sequence in the digital signal. The time frequency synchronization block 30600 may perform time/frequency synchronization by using the detected guard sequence and the channel equalizer 30800 may estimate a channel through a sequence received/restored by using the detected guard sequence.

When inverse waveform transform is performed at a transmitting side, the waveform transform block 30500 may perform an inverse transform procedure to the inverse waveform transform. When a broadcast transmitting/receiving system according to the embodiment of the present invention a multi-carrier system, the waveform transform block 30500 may perform an FFT transform procedure. Further, in the case where the broadcast transmitting/receiving system according to the embodiment of the present invention is a single carrier system, when received signals in a time domain are used to be processed in a frequency domain or all of the received signals are processed in the time domain, the waveform transform block 30500 may not be used.

The time/frequency synchronization block 30600 may receive output data of the preamble detector 30300, the guard sequence detector 30400, and the reference signal detector 30700 and perform time synchronization and carrier frequency synchronization including guard sequence detection and block window positioning for a detected signal. In this case, the time/frequency synchronization block 30600 may feed back and use an output signal of the waveform transform block 30500 for frequency synchronization.

The reference signal detector 30700 may detect a received reference signal. Therefore, the receiving apparatus according to the embodiment of the present invention may perform synchronization or channel estimation.

The channel equalizer 30800 may estimate a transmission channel up to each receiving apparatus from each transmitting antenna from the guard sequence or the reference signal and perform channel equalization for each received data by using the estimated channel.

When the waveform transform block 30500 performs waveform transform in order to efficiently perform the synchronization and channel estimation/equalization, the inverse waveform transform block 30900 may serve to restore each received data to an original received data domain again. In the case where the broadcast transmitting/receiving system according to the embodiment of the present invention is the single carrier system, the waveform transform block 30500 may perform FFT in order to perform the synchronization/channel estimation/equalization in the frequency domain and the inverse waveform transform block 30900 performs IFFT for a signal of which channel equalization is completed to restore a transmitted data symbol. When the broadcast transmitting/receiving system according to the embodiment of the present invention is a multi-carrier system, the inverse waveform transform block 30900 may not be used.

Further, the aforementioned blocks may be omitted according to an intention of a designer or substituted by other blocks having a similar or the same function.

Figure 31:
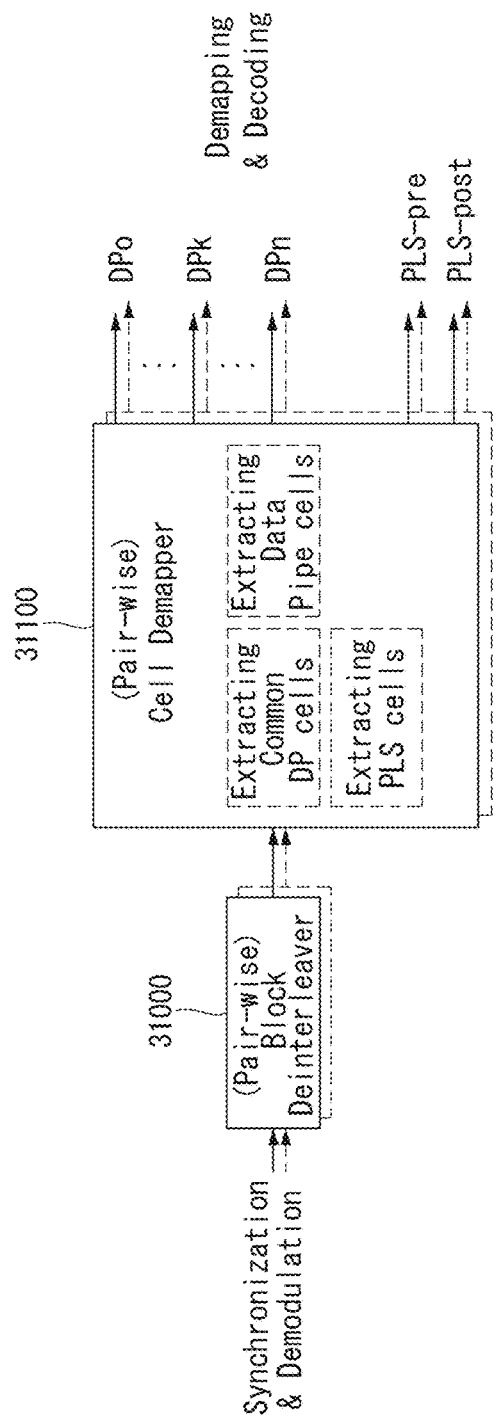
FIG. 31 is a diagram illustrating one example of a frame parsing module of FIG. 9.

FIG. 31 illustrates a frame parsing module according to an embodiment of the present invention.

The frame parsing module illustrated in FIG. 31 correspond to the embodiment of the frame parsing module described in FIG. 9.

As illustrated in FIG. 31, the frame parsing module according to the embodiment of the present invention may include at least one or more block deinterleavers 31000 and at least one or more cell demapper 31100.

The block deinterleaver 31000 may perform deinterleaving for data per each signal block with respect to data input into respective data paths of m receiving antennas and processed in the synchronization and demodulation module. In this case, as described in FIG. 8, when pair-wise interleaving is performed at the transmitting side, the block deinterleaver 31000 may process two consecutive data for each input path as one pair. Therefore, the block deinterleaver 31000 may output two consecutive output data even when deinterleaving the data. Further, the block deinterleaver 31000 performs an inverse procedure of the interleaving procedure performed at the transmitting side to output the data according to an original data sequence.

The cell demapper 31100 may extract cells corresponding to common data from a received signal frame, cells corresponding to a data pipe, and cells corresponding to PLS data. In case of need, the cell demapper 31100 merges data distributed and transmitted to a plurality of parts to output the merged data as one stream. Further, as described in FIG. 7, when two consecutive cell input data are processed as one pair to be mapped, the cell demapper 31100 may perform the pair-wise cell demapping of processing two consecutive input cells as one unit as an inverse procedure corresponding thereto.

Further, the cell demapper 31100 may extract and output all PLS signaling data received through a current frame as PLS-pre and PLS-post data, respectively.

The aforementioned blocks may be omitted according to an intention of a designer or substituted by other blocks having a similar or the same function.

Figure 32:
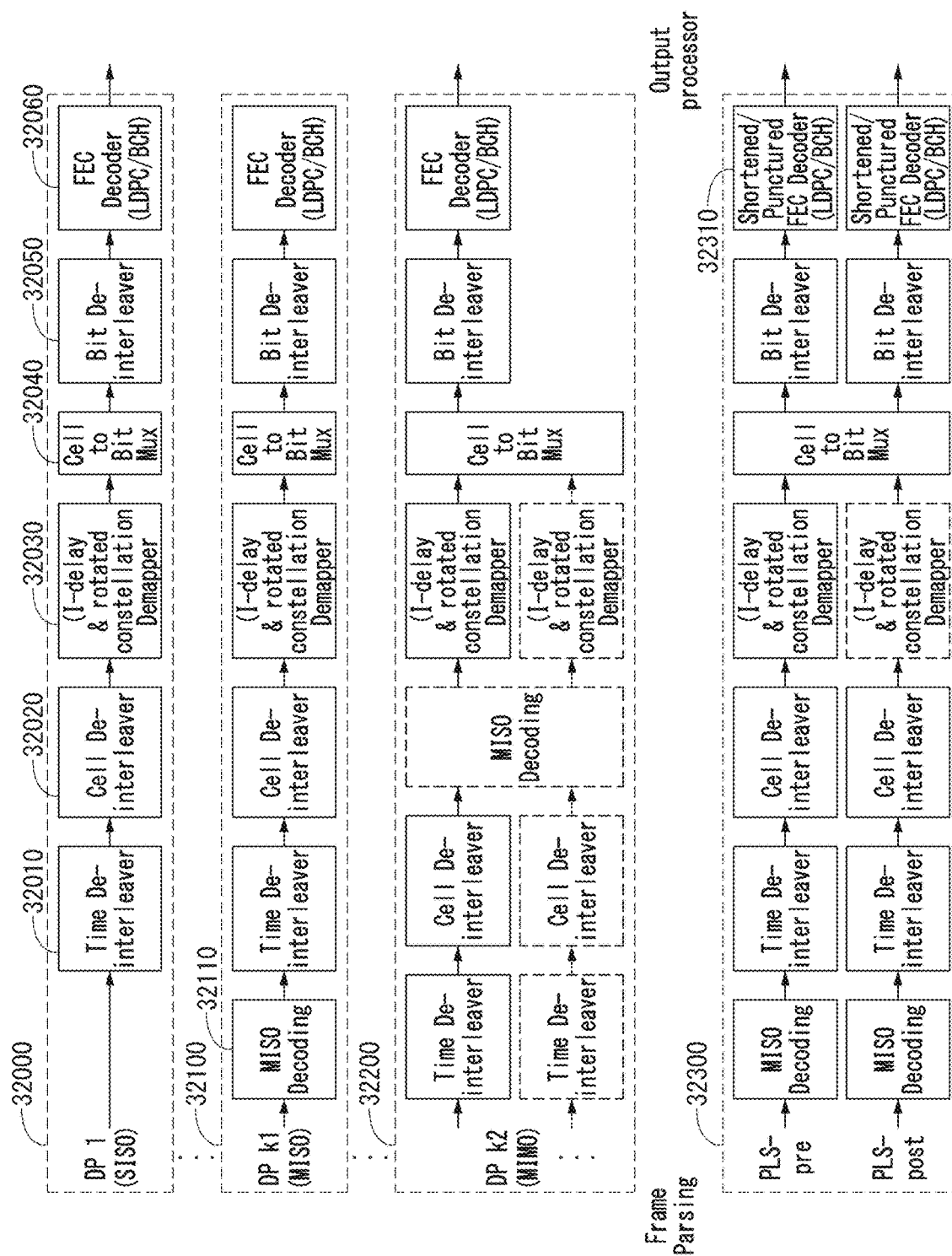
FIG. 32 is a diagram illustrating one example of a demapping and decoding module of FIG. 9.

FIG. 32 illustrates a demapping and decoding module according to an embodiment of the present invention.

The demapping and decoding module illustrated in FIG. 32 corresponds to the embodiment of the demapping and decoding module described in FIG. 9.

As described above, the coding and modulation module of the transmitting apparatus according to the embodiment of the present invention may independently apply and process SISO, MISO, and MIMO schemes to input data pipes for respective paths. Therefore, the demapping and decoding module illustrated in FIG. 32 may also include blocks for SISO, MISO, and MIMO-processing data output from a frame parser to correspond to the transmitting apparatus, respectively.

As illustrated in FIG. 32, the demapping and decoding module according to the embodiment of the present invention may include a first block 32000 for the SISO scheme, a second block 32100 for the MISO scheme, and a third block 32200 for the MIMO scheme, and a fourth block 32300 processing PLS pre/post information. The demapping and decoding module illustrated in FIG. 32 is just an embodiment and the demapping and decoding module may include only the first block 32000 and the fourth block 32300, only the second block 32100 and the fourth block 32300, and only the third block 32200 and the fourth block 32300 according to the intension of the designer. That is, the demapping and decoding module may include blocks for processing the respective data pipes similarly or differently according to the intention of the designer.

Hereinafter, each block will be described.

The first block 32000 as a block for SISO-processing the input data pipe may include a time de-interleaver block 32010, a cell de-interleaver block 32020, a constellation demapper block 32030, a cell to bit mux block 32040, a bit de-interleaver block 32050, and an FEC decoder block 32060.

The time de-interleaver block 32010 may perform an inverse procedure of a time interleaver block. That is, the time de-interleaver block 32010 may deinterleave an input symbol interleaved in the time domain to an original position.

The cell de-interleaver block 32020 may perform an inverse procedure of a cell interleaver block. That is, the cell de-interleaver block 32020 may deinterleave positions of cells spread in one FEC block to original positions.

The constellation demapper block 32030 may perform an inverse procedure of a constellation mapper block. That is, the constellation demapper block 32030 may demap an input signal of a symbol domain to data of a bit domain. Further, the constellation demapper block 32030 may output bit data decided by performing a hard decision and output a loglikelihood ratio (LLR) of each bit corresponding to a soft decision value or a probabilistic value. When the transmitting side applies a rotated constellation in order to acquire an additional diversity gain, the constellation demapper block 32030 may perform 2-dimensional LLR demapping corresponding to the rotated constellation. In this case, the constellation demapper 32030 may perform a calculation so that the transmitting apparatus compensates a delay value performed with respect to an I or Q component at the time of calculating the LLR.

The cell to bit mux block 32040 may perform an inverse procedure of a bit to cell demux block. That is, the cell to bit mux block 32040 may restore bit data mapped in a bit to cell demux block to an original bit stream form.

The bit de-interleaver block 32050 may perform an inverse procedure of a bit interleaver block. That is, the bit de-interleaver block 32050 may deinterleave the bit stream output in the cell to bit mux block 32040 according to an original sequence.

The FEC decoder block 32060 may perform an inverse procedure of an FEC encoder block. That is, the FEC decoder block 32060 may correct an error which occurs on a transmission channel by performing LDPC decoding and BCH decoding.

The second block 32100 as a block for MISO-processing the input data pipe may include the time de-interleaver block, the cell de-interleaver block, the constellation demapper block, the cell to bit mux block, the bit de-interleaver block, and the FEC decoder block similarly to the first block 32000 as illustrated in FIG. 32, but the second block 32100 is different from the first block 32000 in that the second block 32100 further includes an MISO decoding block

32110. Since the second block 32100 performs a procedure of the same role from the time deinterleaver up to the output similarly to the first block 32000, a description of the same blocks will be omitted.

The MISO decoding block 32110 may perform an inverse procedure of the MISO processing block. When the broadcast transmitting/receiving system according to the embodiment of the present invention is a system using STBC, the MISO decoding block 32110 may perform Alamouti decoding.

The third block 32200 as a block for MIMO-processing the input data pipe may include the time de-interleaver block, the cell de-interleaver block, the constellation demapper block, the cell to bit mux block, the bit de-interleaver block, and the FEC decoder block similarly to the second block 32100 as illustrated in FIG. 32, but the third block 32200 is different from the second block 32100 in that the third block 32200 further includes an MIMO decoding block 32210. Operations of the time de-interleaver, cell de-interleaver, constellation demapper, cell to bit mux, and bit de-interleaver blocks included in the third block 32200 may be different from operations and detailed functions of the corresponding blocks included in the first and second blocks 32000 and 32100, but the blocks included in the third block 32200 are the same as the blocks included in the first and second blocks in terms of basic roles.

The MIMO decoding block 32210 may receive output data of the cell deinterleaver as an input with respect to m receiving antenna input signal and perform MIMO decoding as an inverse procedure of the MIMO processing block. The MIMO decoding block 32210 may perform maximum likelihood decoding in order to perform maximum decoding performance or sphere decoding for reducing complexity. Alternatively, the MIMO decoding block 32210 performs MMSE detection or perform iterative decoding combinationally with the MMSE detection to secure improved decoding performance.

The fourth block 32300 as a block for processing PLS pre/post information may perform SISO or MISO decoding. The fourth block 32300 may perform an inverse procedure of the fourth block.

The operations of the time de-interleaver, cell de-interleaver, constellation demapper, cell to bit mux, and bit de-interleaver blocks included in the fourth block 32300 may be different from operations and detailed functions of the corresponding blocks included in the first to third blocks 32000 to 32200, but the blocks included in the fourth block 32300 are the same as the blocks included in the first to third blocks in terms of basic roles.

A shortened/punctured FEC decoder 32310 may perform an inverse procedure of the shortened/punctured FEC encoder block. That is, the shortened/punctured FEC decoder 32310 may perform de-shortening and de-puncturing, and thereafter, FEC decoding data received while being shortened/punctured according to the length of the PLS data. In this case, since the FEC decoder used in the data pipe may be similarly used even in the PLS, separate FEC decoder hardware for only the PLS is not required, and as a result, system design is easy and efficient coding is available.

The aforementioned blocks may be omitted according to an intention of a designer or substituted by other blocks having a similar or the same function.

Consequently, as illustrated in FIG. 32, the demapping and decoding module according to the embodiment of the present invention may output to the output processor the data pipe and the PLS information processed for each path.

Figure 33:
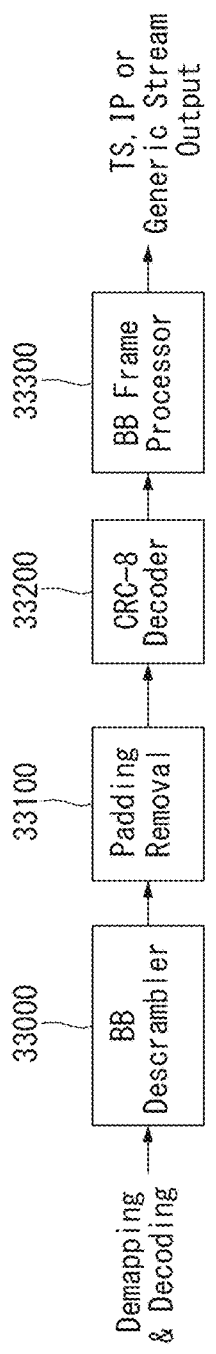
FIG. 33 is a diagram illustrating one example of one example of an output processor of FIG. 9.
Figure 34:
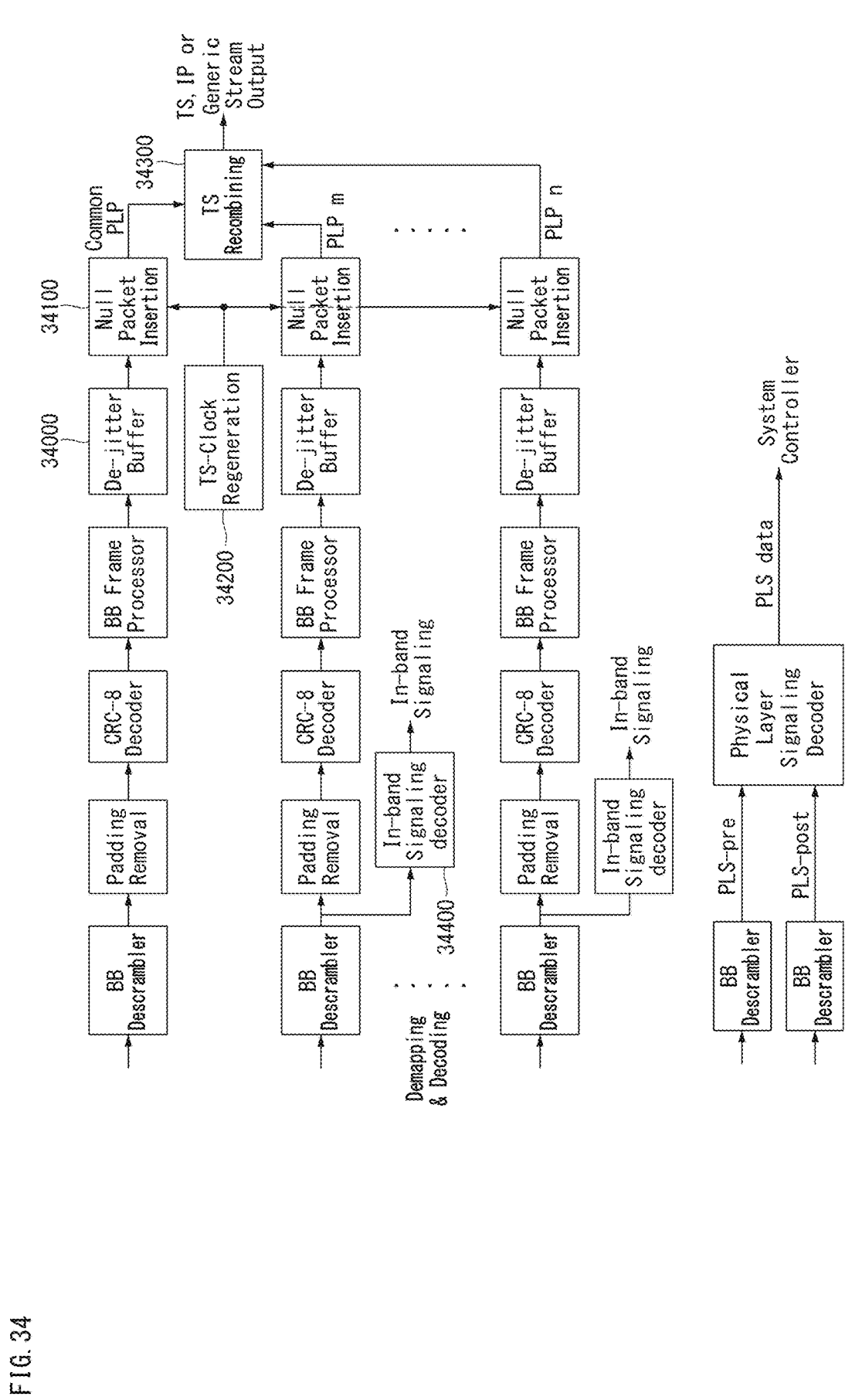
FIG. 34 is a diagram illustrating another example of the output processor of FIG. 9.

FIGS. 33 and 34 illustrate an output processor according to an embodiment of the present invention.

FIG. 33 illustrates an output processor according to an embodiment of the present invention.

The output processor illustrated in FIG. 33 corresponds to the embodiment of the output processor described in FIG. 9. Further, the output processor illustrated in FIG. 33 which is used to receive a single data pipe output from the demapping and decoding module and output a single output stream may perform an inverse operation of the input formatting module.

The output processor of FIG. 33 implements functions, processes, and/or methods proposed in FIGS. 50, 51, and 53 to be described below.

The output processor illustrated in FIG. 33 may include a BB Descrambler 33000, a padding removable block 33100, a CRC-8 decoder block 33200, and a BB frame processor block 33300.

The BB Descrambler block 33000 generates the same PRBS as used at the transmitting side with respect to an input bit stream and XOR-operates the PRBS and the bit stream to perform descrambling.

The padding removable block 33100 may remove a padding bit inserted by the transmitting side as necessary.

The CRC-8 decoder block 33200 perform CRC decoding of the bit stream received from the padding removable block 33100 to check a block error.

The BB frame processor block 33300 may decode information transmitted to the BB frame header and restore an MP3G-TS, an IP stream (v4 or v6), or a generic stream.

The aforementioned blocks may be omitted according to the intention of the designer or substituted by other blocks having a similar or the same function.

FIG. 34 illustrates an output processor according to another embodiment of the present invention.

The output processor illustrated in FIG. 34 corresponds to the embodiment of the output processor described in FIG. 9. Further, the output processor illustrated in FIG. 34 corresponds to the case of receiving multiple data pipes output from the demapping and decoding module. Decoding the multiple data pipes may include the case of merging common data which may be commonly applied to a plurality of data pipes and a data pipe associated with the common data and decoding the merged common data and data pipe or the case in which the receiving apparatus simultaneously decodes several services or service components (including a scalable video service).

The output processor illustrated in FIG. 34 may include the BB descrambler block, the padding removable block, the CRC-8 decoder block, and the BB frame processor block 33300 similarly to the output processor.

The output processor of FIG. 34 implements functions, processes, and/or methods proposed in FIGS. 50, 51, and 53 to be described below.

The respective blocks may be different from the blocks described in FIG. 33 in terms of the operations and the detailed operations, but the respective blocks are the same as the blocks of FIG. 33 in terms of the basic role.

A de-jitter buffer block 34000 included in the output processor illustrated in FIG. 34 may compensate a delay arbitrarily inserted at the transmitting side according to a restored time to output (TTO) parameter for synchronizing the multiple data pipes.

Further, a null packet insertion block 34100 may restore a null packet removed in the stream by referring to restored deleted null packet (DNP) information and output the common data.

A TS clock regeneration block 34200 may restore detailed time synchronization of an output packet based on ISCR—input stream time reference information.

A TS recombining block 34300 recombines the common data output from the null packet insertion block 34100 and the data pipes associated with the common data to restore the recombined common data and data pipes to the original MPEG-TS, IP stream (v4 or v6), or generic stream and output the restored MPEG-TS, IP stream (v4 or v6), or generic stream. The TTO, DNP, and ISCR information may be all acquired through the BB frame header.

An in-band signaling decoder block 34400 may restore and output in-band physical layer signaling information transmitted through a padding bit field in each FEC frame of the data pipe.

The output processor illustrated in FIG. 34 performs BB descrambling PLS-pre information and PLS-post information input according to the PLS-pre path and the PLS-post path, respectively and decodes the descrambled data to restore the original PLS data. The restored PLS data may transferred to the system controller in the receiving apparatus and the system controller may provide a required parameter to the synchronization and demodulation module, the frame parsing module, the demapping and decoding module, and the output processor module in the receiving apparatus.

The aforementioned blocks may be omitted according to the intention of the designer or substituted by other blocks having a similar or the same function.

Figure 35:
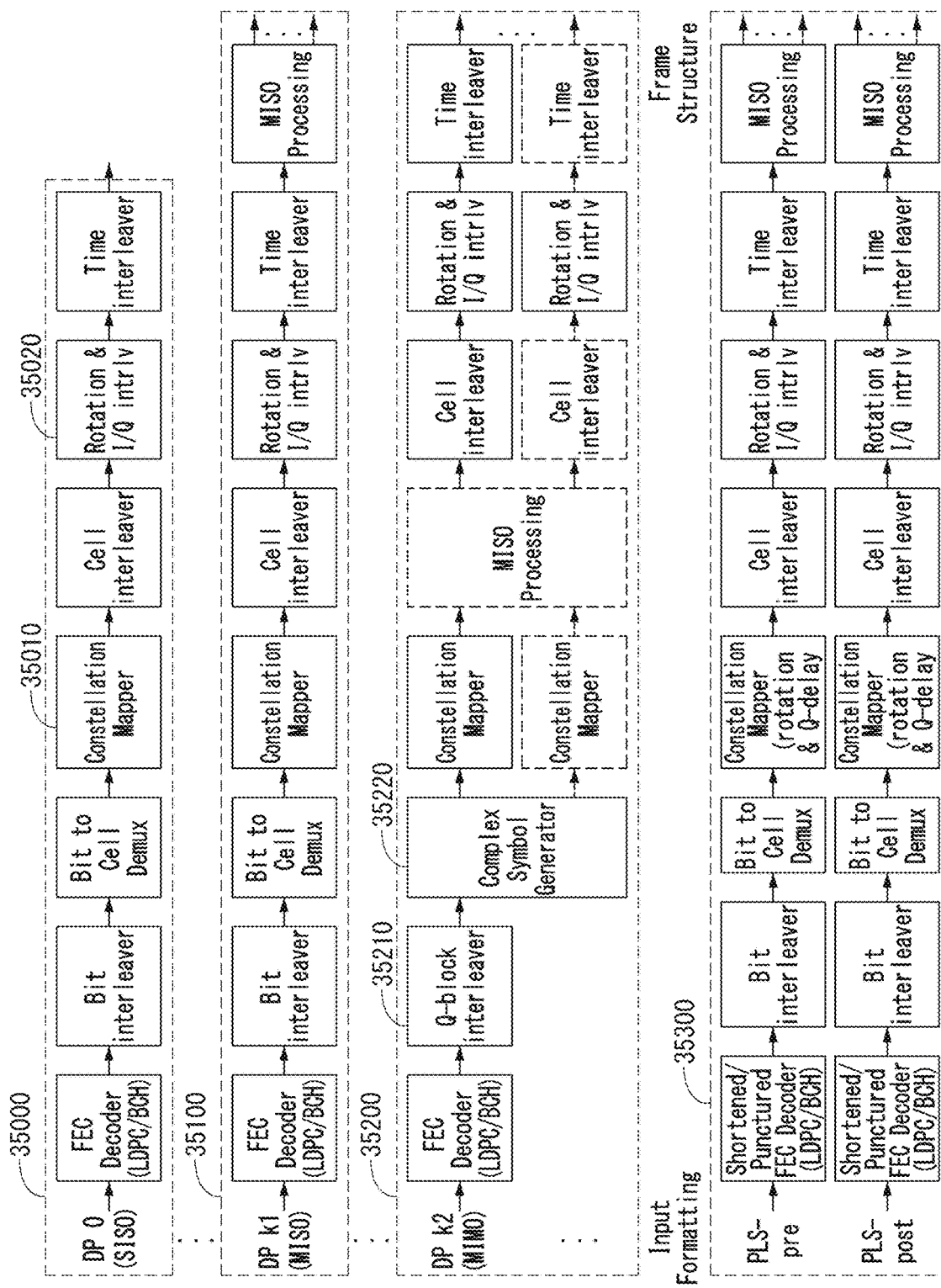
FIG. 35 illustrates a coding and modulation module according to another exemplary embodiment of the present invention.

FIG. 35 illustrates a coding and modulation module according to another embodiment of the present invention.

The coding and modulation module illustrated in FIG. 35 may include a first block 35000 for the SISO scheme, a second block 35100 for the MISO scheme, and a third block 35200 for the MIMO scheme, and a fourth block 35300 for processing PLS pre/post information in order to control QoS for each service or service component transmitted through each data pipe. Further, the coding and modulation module according to the embodiment of the present invention may include blocks for similarly or differently processing the respective data pipes according to the intention of the designer as described above. The first to fourth blocks 35000 to 35300 illustrated in FIG. 35 may include substantially the same blocks as the first to fourth blocks.

However, the first to fourth blocks 35000 to 35300 are different from the aforementioned first to fourth blocks in that a function of a constellation mapper block 35010 included in the first to third blocks 35000 to 35200 is different from that of the constellation mapper block included in the first to third blocks, and a rotation and I/O interleaver block 35020 is included between the cell interleaver and the time interleaver of the first to fourth blocks 35000 to 35300, and a configuration of the third block 35200 for the MIMO scheme is different from that of the third block for the MIMO scheme.

The constellation demapper block 35010 illustrated in FIG. 35 may map an input bit word to a complex symbol.

The constellation mapper block 35010 illustrated in FIG. 35 may be commonly applied to the first to third blocks 35000 to 35200 as described above.

The rotation and I/O interleaver block 35020 independently interleaves in-phase and quadrature-phase components of respective complex symbols of cell-interleaved data output from the cell interleaver to output the interleaved components by the unit of the symbol. The number of input data and output symbols of the rotation and I/O interleaver block 35020 is two or more and may be changed according to the intention of the designer. Further, the rotation and I/O interleaver block 35020 may not interleave the in-phase components.

The rotation and I/O interleaver block 35020 may be commonly applied to the first to fourth blocks 35000 to 35300 as described above. In this case, whether the rotation and I/O interleaver block 35020 is applied to the fourth block 35300 for processing the PLS pre/post information may be signaled through the aforementioned preamble.

The third block 35200 for the MIMO scheme may include a Q-block interleaver block 35210 and a complex symbol generator block 35220 as illustrated in FIG. 35.

The Q-block interleaver block 35210 may perform permutation of a parity part of the FEC-encoded FEC block received from the FEC encoder. Therefore, a parity part of an LDPC H matrix may be made in a cyclic structure similarly to an information part. The Q-block interleaver block 35210 permutates sequences of bit blocks having a Q size in the LDPC H matrix and thereafter, performs row-column block interleaving of the bit blocks to generate and output a final bit stream.

The complex symbol generator block 35220 may receive the bit streams output from the Q-block interleaver block 35210 and map the received bit streams to the complex symbol and output the mapped bit streams and complex symbol. In this case, the complex symbol generator block 35220 may output the symbols through at least two paths. This may be changed according to the intension of the designer.

The aforementioned blocks may be omitted according to the intention of the designer or substituted by other blocks having a similar or the same function.

Consequently, as illustrated in FIG. 35, the coding and modulation according to another embodiment of the present invention may output the data pipe, the PLS-pre information, and the PLS-post information processed for each path to a frame structure module.

Figure 36:
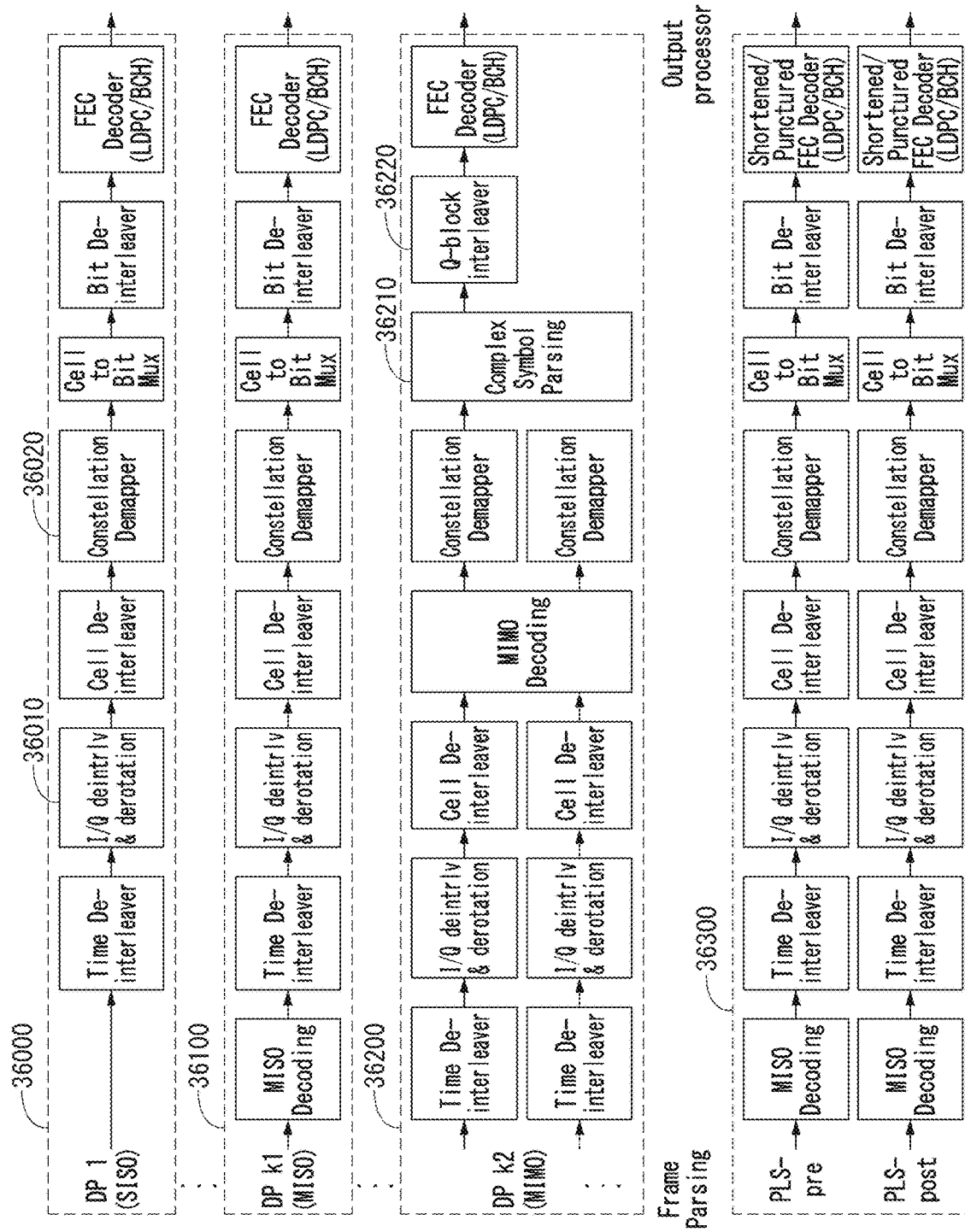
FIG. 36 is a diagram illustrating a demapping and decoding module according to another exemplary embodiment of the present invention.

FIG. 36 illustrates a demapping and decoding module according to another embodiment of the present invention.

The demapping and decoding module illustrated in FIG. 36 corresponds to another embodiment of the demapping and decoding module described in FIGS. 9 and 32. Further, the demapping and decoding module illustrated in FIG. 36 may perform an inverse operation of the coding and modulation module described in FIG. 35.

As illustrated in FIG. 36, the demapping and decoding module according to another embodiment of the present invention may include a first block 36000 for the SISO scheme, a second block 36100 for the MISO scheme, a third block 36200 for the MIMO scheme, and a fourth block 36300 for processing the PLS pre/post information. Further, the demapping and decoding module according to the embodiment of the present invention may include blocks for similarly or differently processing the respective data pipes according to the intention of the designer as described above. The first to fourth blocks 36000 to 36300 illustrated in FIG. 36 may include substantially the same blocks as the first to fourth blocks 32000 to 32300 described in FIG. 32.

However, the first to fourth blocks 36000 to 36300 are different from the aforementioned first to fourth blocks in that an I/Q deinterleaver and derotation block 36010 is included between the time deinterleaver and the cell deinterleaver, a function a constellation demapper block 36020 included in the first to third blocks 36000 to 36200 is different from the function of the constellation mapper 42030 included in the first to third blocks 32000 to 32200 of FIG. 32, and a configuration of the third block 36200 for the MIMO scheme is different from that of the third block 36200 for the MIMO scheme illustrated in FIG. 36. Hereinafter, the same blocks as FIG. 36 will not described and the aforementioned differences will be primarily described.

The I/Q deinterleaver and derotation block 36010 may perform an inverse procedure of the rotation and I/Q interleaver block 35020 described in FIG. 35. That is, the I/Q deinterleaver and derotation block 36010 may deinterleave I and Q components I/Q interleaved and transmitted at the transmitting side and derotate and output the complex symbol having the restored I/Q component again.

The I/Q deinterleaver and derotation block 36010 may be commonly applied to the first to fourth blocks 36000 to 36300 as described above. In this case, whether the I/Q deinterleaver and derotation block 36010 is applied to the fourth block 36300 for processing the PLS pre/post information is may be signaled through the aforementioned preamble.

The constellation demapper block 36020 may perform an inverse procedure of the constellation mapper block 35010 described in FIG. 35. That is, the constellation demapper block 36020 may not perform derotation, but demap the cell-deinterleaved data.

The third block 36200 for the MIMO scheme may include a complex symbol generator block 36210 and a Q-block deinterleaver block 36220 as illustrated in FIG. 36.

The complex symbol parsing block 36210 may perform an inverse procedure of the complex symbol generator block 35220 described in FIG. 35. That is, the complex symbol parsing block 36210 may parse the complex data symbol, and demap the parsed complex data symbol to the bit data and output the data. In this case, the complex symbol parsing block 36210 may receive the complex data symbols through at least two paths.

The Q-block deinterleaver block 36220 may perform an inverse procedure of the Q-block interleaver block 35210 described in FIG. 35. That is, the Q-block deinterleaver block 36220 may restore the Q-size blocks by the row-column deinterleaving, restore the permutated sequences of the respective blocks to the original sequences, and thereafter, restore the positions of the parity bits to the original positions through the parity deinterleaving and output the parity bits.

The aforementioned blocks may be omitted according to the intention of the designer or substituted by other blocks having a similar or the same function.

Consequently, as illustrated in FIG. 36, the demapping and decoding module according to another embodiment of the present invention may output the data pipe and the PLS information processed for each path to the output processor.

Figure 37:
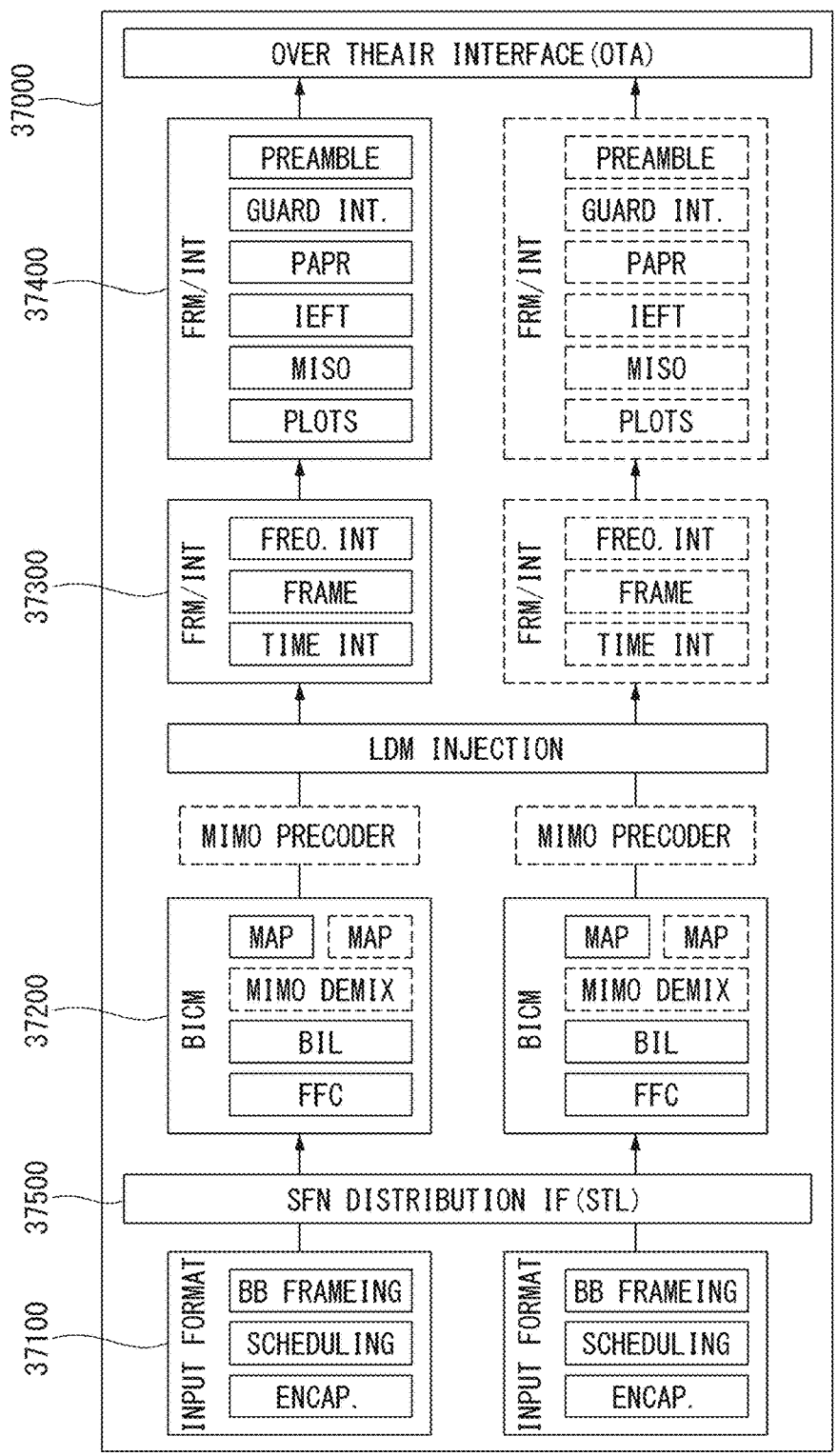
FIG. 37 is a diagram illustrating another structure of the broadcasting signal transmission apparatus for a next-generation broadcasting service in accordance with an embodiment of the present invention.

FIG. 37 is a diagram illustrating another structure of the broadcasting signal transmission apparatus for a next-generation broadcasting service in accordance with an embodiment of the present invention.

The broadcasting signal transmission apparatus 37000 of FIG. 37 includes both a normative block and an informative block.

In FIG. 37, blocks indicated by solid lines denote normative blocks. Blocks that may be used when an informative MIMO annex is implemented, that is, informative blocks, are indicated by dotted lines.

The broadcasting signal transmission apparatus in accordance with an embodiment of the present invention includes four major blocks, that is, (1) an input formatting block 37100, (2) a BICM block 37200, (3) a framing & interleaving (FRM/INT) block 37300, and (4) a waveform generation block 37400.

The framing & interleaving block 37300 may be represented by a frame building block.

A Signal Frequency Network (SFN) dispersion (or distribution) interface 37500 is present between the input formatting block 37100 and the BICM block 37200.

A multiplexing method which may be applied to broadcasting signal transmission/reception methods proposed in this specification may include two types of method: Time Division Multiplexing (TDM) and Layered Division Multiplexing (LDM) and a method in which the two types of methods are combined.

The internal block diagram of a broadcasting transmission system for the two types of normative multiplexing methods may be implemented simpler than the internal block diagram of the entire broadcasting transmission system described with reference to FIGS. 1 and 37.

Figure 38:
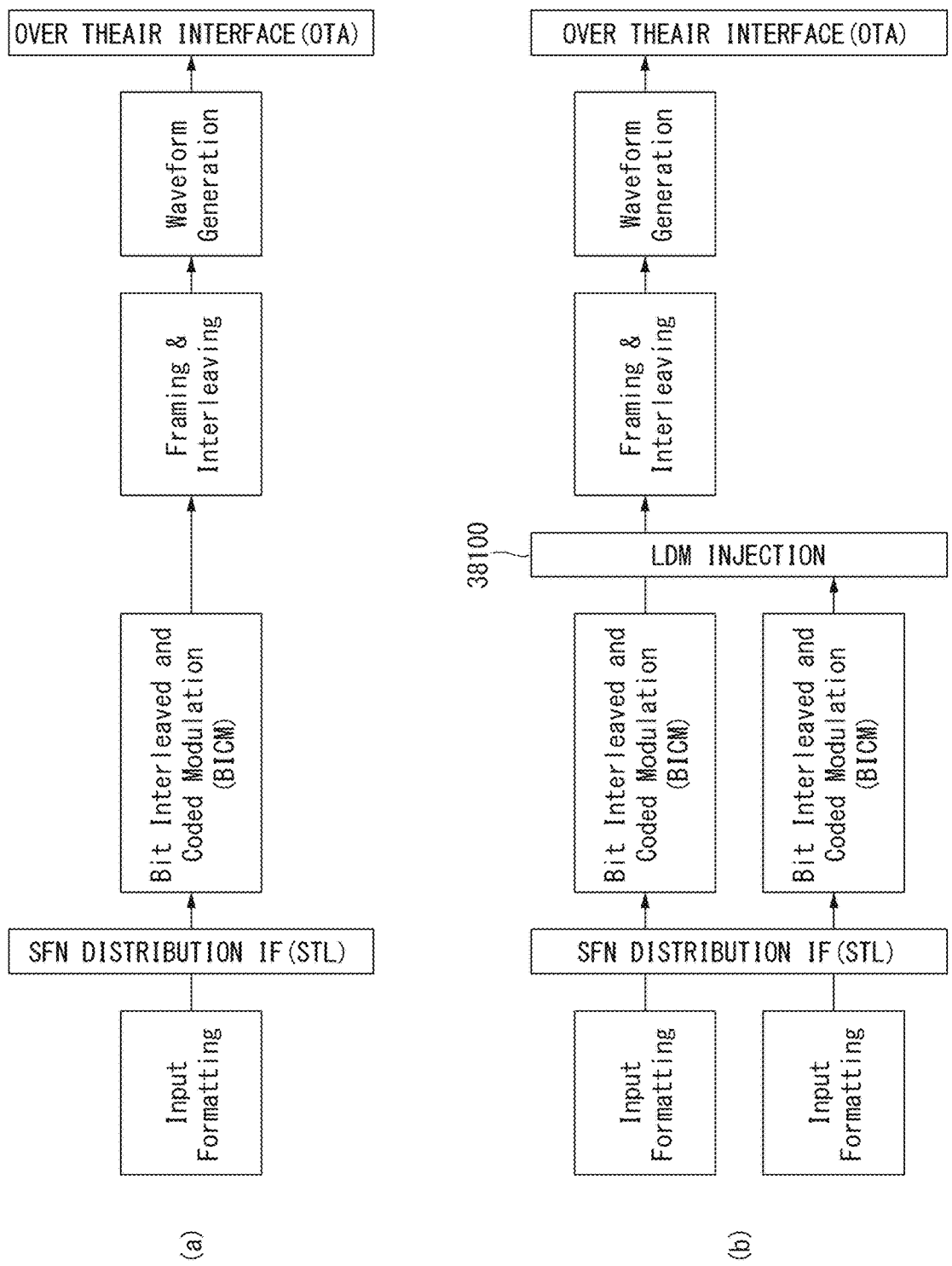
FIG. 38 is a diagram illustrating a simplified TDM broadcasting transmission system and LDM broadcasting transmission system in accordance with an embodiment of the present invention.

FIG. 38 is a diagram illustrating a simplified TDM broadcasting transmission system and LDM broadcasting transmission system in accordance with an embodiment of the present invention.

Specifically, FIG. 38*a* illustrates an example of the simplified TDM broadcasting transmission system, and FIG. 38*b* illustrates an example of the simplified LDM broadcasting transmission system.

As illustrated in FIG. 38*a*, the TDM broadcasting transmission system includes four major internal block diagrams. The four major internal block diagrams include an input formatting block, a Bit Interleaved and Coded Modulation (BICM) block, a framing & interleaving block, and a waveform generation block.

Each of the blocks is described in brief below. Data is inputted to the input formatting block and formatted therein. The formatted data is subjected to Forward Error Correction (FEC) in the BICM block. Next, the data is mapped according to constellation mapping.

Furthermore, the data is subjected to interleaving and frame generation in time and frequency domains in the framing & interleaving block. As a result, a waveform is generated in the waveform generation block and then output.

As illustrated in FIG. 38*b*, the LDM broadcasting transmission system includes a new block not present in the TDM broadcasting transmission system, that is, an LDM injection block 38100. The LDM broadcasting transmission system includes two separate input formatting blocks and two separate BICM blocks.

The separate blocks (i.e., each of the two input formatting blocks and each of the two BICM blocks) are applied to each LDM layer.

The separate blocks are combined before framing & interleaving are performed in the LDM injection block 38100.

Furthermore, a plurality of Radio Frequency (RF) channels is supported through channel bonding.

The Layered Division Multiplexing (LDM) broadcasting system of FIG. 38*b* is described in more detail.

LDM refers to a constellation superposition technology in which a plurality of data streams is combined in different power levels so that a different modulation and channel coding scheme (MCS) is applied to each data stream before a signal is transmitted through a single RF channel.

A 2-layer LDM system is described as an example, for convenience of description.

As illustrated in FIG. 38*b*, the 2-layer LDM system includes an element (i.e., the LDM injection block 38100) for combining two BICM chains prior to time interleaving.

Each of the two BICM chains (including an encoded sequence modulated to a constellation) is described as a single layer, but may be represented by a single PLP.

The two BICM layers may be respectively a core layer and an enhanced layer.

The core layer needs to use a MODCOD combination that is the same as or more robust than the enhanced layer.

Each of the core layer and the enhanced layer may use different FEC coding and constellation mapping.

In general, the core layer and the enhanced layer may have the same code length, but have different code rates and constellations.

The core layer and enhanced layer are combined in the LDM injection block (illustrated in FIG. 38b).

Furthermore, an injection level controller is used to reduce power of the enhanced layer compared to the core layer in order to output transmission energy that will achieve a specific bit rate.

An injection level (of the signal of the enhanced layer compared to the signal of the core layer) is a transmission parameter that enables the distribution of transmission power between the two layers.

The transmission robustness of each of the two layers may be changed by diversifying the injection level.

Furthermore, signals combined through the LDM injection block 38100 are normalized in a power normalizer block after power of all the signals is combined.

Figure 39:
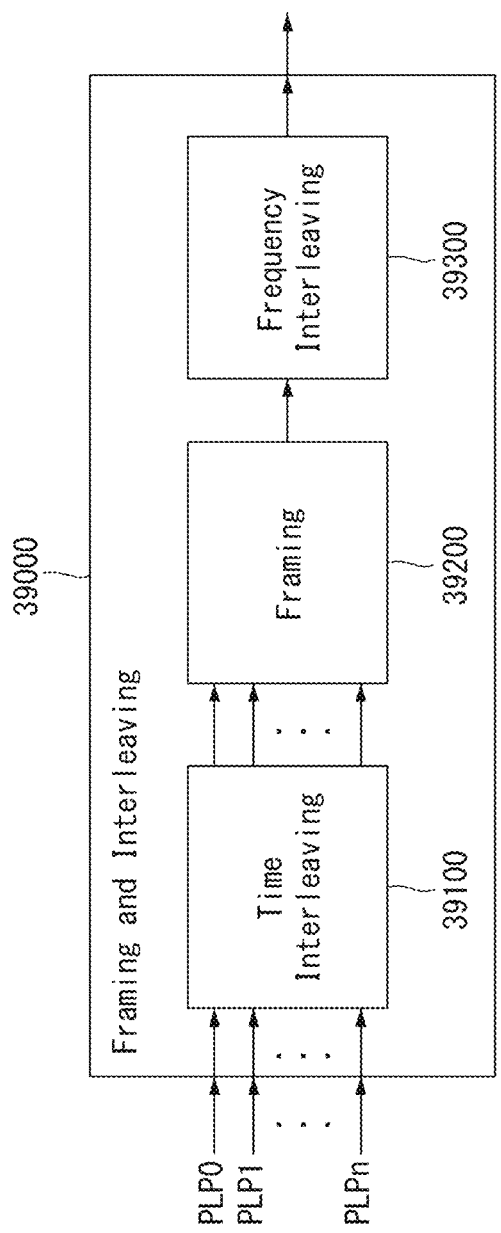
FIG. 39 illustrates a framing & interleaving block in accordance with an embodiment of the present invention.

FIG. 39 illustrates a framing & interleaving block in accordance with an embodiment of the present invention.

The framing & interleaving block may be represented by a frame building block.

The framing & interleaving block 39000 includes three parts, that is, a time interleaving block 39100, a framing block 39200, and a frequency interleaving block 39300.

An input to the time interleaving and framing block 39100 may include a plurality of PLPs (or M-PLPs).

In contrast, the output of the framing block 39200 includes OFDM symbols arranged in frames. A frequency interleaver operates on OFDM symbols.

The framing block 39200 output inputs as one or more PLPs and output symbols. In this case, the inputs denote data cells.

Furthermore, the framing block generates one or more special symbols well known as preamble symbols.

The special symbols undergo the same processing in the waveform generation block.

Figure 40:
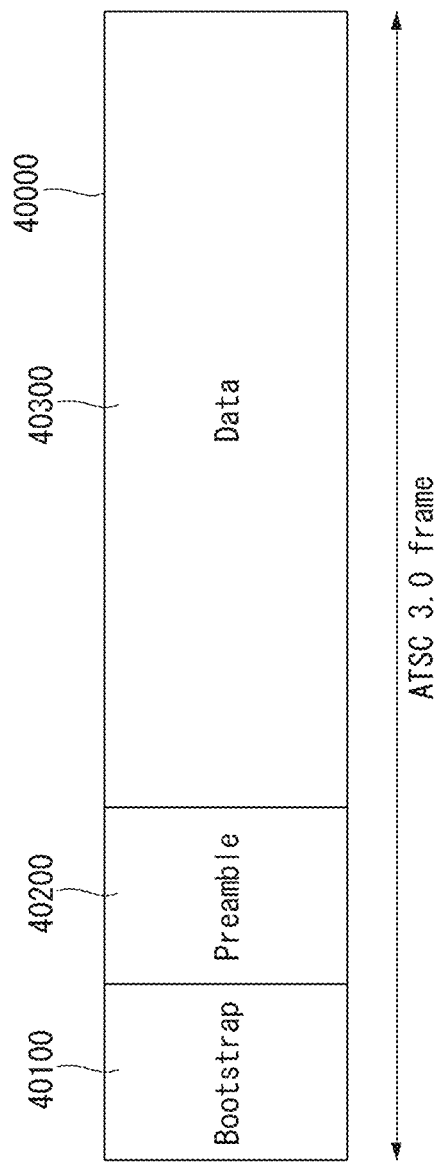
FIG. 40 is a diagram illustrating an example of an ATSC 3.0 frame structure to which an embodiment of the present invention may be applied.

FIG. 40 is a diagram illustrating an example of an ATSC 3.0 frame structure to which an embodiment of the present invention may be applied.

Referring to FIG. 40, the ATSC 3.0 frame 40000 includes three parts, that is, (1) a bootstrap 40100, (2) a preamble 40200, and (3) a data payload 40300.

Each of the three parts includes one or more symbols.

Specifically, preamble symbols transmit the L1 signaling data of subsequent data symbols.

That is, the L1 signaling data includes information related to data symbols, and the data symbols are subsequent to (or placed after) the L1 signaling data.

The preamble symbols are directly generated after a bootstrap and before specific data symbols.

The data symbols transmit data within a frame.

The data symbols are directly generated after the preamble symbols and before a next bootstrap.

L1 signaling provides information required to configure (or set) physical layer parameters.

The term "L1" refers to Layer-1 and refers to the lowest layer of the ISO 7 layer model.

The L1 signaling is included in a preamble.

The L1-signaling includes two parts, that is, (1) L1-static and (2) L1-dynamic.

L1-static completes a frame, transmits the most basic signaling information about a static system, and also defines parameters required to decode L1-dynamic.

L1-dynamic materializes information and data context required to decode L1-dynamic.

The length of L1-static signaling is fixed to 200 bits, and the length of L1-dynamic signaling may be defined in various ways.

Table 34 is an example of an L1-static information format. Parameters of L1-static are previously determined to be always "L1S_."

TABLE 34

| SYNTAX | NUNBER OF BITS | FORMAT |
|---|---|---|
| ... | | |
| L1S_frequency interleaver | 1 | |
| ... | | |

The bootstrap 40100 is described in more detail.

The bootstrap provides a universal entry point to an ATSC waveform.

The bootstrap is defined as fixed elements (e.g., a sampling rate, a signal bandwidth, a subcarrier spacing, and a time domain structure) known to all the broadcasting signal reception apparatuses.

In a common structure of the bootstrap, a bootstrap signal is placed ahead of a post-bootstrap waveform.

The post-bootstrap waveform means the remaining parts of a frame.

That is, a preamble may be placed after the bootstrap.

The bootstrap includes a plurality of symbols and starts from a synchronization symbol.

The synchronization symbol is placed at the start of each frame section so that service discovery, coarse synchronization, frequency offset estimation, and initial channel estimation are possible.

The bootstrap includes four symbols including an (initial) synchronization symbol.

The signaling field of a bootstrap symbol 1 includes eas_wake_up information, system_bandwidth information, and min_time_to_next information.

The eas_wake_up information refers to information indicating whether emergency is present or not.

The system_bandwidth information is information about a system bandwidth used for the post-bootstrap part of a current PHY layer frame.

The min_time_to_next information is information about a minimum time interval up to a next frame in which the major version number and minor version number of a current frame are identically matched.

The signaling field of a bootstrap symbol 2 includes bsr_coefficient information.

The bsr_coefficient information is information indicating that a sample rate post-bootstrap (of a current PHY layer frame) is (N+16)*0.384 MHz.

In this case, N is a value of 0 to 80 which is signaled.

The signaling field of the bootstrap symbol 2 includes preamble_structure information.

The preamble_structure information is indicative of information that signals the structure of one or more RF symbols placed after the last bootstrap symbol.

Frequency Interleaving (FI)

Frequency interleaving is described in more detail.

FI may be used as a team that means frequency interleaving or a frequency interleaver.

FI operates in a single OFDM symbol, and is used to separate error bursts generated in a frequency domain.

Whether FI is used or not may be selected by the signaling of an L1S_frequency interleaver.

An L1S_frequency interleaver field is included in the preamble of the ATSC 3.0 frame as described above.

Input cells of FI (i.e., the output cells of the framing block) are defined as $X_{m,l} = (x_{m,l,0}, x_{m,l,1}, x_{m,l,2}, \ldots, x_{m,l,N_{data}-1})$.

$x_{m,l,q}$ is indicative of the cell index q of the symbol l (l=0, ..., $L_F$−1) of a frame m.

$N_{data}$ is indicative of the number of active data carriers of a single symbol. $N_{data}$ is set as $N_{data}=C_N$ with respect to a normal symbol, represented by $N_{data}=C_{FS}$ with respect to a frame start symbol, and represented by $N_{data}=C_{FC}$ with respect to a frame closing symbol.

FI processes the output vector, that is, $X_{m,l}=(x_{m,l,0}, x_{m,l,1}, x_{m,l,2}, \ldots, x_{m,l,N_{data}-1})$, of the frame builder (or the framing & interleaving block).

$x_{m,l,q}$ is indicative of the cell index q of an OFDM symbol l of the frame m.

Each FI includes a basic interleaving sequence (or main interleaving sequence) having wire permutation and a symbol offset generator having an offset addition block.

The address check block authenticates a generated interleaving address value, and the offset addition block is placed after an address check block.

The address check block may be called a memory index check block or a memory address check block.

The symbol offset generator may be accomplished for each symbol pair.

For example, the symbol offset value is constant with respect to two sequential symbols (2l and 2l+1).

A Frequency Interleaving (FI) procedure and a method of supporting a Frequency Interleaver (FI) on/off operation mode proposed in this specification are described below.

On/Off Operation Mode of Frequency Interleaver (FI)

First, the method of supporting an FI on/off operation mode proposed in this specification is described with reference to related drawings.

Figure 41:
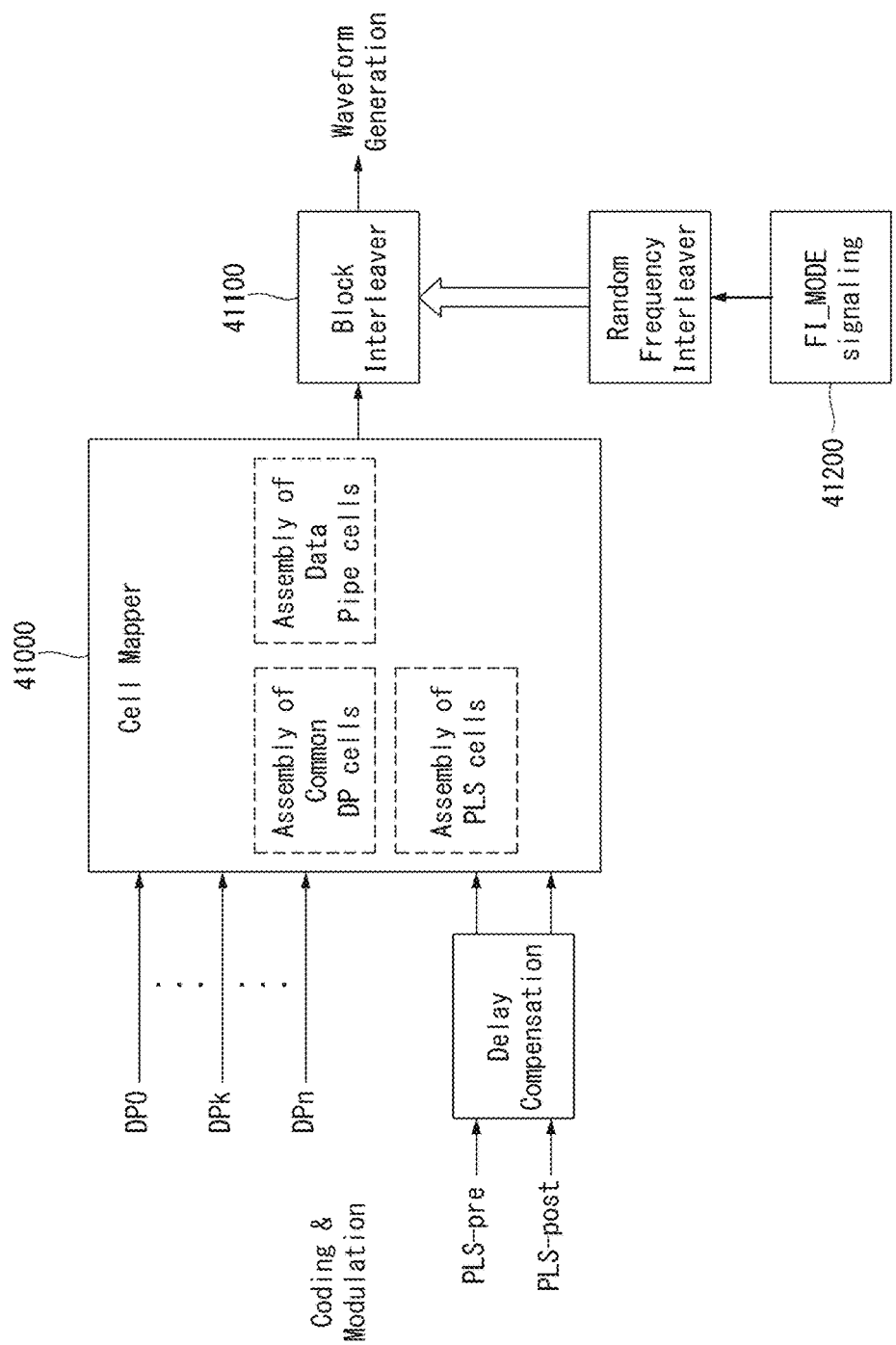
FIG. 41 is a diagram illustrating another example of the frame building block of FIG. 7.

FIG. 41 is a diagram illustrating another example of the frame building block of FIG. 7.

The frame building block 41000 of FIG. 41 may be an internal block diagram indicative of another example of the framing & interleaving block of FIG. 39.

That is, FIG. 41 illustrates an example of the frame building block (or framing & interleaving block) including a random frequency interleaver corresponding to the block interleaver 41100 of a future broadcasting system proposed in this specification.

The block interleaver 41110 may be interpreted as being a meaning, such as a frequency interleaver or a random frequency interleaver, or may be represented by a frequency interleaver or a random frequency interleaver.

The random frequency interleaver of FIG. 41 obtains an additional frequency diversity gain by interleaving cells within a transmission block, that is, the unit of a transmission frame, based on a frequency axis.

In particular, this specification provides an operation of frequency interleaving for applying a different interleaving seed to each OFDM symbol in the broadcasting signal transmission apparatus (Specifically, in the frequency interleaver) and applying a different interleaving seed to each frame including a plurality of OFDM symbols.

As illustrated in FIG. 41, this specification provides the method of supporting the on/off operation mode of the random frequency interleaver.

The method of supporting the on/off operation mode of FI is described in detail below with reference to FI mode (FI_MODE) information 41200 and FIG. 42.

Figure 42:
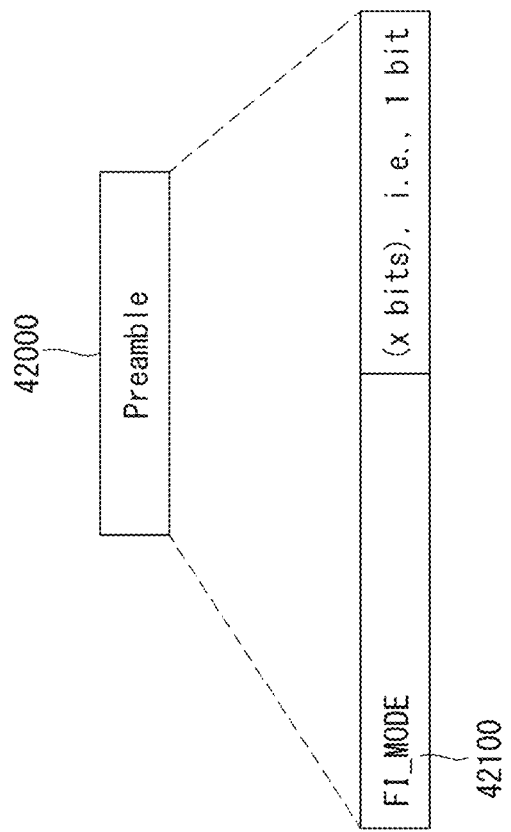
FIG. 42 is a diagram illustrating an example of a preamble format to which an embodiment of the present invention may be applied.

FIG. 42 is a diagram illustrating an example of a preamble format to which an embodiment of the present invention may be applied.

As illustrated in FIG. 42, the preamble 42000 includes frequency interleaver mode (FI_MODE) information 42100.

A preamble is included in the aforementioned ATSC 3.0 frame and is placed after a bootstrap and before a data payload.

For the structure of the ATSC 3.0 frame and a related description thereof, reference may be made to FIG. 40.

That is, the FI_MODE information may be included in L1 signaling included in the preamble.

The L1-signaling may be divided into two parts, that is, L1-static and L1-dynamic, as described with reference to FIG. 40.

In this case, the FI_MODE information may be included in the L1-static and/or the L1-dynamic.

The frequency interleaver (FI) mode (FI_MODE) information included in the preamble is indicative of information indicating whether FI is available.

Whether FI is available may be indicated by on or off.

That is, the FI mode information is information indicating whether FI has been on or off and may be represented by 1 bit.

If the FI mode has been set as on (or if the FI mode is indicative of on), data cells output by a cell mapper is subjected to frequency interleaving in each OFDM symbol through FI.

The FI mode information may be represented by FI mode signaling.

For example, if the FI mode information has been set to "1", it may indicate that FI has been on. On the contrary, if the FI mode information has been set to "0", it may indicate that the FI has been off.

More specifically, the FI mode information may be transmitted through L1 signaling within a frame.

In this case, a preamble symbol(s) transmits L1 signaling data for a data symbol(s) subsequent to the preamble symbol(s).

The preamble symbol(s) is placed after a bootstrap and placed before data symbol(s).

The L1 signaling provides required information for configuring physical layer parameters, and L1 means Layer-1 corresponding to the lowest layer of the ISO 7 layer model.

Furthermore, the L1 signaling is included in a preamble, and includes two parts (i.e., L1-static and L1-dynamic).

Figure 43:
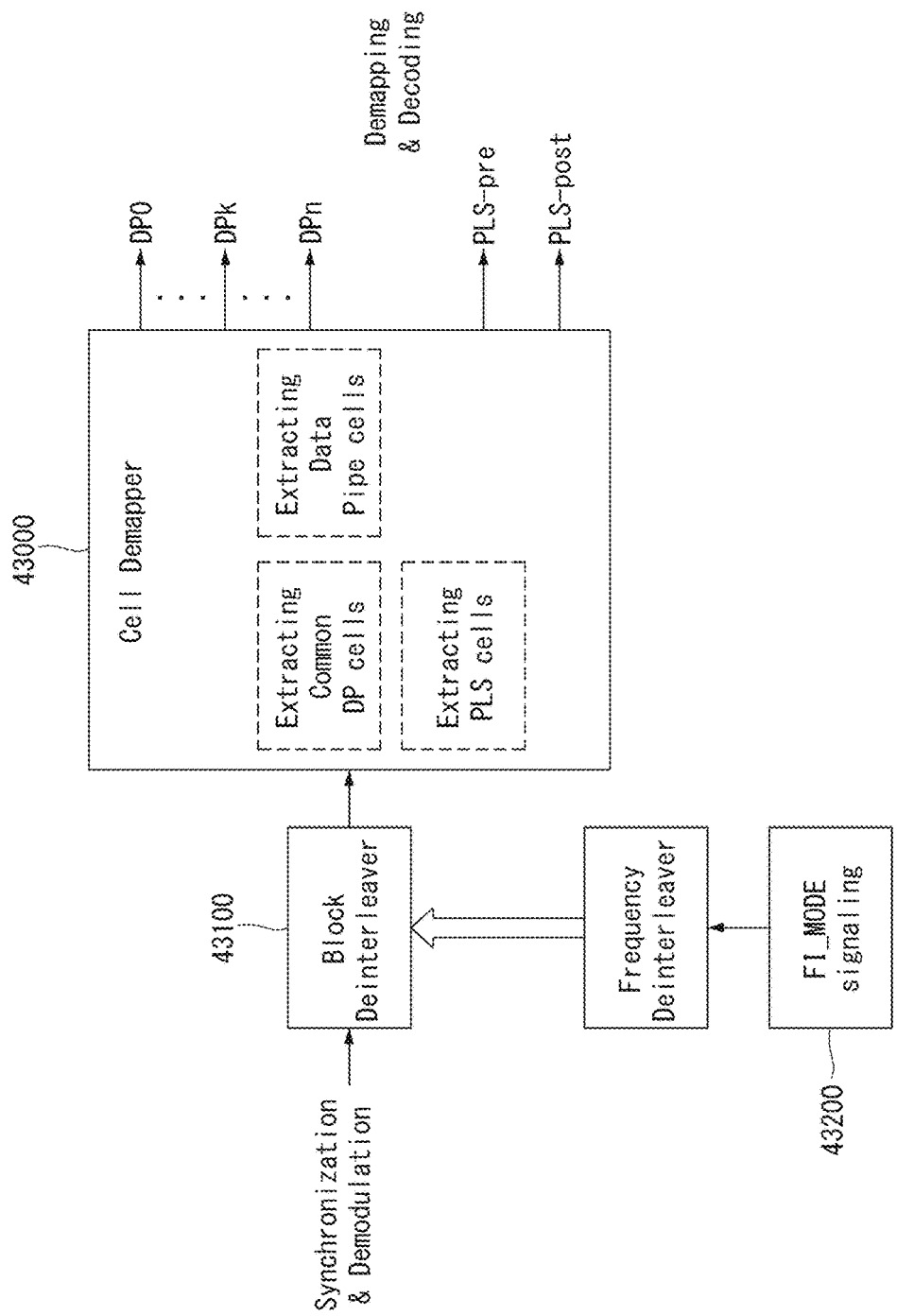
FIG. 43 is a diagram illustrating another internal block diagram of the frame parsing block of FIG. 31.

FIG. 43 is a diagram illustrating another internal block diagram of the frame parsing block of FIG. 31.

That is, FIG. 43 illustrates an example of a frame parsing block including a random frequency deinterleaver corresponding to the block deinterleaver 43100 of a future broadcasting system proposed in this specification.

The block deinterleaver 43100 may be interpreted as a meaning, such as a frequency deinterleaver or a random frequency deinterleaver, or may be represented by a frequency deinterleaver or a random frequency deinterleaver.

As illustrated in FIG. 43, FI mode (FI_MODE) information or FI mode signaling refers to information indicative of an on or off operation mode of FI, as described with reference to FIG. 42.

That is, FI mode information 43200 indicates whether FI is available.

The FI mode information is included in a frame and is specifically included in the preamble of the frame.

Furthermore, the FI mode information is included in the L1 signaling of the preamble.

The L1-signaling may be divided into two parts, that is, L1-static and L1-dynamic. As described with reference to FIG. 40, the FI_MODE information may be included in the L1-static and/or the L1-dynamic.

In this case, if the FI_MODE information is indicative of "on" of FI MODE, the broadcasting signal reception apparatus performs frequency deinterleaving through a frequency deinterleaver, that is, a process opposite a frequency interleaving process performed by the frequency interleaver of a broadcasting signal transmission apparatus, so that the original data sequence is obtained.

As described with reference to FIGS. 42 and 43, the operation of the FI_MODE information proposed in this specification corresponds to essential information in order to support Frequency Division Multiplexing (FDM) in a broadcasting system.

If a broadcasting system supports an FDM method, the broadcasting signal transmission apparatus may transmit PLPs and/or data for each specific frequency band.

Accordingly, if PLPs or data are transmitted according to FDM, FI becomes off in order to reduce performance deterioration which may be generated because PLPs or data is transmitted through a poor frequency edge part in a neighbor channel (or neighbor frequency band).

Specifically, when PLPs or data having high importance (or high quality) is transmitted using a specific frequency band (according to the FDM method), if the FI operation is performed, the PLPs or data are spread into the entire specific frequency band, so performance deterioration is generated in a frequency edge part that may be influenced by a neighbor channel.

Accordingly, there is an advantage in that FDM can be supported because an FI operation is made off through the operation of the FI mode information that makes on or off the FI operation proposed in this specification.

Frequency Interleaving (FI) Method

A frequency interleaving method proposed in this specification is described in detail below with reference to related drawings.

The frequency interleaving method to be described below is performed when the FI mode of an FI mode information value included in the preamble has been "on."

As described above, the basic function of the cell mapper of FIG. 7 is to map the data cells of respective DPs (or PLPs) or PLS data to the arrays of active OFDM cells respectively corresponding to the OFDM symbols of a single signal frame.

As described above, the block interleaver may operate in a single OFDM symbol and may provide frequency diversity by randomly interleaving cells received from the cell mapper.

That is, an object of the block interleaver operating in a single OFDM symbol is to provide frequency diversity by randomly interleaving data cells received from the frame structure module (or the frame building module or the framing & interleaving module).

In order to obtain a maximum interleaving gain from a single signal frame (or a single frame), another interleaving seed is used in each OFDM pair including two sequential OFDM symbols.

The block interleaver of FIG. 41 may obtain an additional diversity gain by interleaving cells within a transport block, that is, the unit of a signal frame.

As described above, the block interleaver may be called a frequency interleaver or a specific frequency interleaver, which may be changed depending on a designer's intention.

In an embodiment, the block interleaver in accordance with an embodiment of the present invention may apply a different interleaving seed to at least one OFDM symbol or apply a different interleaving seed to a frame including a plurality of OFDM symbols.

The frequency interleaving method may be called random frequency interleaving (random FI).

Furthermore, in an embodiment, the random FI may be applied to a super frame structure including a plurality of signal frames each including a plurality of OFDM symbols.

That is, the frequency interleaver of the broadcasting signal transmission apparatus or the broadcasting signal transmission apparatus proposed in this specification may obtain frequency diversity in such a way as to perform random FI by applying a different interleaving seed (or interleaving pattern) to each OFDM symbol or at least one OFDM symbol, that is, every two paired OFDM symbols (i.e., pair-wise OFDM symbol).

Furthermore, the frequency interleaver in accordance with an embodiment of the present invention may obtain additional frequency diversity in such a way as to perform random FI by applying a different interleaving seed to each signal frame.

Accordingly, the broadcasting signal transmission apparatus or the frequency interleaver proposed in this specification may have a ping-pong frequency interleaver structure for performing frequency interleaving for each pair of sequential pair-wise OFDM symbols using two memory banks.

The interleaving operation of the frequency interleaver proposed in this specification may be hereinafter called pair-wise symbol FI (or pair-wise FI) or ping-pong FI (ping-pong interleaving).

The aforementioned interleaving operation corresponds to an embodiment of random FI, and may be changed depending on a designer's intention.

Even-numbered pair-wise OFDM symbols and odd-numbered pair-wise OFDM symbols may be non-sequentially interleaved through different FI memory banks.

Furthermore, the frequency interleaver may simultaneously perform reading and writing operations on a pair of sequential OFDM symbols inputted to each memory bank using a random interleaving seed. A detailed operation of the frequency interleaver is described later.

Furthermore, in this specification, an embodiment in which an interleaving seed is basically changed for each pair of OFDM symbols may be used as a logical frequency interleaving operation for interleaving all OFDM symbols within a super frame rationally and efficiently interleaving.

In an embodiment of this specification, the interleaving seed may be generated by a specific random generator or a random generator including a combination of several random generators.

Furthermore, in an embodiment of this specification, for an efficient change of an interleaving seed, various interleaving seeds may be generated by cyclically shifting a single main interleaving seed.

In this case, the cyclic-shifting rule may be hierarchically defined by taking into consideration an OFDM symbol and a signal frame unit. This may be changed depending on a designer's intention, and the detailed contents of the cyclic-shifting rule are described later.

Furthermore, the broadcasting signal reception apparatus proposed in this specification may perform a process opposite the aforementioned random frequency interleaving process.

In this case, the frequency deinterleaver of the broadcasting signal reception apparatus or the broadcasting signal reception apparatus in accordance with an embodiment of the present invention may perform deinterleaving on sequential input OFDM symbols using a single piece of memory without using a ping-pong structure using two pieces of memory. Accordingly, the frequency deinterleaver can increase use efficiency of memory.

Furthermore, reading and writing operations are still required in the frequency deinterleaver and may be called a single memory deinterleaving operation.

Accordingly, the single memory deinterleaving method is very efficient in terms of memory use.

Figure 44:
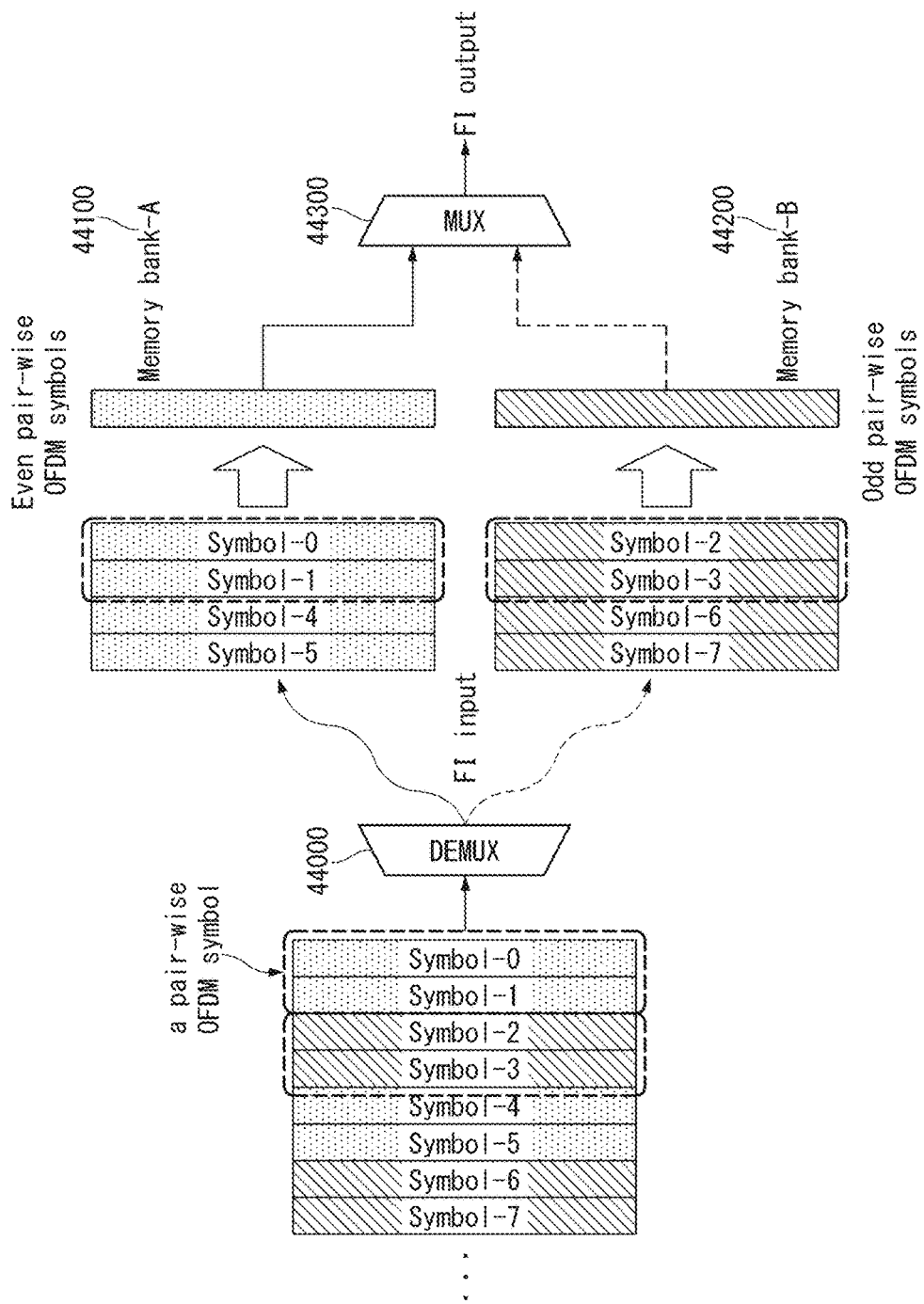
FIG. 44 is a diagram illustrating the operation of a frequency interleaver in accordance with an embodiment of the present invention.

FIG. 44 is a diagram illustrating the operation of the frequency interleaver in accordance with an embodiment of the present invention.

FIG. 44 illustrates the basic operation of the frequency interleaver using two memory banks in the broadcasting signal transmission apparatus. This enables a single memory deinterleaving operation in the broadcasting signal reception apparatus.

As described above, the frequency interleaver proposed in this specification may can a ping-pong interleaving operation.

In general, the ping-pong interleaving operation may be achieved by two memory banks.

In the FI operation proposed in this specification, two memory banks relate to respective pair-wise OFDM symbols.

A maximum memory (ROM) size of frequency interleaving corresponds to about twice a maximum FFT size.

In the broadcasting signal transmission apparatus, an increase of the ROM size tends to be less important compared to the broadcasting signal reception apparatus.

As described above, even-numbered pair-wise OFDM symbols and odd-numbered pair-wise OFDM symbols may be non-sequentially interleaved through different FI memory banks.

That is, a first (having an even index) pair-wise OFDM symbol is interleaved in a first memory bank, whereas a second (having an odd index) pair-wise OFDM symbol is interleaved in a second memory bank.

A single interleaving seed is used in each of pair-wise OFDM symbols.

Two OFDM symbols are sequentially interleaved based on the interleaving seed and the reading-writing (or writing-reading) operation.

Reading-writing operations proposed in this specification may be achieved at the same time without a collision.

As illustrated in FIG. 44, the frequency interleaver may include a DEMUX 44000, two memory banks (i.e., a memory bank-A 44100 and a memory bank-B 44200), and a MUX 44300.

First, the frequency interleaver may perform demultiplexing processing on sequential input OFDM symbols through the DEMUX 44000 for pair-wise OFDM symbol FI.

Thereafter, the frequency interleaver performs reading-writing FI operations on each of the memory bank A and the memory bank B using a single interleaving seed.

As illustrated in FIG. 44, the two memory bank-A and bank-B are used for each OFDM symbol pair.

A second (having an odd index) OFDM symbol pair is interleaved in the memory bank-B, whereas a first (having an even index) OFDM symbol pair is interleaved in the memory bank-A. The operations in the memory bank-A and bank-B may be exchanged.

Thereafter, the frequency interleaver may perform multiplexing processing on ping-pong FI outputs through the MUX 44300 in order to transmit sequential OFDM symbols.

Figure 45:
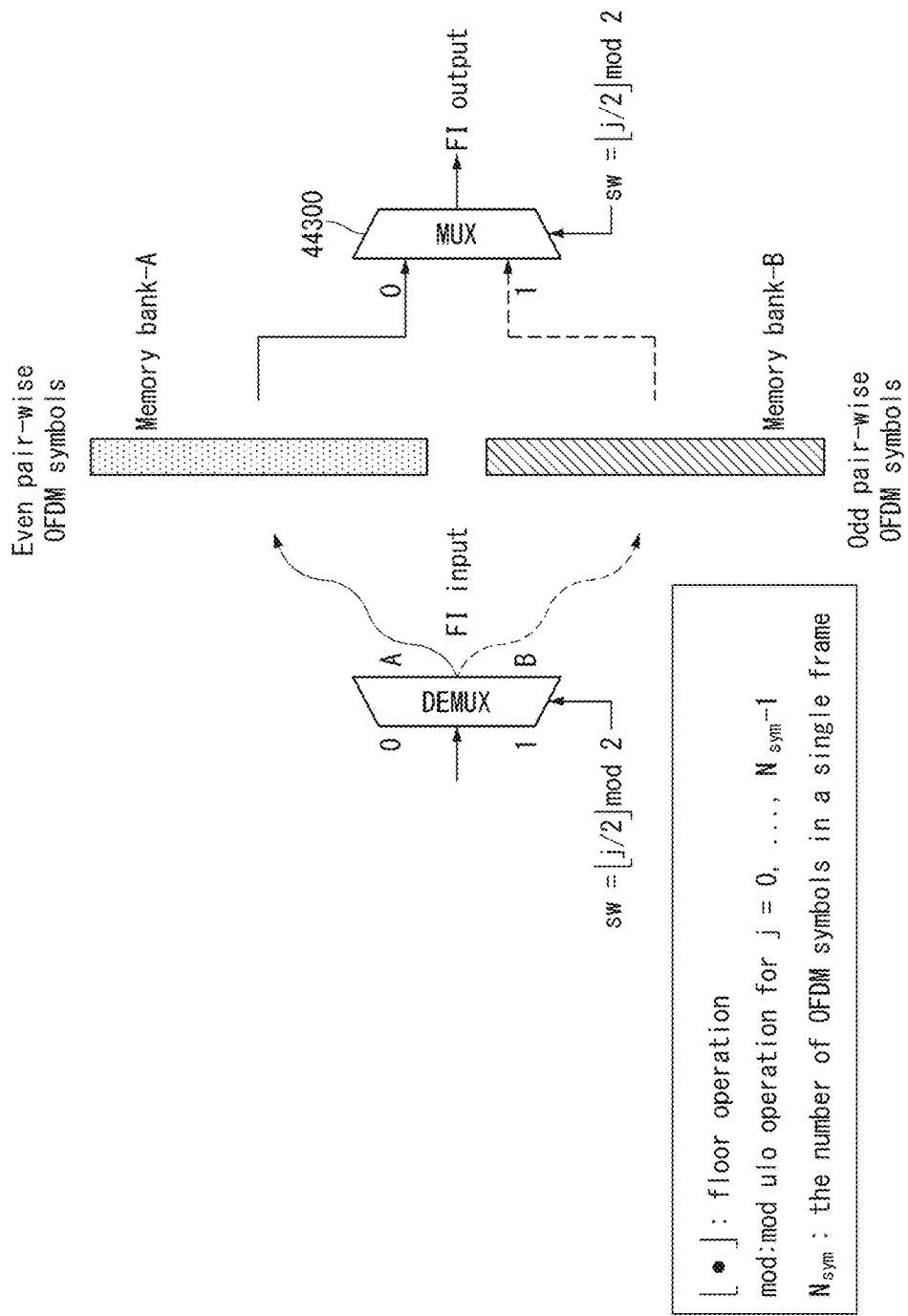
FIG. 45 illustrates the basic switch model of MUX and DEMUX methods in accordance with an embodiment of the present invention.

FIG. 45 illustrates the basic switch model of MUX and DEMUX methods in accordance with an embodiment of the present invention.

FIG. 45 illustrates simple operations of the DEMUX and the MUX applied to the inputs and outputs of the memory bank-A and bank-B in the aforementioned ping-pong FI structure.

The DEMUX and the MUX may perform control so that respective sequential input OFDM symbols are interleaved and may perform control so that a pair of output OFDM symbols is transmitted.

A different interleaving seed is used in each OFDM pair.

As illustrated in FIG. 45, the DEMUX and the MUX output an FI input and an FI output, respectively, according to Equation 12 below.

$$s = j \bmod 2 \quad \text{[Equation 12]}$$

In Equation 12, mod denotes modulo operation for j=0, 1, . . . , $N_{sym}-1$, and $N_{sym}$ denotes the number of OFDM symbols within a single frame.

Reading-writing operations of frequency interleaving in accordance with an embodiment of the present invention is described below.

The frequency interleaver may select or use a single interleaving seed in each of first and second OFDM symbols and may use an interleaving seed in writing and reading operations.

That is, the frequency interleaver can effectively perform interleaving using an operation of writing a single selected random interleaving seed with respect to the first OFDM symbol of pair-wise OFDM symbols and using a reading operation with respect to the second OFDM symbol of the pair-wise OFDM symbols.

Accordingly, two different interleaving seeds may look as if they are respectively applied to two OFDM symbols.

The detailed contents of reading-writing operations proposed in this specification are as follows.

The frequency interleaver in accordance with an embodiment of the present invention may randomly perform writing on memory (depending on an interleaving seed) with respect to a first OFDM symbol and then perform linear reading.

The frequency interleaver in accordance with an embodiment of the present invention may simultaneously perform linear writing on memory under the influence of the linear reading operation for the first OFDM symbol with respect to a second OFDM symbol.

Thereafter, the frequency interleaver in accordance with an embodiment of the present invention may randomly perform reading based on an interleaving seed.

As described above, the broadcasting signal transmission apparatus in accordance with an embodiment of the present invention may sequentially transmit a plurality of signal frames on the time axis.

In an embodiment of the present invention, a set of signal frames transmitted for a specific time may be called a super frame.

Accordingly, a single super frame may include N signal frames, and each of the signal frames may include a plurality of OFDM symbols.

Figure 46:
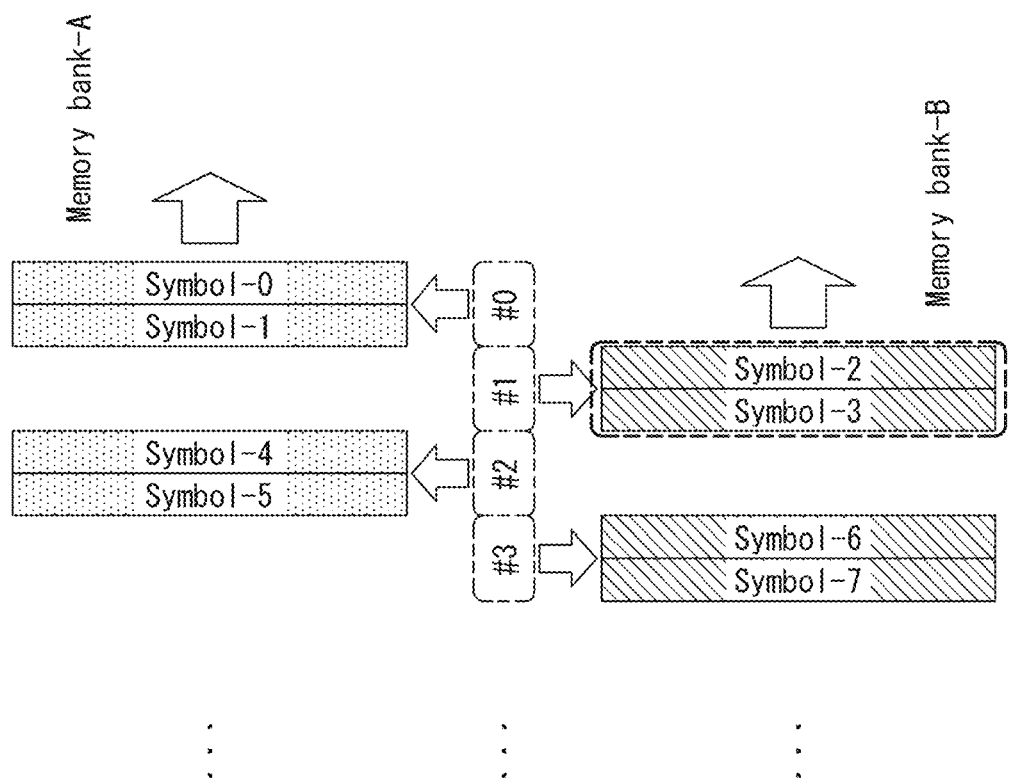
FIG. 46 illustrates the operation of a memory bank in accordance with an embodiment of the present invention.

FIG. 46 illustrates the operation of a memory bank in accordance with an embodiment of the present invention.

As described with reference to FIGS. 44 and 45, the two memory bank-A and bank-B may apply a random interleaving seed, generated through the aforementioned process, to respective pair-wise OFDM symbols.

Furthermore, each of the memory bank-A and bank-B may change interleaving seeds for each pair-wise OFDM symbol.

In each of the aforementioned memory bank-A and bank-B, a method of changing an interleaving seed is described in more detail with reference to Equations 13 to 16.

Equation 13 illustrates an equation related to the random interleaving seed of a first OFDM symbol, that is, an OFDM symbol that satisfies (j mod 2)=0 of an i-th OFDM symbol pair.

$$F_j(C_j(k)) = X_j(k), \text{ where } C_j(k) = \left(T(k) + S_{\lfloor j/2 \rfloor}\right) \mod N_{data}$$ [Equation 13]

In Equation 13, i=0, 1, . . . , $N_{sym}$, k=0, 1, . . . , $N_{data}$. $N_{data}$ denotes the number of active data carriers within a single symbol.

Equation 13 is an equation indicative of an output value $X_j(k)$ output by performing frequency interleaving on a j-th pair-wise OFDM symbol in FI using an interleaving sequence corresponding to $C_j(k)$. In Equation 13, $C_j(k)$ may also be represented by $H_j(k)$.

T(k) denotes a main interleaving seed (or basic interleaving seed) generated by a random generator used in main FI (or basic FI).

T(k) is a random sequence and may be interpreted as having the same concept as a main random interleaving sequence, a basic random interleaving sequence, or a single interleaving seed.

The random sequence may be generated by a random interleaving sequence generator or a random main sequence generator.

T(k) may be defined as Equation 14.

$$T(k) = (i \bmod 2) 2^{N_r - 1}$$ [Equation 14]

Furthermore, $S_{\lfloor j/2 \rfloor}$ denotes a random symbol offset generated by a random generator used in a j-th pair-wise OFDM symbol.

That is, $S_{\lfloor j/2 \rfloor}$ is a symbol offset, may also be called a cyclic shifting value, and may be generated based on a sub-Pseudo-Random Binary Sequence (PRBS). The detailed contents of the symbol offset are described later.

$S_{\lfloor j/2 \rfloor}$ may be defined as Equation 15.

$$S_{\lfloor \frac{j}{2} \rfloor} = \sum_{j=0}^{N_r - 1} G_{\lfloor \frac{j}{2} \rfloor}[j] 2^j$$ [Equation 15]

In Equations 14 and 15, l=0, l<$L_F$, and l=l+2 are satisfied.

Equation 16 is an equation related to the random interleaving seed of a second OFDM symbol, that is, an OFDM symbol that satisfies (j mod 2)=1 of an i-th OFDM symbol pair.

$$F_j(k) = X_j(C_j(k))$$ [Equation 16]

In Equation 16, i=0, 1, . . . , $N_{sym}$, k=0, 1, . . . , and $N_{data}$.

Equation 16 is an equation indicative of an output value $X_j(k)$ output by performing frequency interleaving on a j-th pair-wise OFDM symbol output according to Equation 13 in FI using an interleaving seed corresponding to $C_j(k)$.

In Equation 16, $C_j(k)$ is the same as the random interleaving seed used in the first OFDM symbol of Equation 13.

The random generator of Equations 13 and 16 is a random interleaving sequence generator. The random interleaving sequence generator may be included in the frequency interleaver 7020.

In each of the memory bank-A and bank-B, an interleaving process for an OFDM symbol pair has been described above, and uses a single interleaving seed.

Available data cells, that is, cells output by the cell mapper, are interleaved in a single OFDM symbol $O_{m,l}$ $O_{m,l}$ may be defined as in Equation 17.

The data cells $O_{m,l}$ output by the cell mapper denote data cells inputted to FI.

$$O_{m,l} = [X_{m,l,0}, \ldots, X_{m,l,p}, \ldots, X_{m,l,N_{data}-1}], l=0, \ldots, N_{sym}-1$$ [Equation 17]

In Equation 17, $X_{m,l,p}$ denotes the p-th cell of an l-th OFDM symbol in an m-th frame, and $N_{data}$ denotes the number of data cells (or frame signaling symbols, normal data, or frame edge symbols).

Furthermore, interleaved data cells $P_{m,l}$ are defined as in Equation 18.

The interleaved data cells denote a signal output through FI.

$$P_{m,l} = [v_{m,l,0}, \ldots, v_{m,l,N_{data}-1}], l=, \ldots, N_{sym}-1$$ [Equation 18]

In the aforementioned memory banks, interleaving using interleaving seeds (or interleaving sequences) may be represented as in Equations below.

Equations 18 and 19 may be interpreted as having the same meaning as Equations 13 and 16.

That is, Equations 13 and 16 denote mathematical expressions of a process of applying a random interleaving sequence (or seed), generated through the aforementioned logical FI structure, to an OFDM symbol pair.

Equation 18 denotes an equation related to the random interleaving seed of a first OFDM symbol, that is, an OFDM symbol that satisfies (j mod 2)=0 of an i-th OFDM symbol pair.

$$v_{m,l,H_l(p)} = x_{m,l,p}$$ [Equation 18]

In Equation 18, l=0, 1, . . . , $N_{sym}-1$, and p=0, 1, . . . , $N_{data}-1$.

$H_l(p)$ denotes an interleaving address or an interleaving seed generated by a random generator.

For $H_l(p)$ or $C_1(p)$, reference is made to the aforementioned contents.

Equation 19 denotes an equation related to the random interleaving seed of a second OFDM symbol, that is, an OFDM symbol that satisfies (j mod 2)=1 of an i-th OFDM symbol pair.

$$v_{m,l,p} = x_{m,l,H_l(p)}$$ [Equation 19]

In Equation 19, l=0, 1, . . . , $N_{sym}-1$, and p=0, 1, . . . , $N_{data}-1$.

A maximum value of $N_{data}$ is represented by $N_{max}$, and $N_{max}$ is differently defined depending on each FFT mode.

OFDM symbol pairs interleaved for the OFDM symbol pairs in the respective memory bank-A and bank-B are illustrated in Equation 18 and Equation 19.

$H_j$ (k) is the interleaving address of an interleaving seed generated by a random interleaving sequence generator with respect to each FFT mode.

The structure of the random interleaving sequence generator is described later.

As described above, an object of the frequency interleaver operating in a single OFDM symbol which is proposed in this specification is to provide frequency diversity by randomly interleaving data cells.

In order to obtain a maximum interleaving gain in a single frame, a different interleaving seed is used in each OFDM symbol pair including two sequential OFDM symbols.

As described with reference to Equation 13 and Equation 16, a different interleaving seed may be generated based on an interleaving address generated by a random interleaving sequence generator.

Furthermore, a different interleaving seed may be generated based on a cyclic shift value as described above.

That is, a different interleaving address used in each symbol pair may be generated using a cyclic shifting value in each OFDM pair.

As described above, the OFDM generation block may perform FFT transform on input data inputted to the OFDM generation block. Accordingly, in an embodiment, the operation of the frequency interleaver having a random interleaving sequence generator is described.

The random interleaving sequence generator may also be called an interleaving address generator and may be changed depending on a designer's intention.

The random interleaving sequence generator may include a first generator and a second generator.

The first generator is used to generate a main (or basic) interleaving seed, and the second generator is used to generate a symbol offset.

Accordingly, the first generator may be represented by a random main (or basic) sequence generator, and the second generator may be represented by a random symbol offset generator.

The names of the first generator and the second generator may be changed depending on a designer's intention, and the operations of the first generator and the second generator are described in more detail.

Each of the random generators (i.e., the first generator and the second generator) includes a spreader and a randomizer. The spreader and the randomizer function to assign a spreading effect and a random effect, respectively, when an interleaving sequence is generated.

In this case, the (cell) spreader operates using an n-bit upper part of all bits and may operate as a multiplexer (MUX, n-bit toggling) based on a look-up table.

The randomizer operates through a PN generator and operates so that it provides full randomness upon interleaving.

The randomizer may represent a PN generator, and may be replaced with a random PN generator.

A random symbol offset generator operating for each OFDM symbol pair outputs a symbol offset value required when an interleaving sequence is cyclically shifted.

A modulo operator mod $N_{max}$ within the random symbol offset generator operates when it exceeds $N_{data}$.

A memory index check block functions to control an output memory index value by repeatedly driving the spreader and the randomizer so that the output memory index value does not exceed $N_{data}$ without using (i.e., by neglecting) the output memory index value if a generated memory index value is greater than $N_{data}$ and The memory index check block may be called a memory address check block or an address check block.

As described above, the FFT size in accordance with an embodiment of the present invention may be 1 K, 2 K, 4 K, 8 K, 16 K, 32 K, or 64 K and may be changed depending on a designer's intention.

Accordingly, interleaving seeds (or the main interleaving seeds) may be various based on an FFT size.

Figure 47:
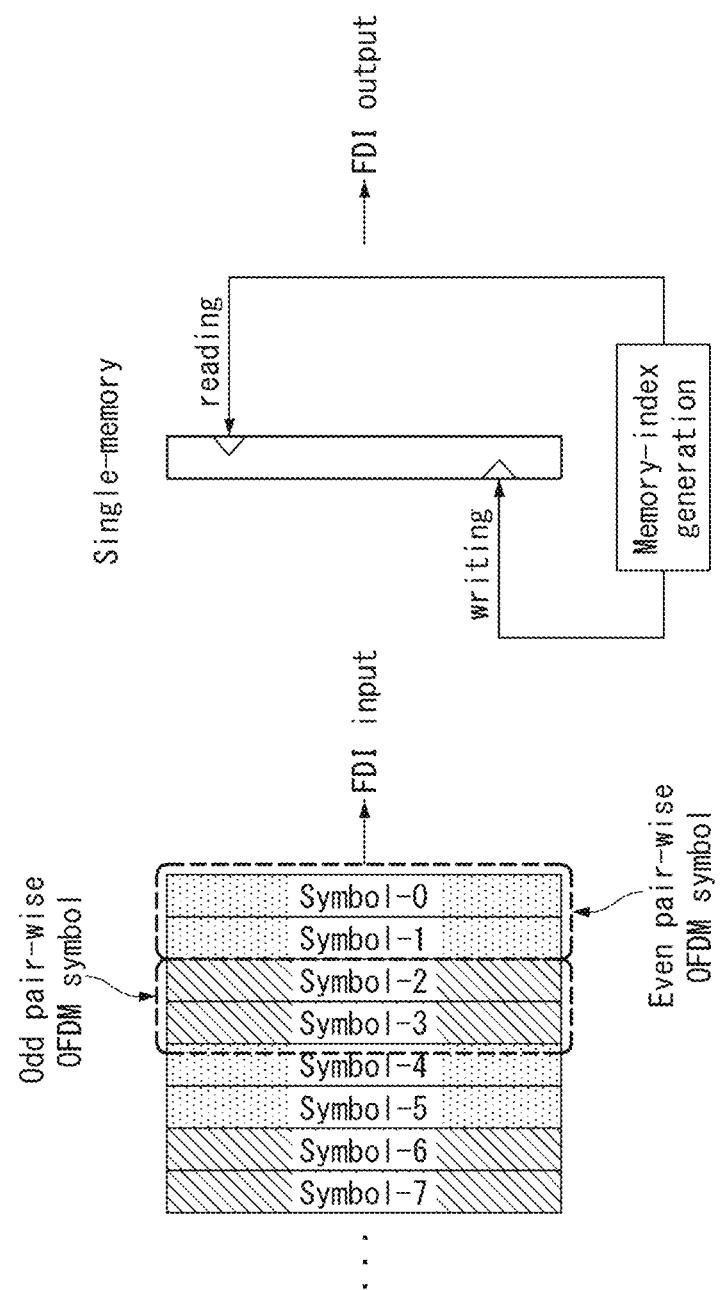
FIG. 47 is a diagram illustrating a frequency interleaving process in accordance with an embodiment of the present invention.

FIG. 47 is a diagram illustrating a frequency interleaving process in accordance with an embodiment of the present invention.

The broadcasting signal reception apparatus in accordance with an embodiment of the present invention may perform a process opposite the aforementioned frequency interleaving process using a single piece of memory.

FIG. 47 is a diagram illustrating a single memory frequency deinterleaving (FDI) process for sequential OFDM symbol inputs.

FDI denotes an abbreviation of frequency deinterleaving or a frequency deinterleaver.

A frequency deinterleaving operation basically complies with a process opposite the frequency interleaving operation.

Additional processing is not required for the use of a single piece of memory for the frequency deinterleaving operation.

When pair-wise OFDM symbols illustrated on the left of FIG. 47 are sequentially inputted, the broadcasting signal reception apparatus may perform the aforementioned reading and writing operations using a single piece of memory, as illustrated on the right of FIG. 47.

In this case, the broadcasting signal reception apparatus may generate a memory index (or memory address) and perform frequency interleaving (reading and writing) corresponding to a process opposite frequency interleaving (writing and reading) performed by the broadcasting signal transmission apparatus.

A gain is obtained using the pair-wise ping-pong interleaving structure proposed in this specification.

Figure 48:
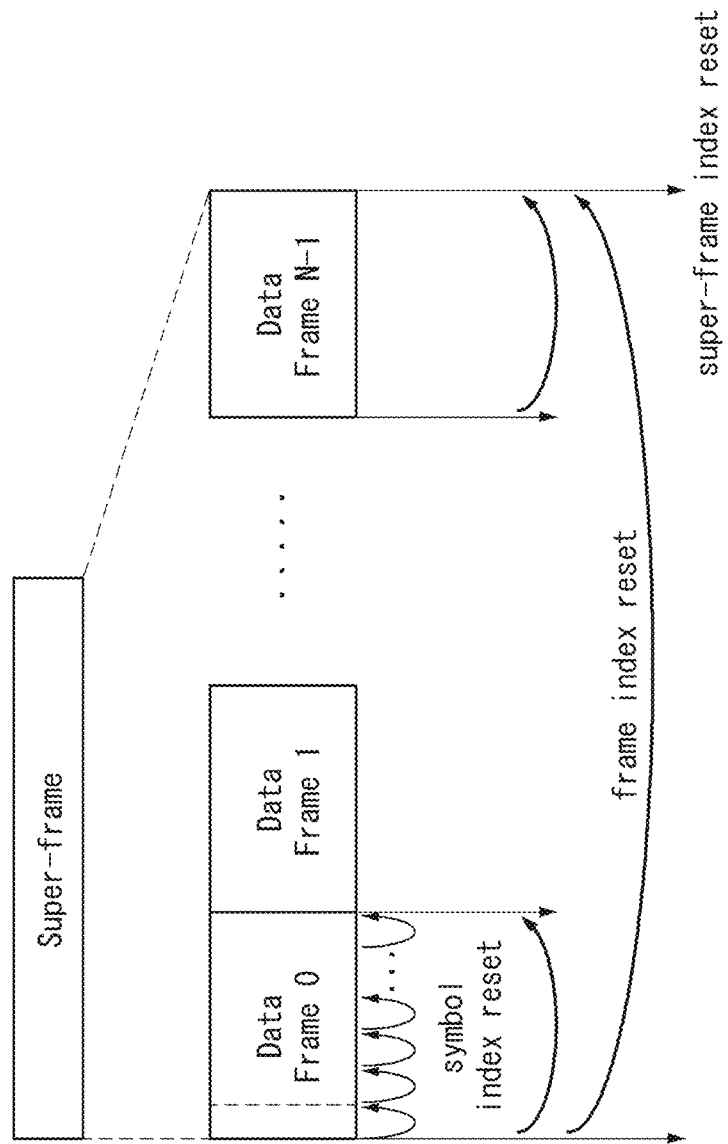
FIG. 48 illustrates a conceptual diagram of frequency interleaving applied to a single super frame in accordance with an embodiment of the present invention.

FIG. 48 illustrates a conceptual diagram of frequency interleaving applied to a single super frame in accordance with an embodiment of the present invention.

A frequency interleaver in accordance with an embodiment of the present invention may change interleaving seeds for each pair-wise OFDM symbol in a single signal frame (i.e., during a section up to a point at which a symbol index is reset) and may change interleaving seeds so that the interleaving seeds are used only in one (i.e., during a section up to a point at which a frame index is reset) of all the frames.

As a result, the frequency interleaver in accordance with an embodiment of the present invention may change interleaving seeds in a super frame (i.e., during a section up to a point at which a super frame index is reset).

Accordingly, the frequency interleaver in accordance with an embodiment of the present invention can interleave all OFDM symbols within a super frame rationally and efficiently.

Figure 49:
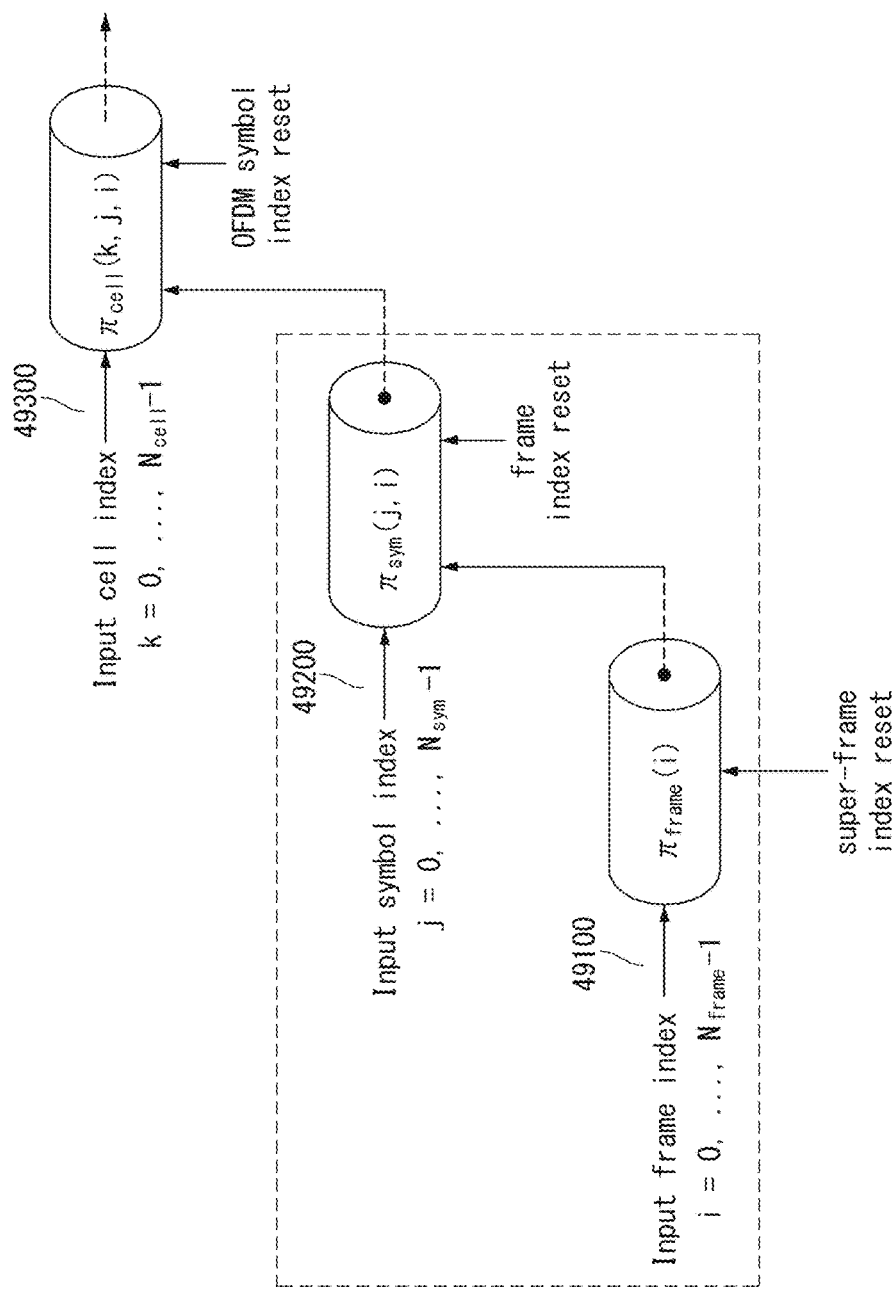
FIG. 49 is a diagram illustrating the logical operation mechanism of frequency interleaving applied to a single super frame proposed in this specification.

FIG. 49 is a diagram illustrating the logical operation mechanism of frequency interleaving applied to a single super frame proposed in this specification.

FIG. 49 illustrates parameters related to the logical operation mechanism of a frequency interleaver for effectively changing interleaving seeds to be used in the single superframe described with reference to FIG. 48.

As described above, in an embodiment of the present invention, various interleaving seeds may be efficiently generated by cyclically shifting a single main interleaving seed by a specific offset.

As illustrated in FIG. 49, in an embodiment, a different interleaving seed may be generated by differently generating the specific offset for each frame and for each pair-wise OFDM symbol. The logical operation mechanism is described below.

A lower block 49100 of FIG. 49, that is, a frequency interleaver proposed in this specification may randomly generate a frame offset for each frame using an input frame index. The frame offset in accordance with an embodiment of the present invention may be generated by a frame offset generator included in a frequency interleaver.

In this case, a frame offset that may be applied to each frame is generated with respect to each signal frame within each super frame identified based on a super frame index when the super frame index is reset.

As illustrated in a block 49200 in the middle of FIG. 49, the frequency interleaver may randomly generate a symbol offset to be applied to each of OFDM symbols included in each signal frame using an input symbol index.

The symbol offset may be generated by a symbol offset generator included in a frequency interleaver. In this case, when a frame index is reset, the symbol offset of each OFDM symbol is generated with respect to symbols within each signal frame identified based on a frame index.

Furthermore, the frequency interleaver may generate various interleaving seeds by cyclically shifting a main interleaving seed by a symbol offset with respect to each OFDM symbol.

Thereafter, as illustrated in a block 49300 on the upper side of FIG. 49, the frequency interleaver may perform random FI on cells included in each OFDM symbol using an input cell index. Random FI parameters in accordance with an embodiment of the present invention may be generated by a random FI generator included in the frequency interleaver.

In FIG. 49, $\pi_{frame}$ denotes a random frame offset used in an i-th frame, $\pi_{symbol}(j,i)$ denotes the symbol offset of the j-th symbol of an i-th frame generated by a random symbol offset generator, and $\pi_{cell}(k,j,i)$ denotes the cell offset of the k-th cell of the j-th symbol of an i-th frame generated by a random generator.

Furthermore, $N_{frame}$ denotes the number of frames within a single super frame, $N_{sym}$ denotes the number of OFDM symbols within a single frame, and $N_{cell}$ denotes the number of cells within a single OFDM symbol.

Figure 50:
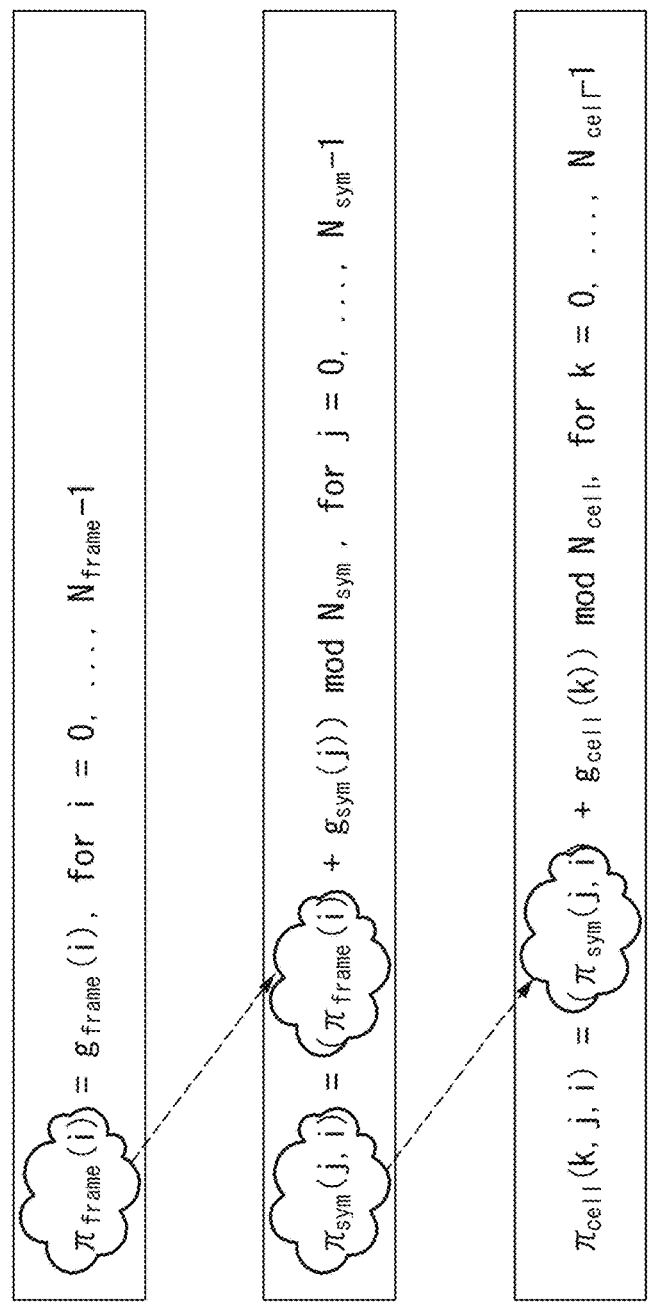
FIG. 50 illustrates the equation of the logical operation mechanism of frequency interleaving applied to a single super frame in accordance with an embodiment of the present invention.

FIG. 50 illustrates the equation of the logical operation mechanism of frequency interleaving applied to a single super frame in accordance with an embodiment of the present invention.

Specifically, FIG. 50 illustrates the relationship between a frame offset parameter, a symbol offset parameter, and the parameter of a random FI applied to a cell included in each OFDM symbol.

Referring to FIG. 50, $g_{frame}$ is a random frame offset generator used in a frame interleaver, $g_{sym}$ is a random symbol offset generator used in a symbol interleaver, and $g_{cell}$ is a random generator used in a cell interleaver.

$\pi_{frame}(i)$ denotes the frame offset of an i-th frame generated by the random frame offset generator, $\pi_{symbol}(j,i)$ denotes the symbol offset of the j-th symbol of an i-th frame generated by the random symbol offset generator, and $\pi_{cell}$ (k,j,i) denotes the cell offset of the k-th cell of the j-th symbol of an i-th frame generated by the random generator.

The symbol offset and the cell offset are described in more detail with reference to FIG. 51 to be described later.

As illustrated in FIG. 50, an offset to be used in each OFDM symbol may be generated through the hierarchical structure of the aforementioned frame offset generator and the aforementioned symbol offset generator. In this case, the frame offset generator and the symbol offset generator may be designed using a specific random generator.

Figure 51:
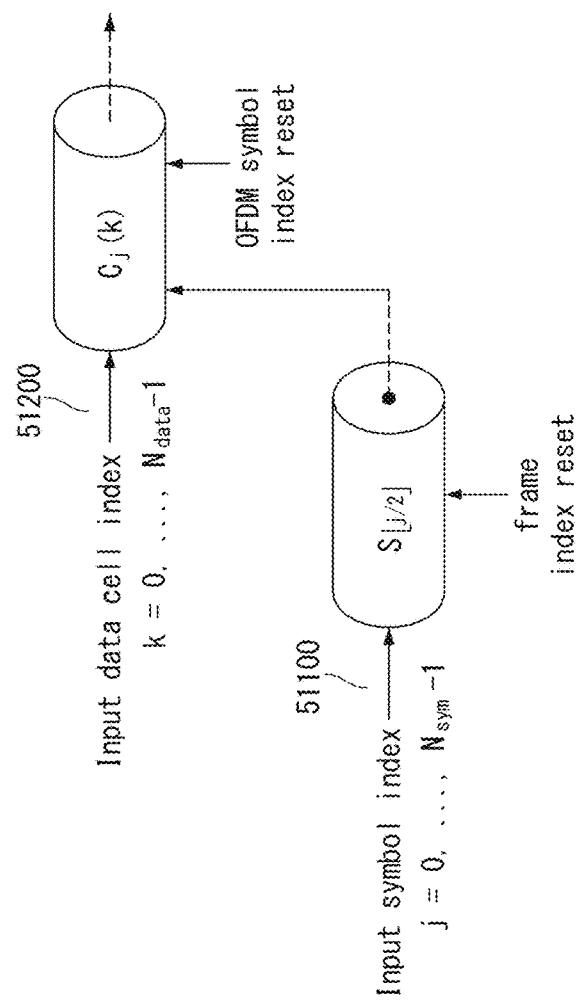
FIG. 51 is a diagram illustrating the logical operation mechanism of frequency interleaving applied to a single signal frame in accordance with an embodiment of the present invention.

FIG. 51 is a diagram illustrating the logical operation mechanism of frequency interleaving applied to a single signal frame in accordance with an embodiment of the present invention.

FIG. 51 illustrates parameters related to the logical operation mechanism of a frequency interleaver for effectively changing interleaving seeds to be used in the single signal frame described with reference to FIG. 48.

As described above, various interleaving seeds may be efficiently generated by cyclically shifting a single main interleaving seed by a specific symbol offset.

As illustrated in FIG. 51, in an embodiment of the present invention, a different interleaving seed may be generated by differently generating a symbol offset for each pair-wise OFDM symbol.

In this case, the symbol offset is differently generated for each pair-wise OFDM symbol using a specific random symbol offset generator.

The logical operation mechanism is described below.

As illustrated in a block 51100 placed on the lower side of FIG. 51, a frequency interleaver may randomly generate a symbol offset to be applied to each of OFDM symbols included in each signal frame using an input symbol index.

The symbol offset (or random symbol offset) may be generated by a specific random generator (or symbol offset generator) included in the frequency interleaver.

In this case, when a frame index is reset, the symbol offset of each OFDM symbol is generated with respect to OFDM symbols within each signal frame identified based on a frame index.

Furthermore, the frequency interleaver may generate various interleaving seeds by cyclically shifting a main interleaving seed by the symbol offset with respect to each OFDM symbol.

As illustrated in a block 51200 placed on the upper side of FIG. 51, the frequency interleaver may perform random FI on cells included in each OFDM symbol using an input cell index.

The parameters of random FI may be generated by a random FI generator included in the frequency interleaver.

As illustrated in FIG. 51, $S_{\lfloor j/2 \rfloor}$ denotes a random symbol offset used in a j-th OFDM symbol, and a symbol $\lfloor \bullet \rfloor$ denotes floor operation.

$C_j(k)$ denotes random FI used in the j-th OFDM symbol, $N_{sym}$ denotes the number of OFDM symbols within a single frame, and $N_{data}$ denotes the number of data cell(s) within a single OFDM symbol.

The relationship between $S_{\lfloor j/2 \rfloor}$ and $C_j(k)$ is described in detail below with reference to FIG. 52.

Figure 52:
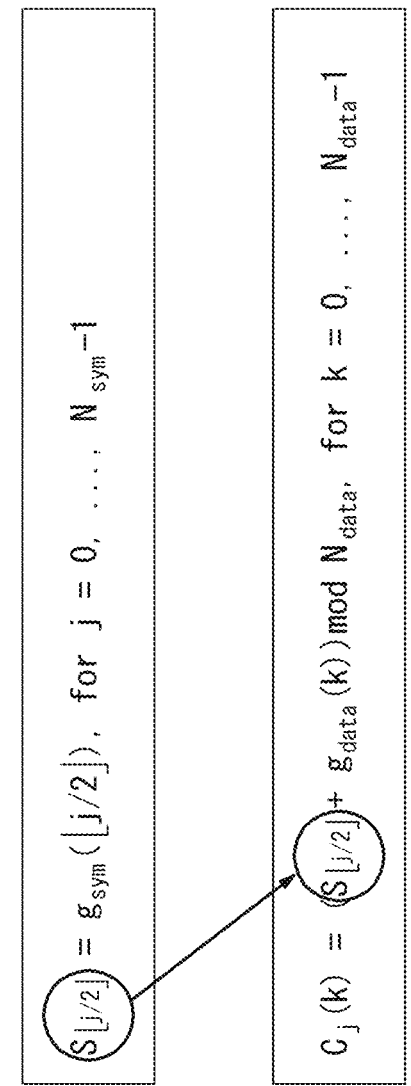
FIG. 52 illustrates the equation of the logical operation mechanism of frequency interleaving applied to a single super frame in accordance with an embodiment of the present invention.

FIG. 52 illustrates the equation of the logical operation mechanism of frequency interleaving applied to a single super frame in accordance with an embodiment of the present invention.

That is, FIG. 52 illustrates the relationship between the aforementioned symbol offset parameter and the parameter of random FI applied to a cell included in each OFDM.

As illustrated in FIG. 52, an offset to be used in each OFDM symbol may be generated through the hierarchical structure of the aforementioned symbol offset generator.

In this case, the symbol offset generator may be designed using a specific random generator.

As described above, $g_{sym}$ denotes a random symbol offset generator used in a symbol interleaver, and $g_{data}$ denotes a random (FI) generator used in a cell interleaver.

Figure 53:
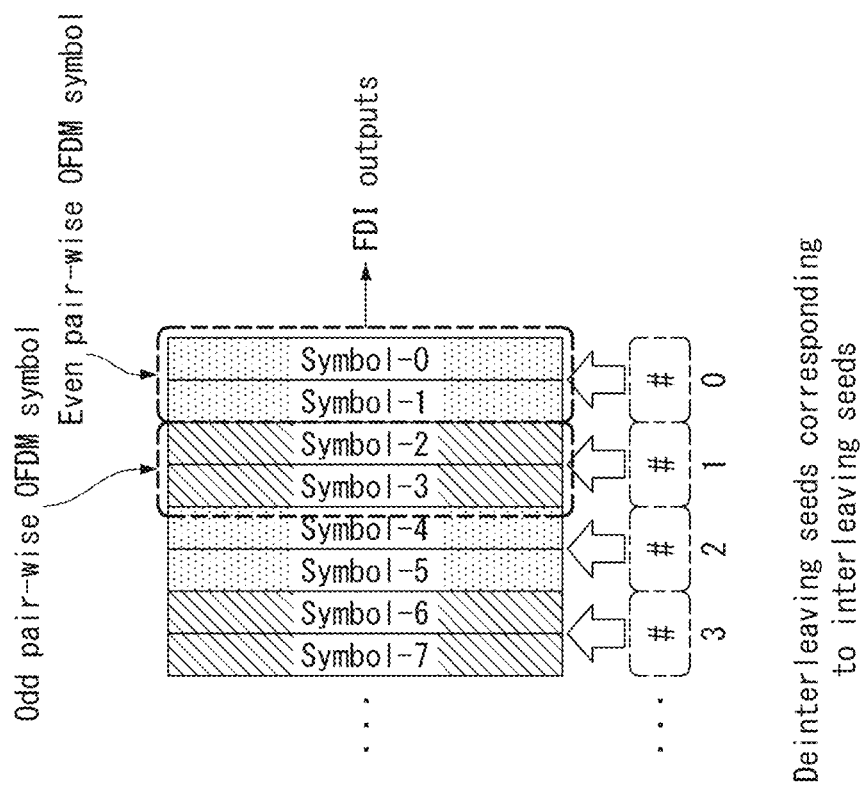
FIG. 53 is a diagram illustrating the single memory deinterleaving of input-sequential OFDM symbols which is proposed in this specification.

FIG. 53 is a diagram illustrating the single-memory deinterleaving of input-sequential OFDM symbols which is proposed in this specification.

FIG. 53 is a diagram illustrating that the operation of the frequency deinterleaver of the broadcasting signal reception apparatus or broadcasting signal reception apparatus for performing deinterleaving has been conceptualized by applying interleaving seeds used in the broadcasting signal transmission apparatus (or frequency interleaver) to a pairwise OFDM symbol.

The frequency deinterleaver includes in the frame parsing block, as illustrated in FIG. 31.

The frame parsing block may also be represented by a deframing & deinterleaver block.

As described above, the broadcasting signal reception apparatus in accordance with an embodiment of the present invention may perform a process opposite the aforementioned frequency interleaving process using a single piece of memory.

Figure 54:
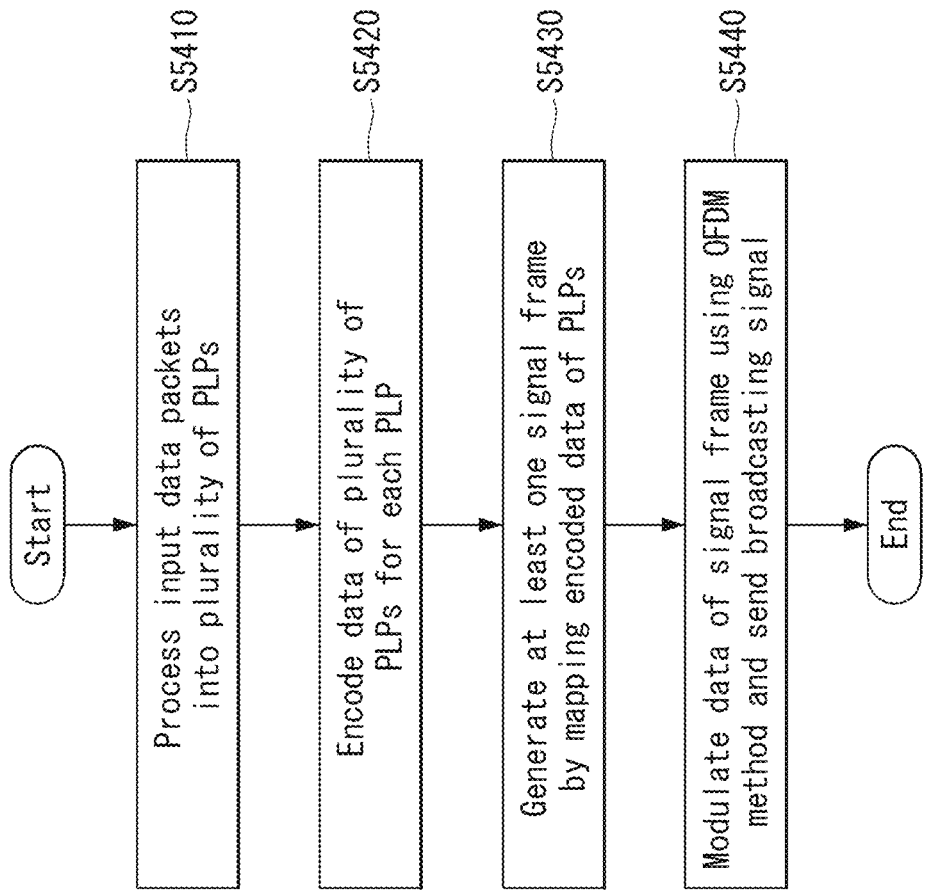
FIG. 54 is a flowchart illustrating an example of a method of transmitting a broadcasting signal which is proposed in this specification.

FIG. 54 is a flowchart illustrating an example of a method of transmitting a broadcasting signal which is proposed in this specification.

Referring to FIG. 54, the broadcast signal transmission apparatus proposed in this specification processes input streams or input data packets through an input formatting module at step S5410.

The input data packets may include a variety of types of packets.

That is, the input formatting module of the broadcast signal transmission apparatus formats the input data packets into multiple (or a plurality of or at least one or one or more) Data Pipes (DPs) or multiple Physical Layer Pipes (PLPs).

In this case, the plurality of DPs or the plurality of PLPs may be represented by a plurality of data transmission channels.

Thereafter, the broadcast signal transmission apparatus encodes the data of the plurality of formatted PLPs for each PLP through a Bit Interleaved Coding and Modulation (BICM) module at step S5420.

The BICM module may also be represented by the encoder.

Accordingly, the broadcast signal transmission apparatus encodes data corresponding to each of data transmission channels through which service data or service component data is transmitted through the encoder.

Thereafter, the broadcast signal transmission apparatus generates at least one signal frame by mapping the encoded data of the PLPs through a frame building module at step S5430.

The frame building module may be represented by the frame builder or the framing & interleaving block.

The signal frame denotes the aforementioned ATSC 3.0 frame.

As described above, the ATSC 3.0 frame includes a preamble. The preamble includes the frequency interleaver mode (FI_MODE) information proposed in this specification.

Furthermore, the preamble is placed after a bootstrap and before a data payload.

For the structure of the ATSC 3.0 frame and a related description, reference is made to FIG. 40.

The FI_MODE information may be included in L1 signaling included in the preamble.

The L1-signaling may be divided into the two parts, that is, L1-static and L1-dynamic, as described with reference to FIG. 40.

In this case, the FI_MODE information may be included in the L1-static and/or the L1-dynamic.

The frequency interleaver (FI) mode (FI_MODE) information included in the preamble denotes information indicating whether FI is available. Whether FI is available may be indicated by on or off.

That is, the FI mode information indicates whether FI is on or off, and may be represented by 1 bit.

If the FI mode has been set as on (or if the FI mode denotes on), data cell output by the cell mapper is subjected to frequency interleaving for each OFDM symbol through FI.

The FI mode information may be represented by FI mode signaling.

For example, if the FI mode information has been set to "1", it may denote that FI has been on. On the contrary, if the FI mode information has been set to "0", it may denote that the FI has been off.

More specifically, the FI mode information may be transmitted through L1 Signaling within a frame.

In this case, a preamble symbol(s) transmits L1 signaling data for data symbol(s) subsequent to the preamble symbol(s).

The preamble symbol(s) are placed after a bootstrap and placed before a data symbol(s).

The L1 signaling provides required information for configuring physical layer parameters. L1 means Layer-1 corresponding to the lowest layer of the ISO 7 layer model.

Furthermore, the L1 signaling is included in the preamble, and includes two parts, that is, L1-static and L1-dynamic.

A method of transmitting a transmission broadcast signal through the FI mode information proposed in this specification is described in more detail.

The broadcast signal transmission apparatus includes the FI mode information, newly defined in this specification, in a preamble (Specifically, L1-signaling, L1-static, or L1-dynamic).

Thereafter, the broadcast signal transmission apparatus performs or does not perform an FI operation depending on an FI mode information setting value included in the preamble.

Thereafter, the broadcast signal transmission apparatus modulates the data of the generated signal frame using an OFDM method through an Orthogonal Frequency Division Multiplexing Generation (OFDM) module and transmits a broadcasting signal, including the modulated data of the signal frame, through the broadcasting signal transmission apparatus (i.e., a broadcasting transmitter) at step S5440.

Figure 55:
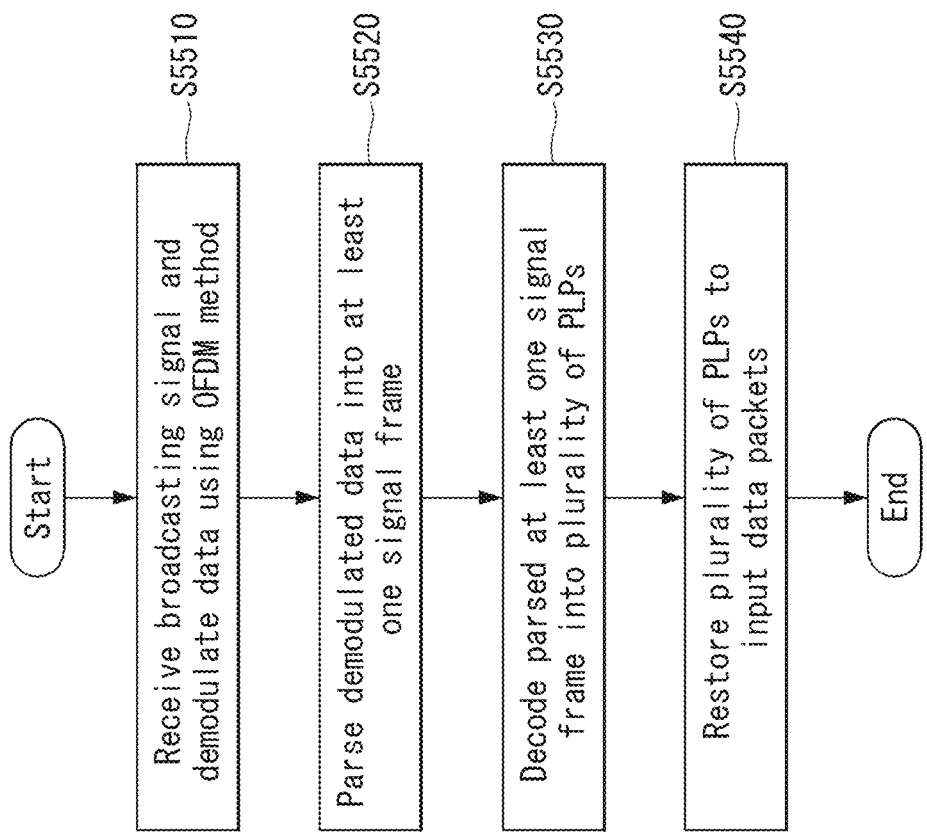
FIG. 55 is a flowchart illustrating an example of a method of receiving a broadcasting signal which is proposed in this specification.

FIG. 55 is a flowchart illustrating an example of a method of receiving a broadcast signal which is proposed in this specification.

Referring to FIG. 55, the broadcast signal reception apparatus proposed in this specification receives an external broadcast signal through a synchronization and demodulation module and demodulates the data of the received broadcasting signal using an OFDM method at step S5510.

The synchronization and demodulation module may also be represented by a receiver and a demodulator.

Accordingly, the broadcast signal reception apparatus receives the broadcast signal, including at least one signal frame, through the receiver and demodulates the data of the received broadcasting signal through the demodulator using an Orthogonal Frequency Division Multiplexing (OFDM) method.

Thereafter, the broadcast signal reception apparatus parses the demodulated data into at least one signal frame through a frame parsing module at step S5520.

The frame parsing module may also be represented by a frame parser or deframing and deinterleaving.

Accordingly, the broadcast signal reception apparatus parses the at least one signal frame included in the received broadcast signal in order to extract service data or service component data through the frame parser.

The signal frame denotes the aforementioned ATSC 3.0 frame.

As described above, the ATSC 3.0 frame includes a preamble. The preamble includes the frequency interleaver mode (FI_MODE) information proposed in this specification.

Furthermore, the preamble is placed after a bootstrap and placed before a data payload.

For the structure of the ATSC 3.0 frame and a related description thereof, reference is made to FIG. 40.

The FI_MODE information may be included in L1 signaling included in the preamble.

The L1-signaling may be divided into two parts, that is, L1-static and L1-dynamic, as described with reference to FIG. 40.

In this case, the FI_MODE information may be included in the L1-static and/or the L1-dynamic.

The frequency interleaver (FI) mode (FI_MODE) information included in the preamble is information indicating whether FI is available. Whether FI is available may be indicated by on or off.

That is, the FI mode information denotes whether FI has been on or off, and may be represented by 1 bit.

If the FI mode has been set as on (or if the FI mode is on), frequency interleaving is performed on data cells, output by the cell mapper, for each OFDM symbol through FI.

The FI mode information may be represented by FI mode signaling.

For example, if the FI mode information has been set to "1", it may denote that FI has been on. On the contrary, if the FI mode information has been set to "0", it may denote that the FI has been off.

More specifically, the FI mode information may be transmitted through L1 signaling within a frame.

In this case, a preamble symbol(s) transmits L1 signaling data for a data symbol(s) subsequent to the preamble symbol(s).

The preamble symbol(s) is placed after a bootstrap and placed before the data symbol(s).

The L1 signaling provides required information for configuring physical layer parameters. L1 means Layer-1 corresponding to the lowest layer of the ISO 7 layer model.

Furthermore, the L1 signaling is included in the preamble, and includes two parts, that is, L1-static and L1-dynamic.

In this case, a method of parsing, by the broadcast signal reception apparatus, the signal frame including the FI mode information is described in more detail.

That is, the broadcast signal reception apparatus checks whether an FI operation has been performed by the broadcast signal transmission apparatus based on received (or detected or decoded) FI mode information.

If, as a result of the check, the FI operation is found to have been performed (if the FI mode information value has been set as "on"), the broadcast signal reception apparatus additionally performs frequency deinterleaving (FDI).

That is, the broadcast signal reception apparatus performs or does not perform the FDI operation based on the FI mode information setting value included in the preamble.

Thereafter, the broadcast signal reception apparatus decodes the parsed at least one signal frame into a plurality of DPs or a plurality of PLPs through a demapping and decoding module at step S5530.

The demapping and decoding module may also be represented by a converter and a decoder.

Accordingly, the broadcast signal reception apparatus converts service data or service component data into bits through the converter and decodes the converted bits through the decoder.

Thereafter, the broadcast signal reception apparatus restores a plurality of DPs or a plurality of PLPs, output by the demapping and decoding module, to the input streams or the input data packets through an output processor module at step S5540.

In some embodiments, the broadcast signal reception apparatus may output the data streams or data packets including the decoded bits through an output processor.

An embodiment of the present invention can provide various broadcasting services by processing data according to service characteristics and controlling Quality of Service (QoS) for each service or service component.

Furthermore, an embodiment of the present invention can achieve transmission flexibility by transmitting various broadcasting services through the same Radio Frequency (RF) signal bandwidth.

Furthermore, an embodiment of the present invention can improve data transfer efficiency and the transmission/reception robustness of a broadcasting signal using a Multiple-Input Multiple-Output (MIMO) system.

Furthermore, an embodiment of the present invention can provide the broadcast signal transmission/reception methods and apparatuses, wherein a digital broadcast signal can be received without an error although a mobile reception apparatus is used or an indoor environment.

Furthermore, this specification is advantageous in that a frequency diversity effect can be maximized using a different interleaving seed for each OFDM symbol pair in the frequency interleaver (FI).

Furthermore, this specification is advantageous in that it can improve data restoration speed by transmitting information indicating whether a frequency interleaver has been used through a preamble in advance so that the broadcast signal reception apparatus is previously aware of whether frequency interleaving has been performed on a received signal prior to data decoding.

Furthermore, this specification is advantageous in that it can support FDM by turning off an FI operation through the operation of FI mode information for turning on or off the FI operation.

Advantages to be obtained in this specification are not limited to the aforementioned advantages and may include various other advantages that are evident to those skilled in the art to which the present invention pertains from the following description.

This specification relates to a method and apparatus for receiving and transmitting broadcasting signals.

Those skilled in the art will understand that the present invention may be modified in various ways without departing from the spirit or range of the present invention. Accordingly, the present invention has been intended to include all changes and modifications of the present invention provided within the attached claims and equivalent ranges thereof.

In this specification, both apparatus and method inventions have been described, and descriptions of both the apparatus and method inventions may be mutually supplemented and applied.

What is claimed is:

1. A reception apparatus for receiving a broadcast signal, comprising:
    a receiver configured to receive the broadcast signal including a signal frame;
    a demodulator configured to demodulate the received broadcast signal by an Orthogonal Frequency Division Multiplexing (OFDM) scheme,
    the signal frame including a preamble and a sub-frame,
    the preamble including frequency interleaver information representing whether a frequency interleaver is enabled or bypassed for the sub-frame;
    in response to the frequency interleaver information having a first value, a frequency deinterleaver deinterleaves data of the sub-frame based on a deinterleaving sequence,
    in response to the frequency interleaver information having a second value, a frequency deinterleaver is not used;
    a decoder configured to decode the signal frame.

2. The reception apparatus of claim 1, wherein the deinterleaving sequence is used for every symbol pair comprised of two consecutive symbols, and
    wherein the deinterleaving sequence is generated based on a main-sequence and a symbol offset.

3. The reception apparatus of claim 2, wherein an address check operation is performed to validate an address of the generated deinterleaving sequence.

4. The reception apparatus of claim 2, wherein the main-sequence is variable based on an FFT size.

5. The reception apparatus of claim 2, wherein the symbol offset is generated for the every symbol pair comprised of the two consecutive symbols.

6. A method of receiving a broadcast signal, comprising:
    receiving the broadcast signal including a signal frame;
    demodulating the received broadcast signal by an Orthogonal Frequency Division Multiplexing (OFDM) scheme,
    the signal frame including a preamble and a sub-frame,
    the preamble including frequency interleaver information representing whether a frequency interleaver is enabled or bypassed for the sub-frame;
    in response to the frequency interleaver information having a first value, frequency deinterleaving data of the sub-frame based on a deinterleaving sequence,
    in response to the frequency interleaver information having a second value, frequency deinterleaving is not used;
    decoding the signal frame.

7. The method of claim 6, wherein the deinterleaving sequence is used for every symbol pair comprised of two consecutive symbols, and
    wherein the deinterleaving sequence is generated based on a main-sequence and a symbol offset.

8. The method of claim 7, wherein an address check operation is performed to validate an address of the generated deinterleaving sequence.

9. The method of claim 7, wherein the main-sequence is variable based on an FFT size.

10. The method of claim 7, wherein the symbol offset is generated for the every symbol pair comprised of the two consecutive symbols.

11. A method for transmitting a broadcast signal, comprising:
    encoding service data;
    building a signal frame including a preamble and a sub-frame including the service data,
    the preamble including frequency interleaver information representing whether a frequency interleaver is enabled or bypassed for the sub-frame;
    frequency interleaving data of the sub-frame selectively based on an interleaving sequence, wherein when the frequency interleaving is enabled, the frequency interleaver information has a first value, or when the frequency interleaving is not used, the frequency interleaver information has a second value;
    transmitting the broadcast signal including the signal frame.

12. The method of claim 11, wherein the interleaving sequence is used for every symbol pair comprised of two consecutive symbols, and
    wherein the interleaving sequence is generated based on a main-sequence and a symbol offset.

13. An apparatus for transmitting a broadcast signal, comprising:
    an encoder configured to encode service data;
    a builder configured to build a signal frame including a preamble and a sub-frame including the service data,
    the preamble including frequency interleaver information representing whether a frequency interleaver is enabled or bypassed for the sub-frame;
    a frequency interleaver configured to interleave data of the sub-frame selectively based on an interleaving sequence, wherein when the frequency interleaver is enabled, the frequency interleaver information has a first value, or when the frequency interleaver is not used, the frequency interleaver information has a second value;
    a transmitter configured to transmit the broadcast signal including the signal frame.

14. The apparatus of claim 13, wherein the interleaving sequence is used for every symbol pair comprised of two consecutive symbols, and
    wherein the interleaving sequence is generated based on a main-sequence and a symbol offset.

* * * * *